United States Patent
Nagase et al.

(10) Patent No.: US 12,400,426 B2
(45) Date of Patent: Aug. 26, 2025

(54) DISTANCE IMAGE CAPTURING DEVICE AND DISTANCE IMAGE CAPTURING METHOD

(71) Applicant: Brookman Technology, Inc., Hamamatsu (JP)

(72) Inventors: Masanori Nagase, Hamamatsu (JP); Keigo Isobe, Hamamatsu (JP)

(73) Assignee: Brookman Technology, Inc., Hamamatsut Shizuoka (JP)

( * ) Notice: Subject to any disclaimer, the term of this patent is extended or adjusted under 35 U.S.C. 154(b) by 487 days.

(21) Appl. No.: 17/999,357

(22) PCT Filed: May 21, 2021

(86) PCT No.: PCT/JP2021/019327
§ 371 (c)(1),
(2) Date: Nov. 18, 2022

(87) PCT Pub. No.: WO2021/235542
PCT Pub. Date: Nov. 25, 2021

(65) Prior Publication Data
US 2023/0281957 A1    Sep. 7, 2023

(30) Foreign Application Priority Data

May 22, 2020    (WO) .................. PCT/JP2020/020221

(51) Int. Cl.
*H04N 23/56* (2023.01)
*G06V 10/74* (2022.01)
*H04N 25/71* (2023.01)

(52) U.S. Cl.
CPC ........... *G06V 10/761* (2022.01); *H04N 23/56* (2023.01); *H04N 25/71* (2023.01)

(58) Field of Classification Search
CPC ...... G06V 10/761; H04N 23/56; H04N 25/71; G01S 7/487; G01S 7/4876; G01S 7/4863; G01S 17/894
(Continued)

(56) References Cited

U.S. PATENT DOCUMENTS

2019/0383906 A1   12/2019   Nakamura et al.
2020/0074608 A1*   3/2020   Beshinski .............. H04N 23/95

FOREIGN PATENT DOCUMENTS

JP    2004294420 A   10/2004
JP    2011122913 A   6/2011
(Continued)

OTHER PUBLICATIONS

"International Application Serial No. PCT/JP2021/019327, International Search Report dated Jul. 27, 2021", w/ English Translation, (Jul. 27, 2021), 4 pgs.
(Continued)

*Primary Examiner* — Stephen P Coleman
(74) *Attorney, Agent, or Firm* — Schwegman Lundberg & Woessner, P.A.

(57) ABSTRACT

A distance image capturing device according to the present invention includes a light source unit that emits radiation light into a measurement space which is a space to be measured, a distance image sensor that receives light including reflected light reflected from an object in the measurement space as incident light, accumulates charges generated by the incident light for each pixel, and generates a distance image formed from a charge amount of the charges accumulated for each pixel, and a distance image processing unit that stores a signal value based on a non-controlled charge regardless of a control of accumulating charges in the distance image sensor, from the charge amount in the
(Continued)

distance image, and corrects and acquires a distance to the object in the space by using the stored signal value.

21 Claims, 15 Drawing Sheets

(58) Field of Classification Search
USPC .......................................................... 382/106
See application file for complete search history.

(56) References Cited

FOREIGN PATENT DOCUMENTS

| JP | 2014163717 A | 9/2014 |
|----|--------------|--------|
| JP | 2016217907 A | 12/2016 |
| JP | 2019215260 A | 12/2019 |

OTHER PUBLICATIONS

Jung, Jiyoung, et al., "Time-of-flight sensor calibration for a color and depth camera pair", IEEE transactions on pattern analysis and machine intelligence 37.7, (Jul. 2015), pp. 1501-1513.

* cited by examiner

DISTANCE IMAGE CAPTURING DEVICE AND DISTANCE IMAGE CAPTURING METHOD

PRIORITY APPLICATIONS

This application is a U.S. National Stage Filing under 35 U.S.C. § 371 from International Application No. PCT/JP2021/019327, filed on May 21, 2021, and published as WO2021/235542 on Nov. 25, 2021, which claims the benefit of priority to International Application No. PCT/JP2020/020221, filed on May 22, 2020; the benefit of priority of each of which is hereby claimed herein, and which applications and publication are hereby incorporated herein by reference in their entireties.

TECHNICAL FIELD

The present invention relates to a distance image capturing device and a distance image capturing method.

BACKGROUND ART

In the related art, a time of flight (hereinafter, referred to as "TOF") type distance image sensor has been implemented that uses a known speed of light and measures the distance between a measuring instrument and an object based on a flight time of light in space (measurement space). In the TOF type distance image sensor, an optical pulse (for example, near-infrared light) is emitted to an object to be measured, and the distance between the measuring instrument and the object is measured based on the difference between a time when the optical pulse is emitted and a time when the optical pulse (reflected light) returns after being reflected by the object in the measurement space, that is, a flight time of light between the measuring instrument and the object (for example, refer to Patent Document 1).

In the TOF type distance image sensor, a photoelectric conversion element converts a light amount of incident light into a charge, accumulates the converted charge in a charge accumulation unit, and converts an analog voltage corresponding to a charge amount of the charge accumulated by an AD converter into a digital value.

In addition, the TOF type distance image sensor obtains the distance between the measuring instrument and the object from the analog voltage corresponding to the charge amount and information on the flight time of light between the measuring instrument and the object, which is included in the digital value.

At this time, background light in an environment of the measurement space is included when the reflected light used for distance measurement is incident, and in order to accurately obtain the distance, it is necessary to remove the background light from the incident light and obtain information only on the reflected light.

For this reason, for the purpose of removing (cancelling) an effect of the background light in the environment of the measurement space in the distance measurement, by setting a period during which radiation light is not always emitted, an amount of received light only by the background light is accumulated, and when calculating the distance to the object, by subtracting a charge by the background light accumulated in the period during which the radiation light is not emitted from a charge by the incident light input in the period during which the reflected light (including information of the distance to the object) from the object is received, thereby obtaining a charge only by the reflected light.

CITATION LIST

Patent Document

[Patent Document 1]
  Japanese Unexamined Patent Application, First Publication No. 2004-294420

SUMMARY OF INVENTION

Technical Problem

In Patent Document 1, in the case of the TOF sensor, radiation light is emitted a plurality of times, the charges generated by the received light are accumulated each time the emission is performed, and an analog voltage corresponding to the accumulated charge is used for the distance measurement.

At this time, every time the radiation light is emitted, the reflected light reflected from the object is incident, and the distance is calculated from a ratio of each of charges $Q2$ and $Q3$ generated by the incident light. At this time, the light received by the TOF sensor includes background light in the environment in addition to the reflected light in which the radiation light is reflected from the object.

Accordingly, each of the charges $Q2$ and $Q3$ generated by the incident light includes a charge $Q1$ generated by the background light, in addition to the charge generated by the reflected light.

The charge $Q1$ by the background light causes a decrease in an accuracy when calculating the distance from the TOF sensor to the object.

For this reason, before emitting the radiation light, only the background light is made incident on the TOF sensor, the charge $Q1$ is obtained, thereby calculating a distance L by the following Formula (1).

$$L=((Q3-Q1)/(Q2+Q3-2Q1))\times(cTw)/2 \qquad (1)$$

In Formula (1), c is a speed of light and Tw is a pulse width of the radiation light. By using Formula (1), the distance L from the TOF sensor to the object can be calculated. Here, (cTw)/2 indicates a maximum distance (maximum measurement distance) that can be measured by the emission with an optical pulse PO.

However, as shown in FIG. 11, in a distance image capturing device using the TOF sensor, a lens 31 is provided for condensing light onto a pixel region of a distance image sensor 32 (sensor chip) in which the pixel element is formed.

In (A) of FIG. 11, an image of incident light with a predetermined viewing angle α forms an image on each pixel in the pixel region of the distance image sensor 32 by the lens 31.

For this reason, as shown in (B) of FIG. 11, for each pixel of the distance image sensor 32, incident light at various incident angles from an entire spherical lens surface, such as the lens 31, forms an image on each pixel of the distance image sensor 32.

Here, in the distance image sensor 32, compared with an incident angle θ1 of incident light with respect to a pixel of an image forming point 501 corresponding to a viewing angle α1 on an axis f of the lens 31, an incident angle θ2 of incident light with respect to a pixel of an image forming point 502 at an end corresponding to a viewing angle α2 is larger.

The charge Q1 generated by the background light differs in accordance with a change in the incident angle θ of the incident light with respect to each pixel. In addition, the charges accumulated for each pixel include different non-controlled charges QB1.

In addition, the charge Q2 and the charge Q3 accumulated for each pixel also include different non-controlled charges QB2 and QB3. The above-described non-controlled charge refers to a charge other than a controlled charge, which is a charge collected in the photoelectric conversion element (photodiode PD which will be described later) and accumulated in a charge accumulation unit FD by on/off control of a readout gate transistor G to distribute the charge.

FIG. 12 is a diagram showing generation of non-controlled charges QB1, QB2, and QB3 included in each of the charges Q1, Q2, and Q3, depending on the incident angle of incident light with respect to the pixel. (A) of FIG. 12 shows a plan view configuration of the pixel in the example of the TOF sensor. The charge generated by the photodiode PD, which is the photoelectric conversion element of the pixel, and distributed to a charge accumulation unit FD1 (corresponding to a charge accumulation unit CS1 which will be described later) becomes the charge Q1. More strictly, the charge generated by photoelectric conversion in a silicon substrate on which the pixel including the photodiode PD is formed is collected in the photodiode PD, and distributed to the charge accumulation unit FD1 by turning on the readout gate transistor G1 becomes the charge Q1.

Similarly, the charge collected in the photodiode PD and distributed to a charge accumulation unit FD2 (corresponding to a charge accumulation unit CS2 which will be described later) becomes the charge Q2 and the charge distributed to a charge accumulation unit FD3 (corresponding to a charge accumulation unit CS2 which will be described later) becomes the charge Q3.

By turning on the readout gate transistor G1, the charge collected in the photodiode PD is distributed to the charge accumulation unit FD1. By turning on a readout gate transistor G2, the charge collected in the photodiode PD is distributed to the charge accumulation unit FD2. In addition, by turning on a readout gate transistor G3, the charge collected in the photodiode PD is distributed to the charge accumulation unit FD3.

(B) of FIG. 12 shows a configuration of a cross-section taken along line A-A' in (A) of FIG. 12. A case where the incident light on the surface of the sensor chip of the distance image sensor 32 is not 0°, and the incident angle is −20° with respect to a plane parallel to the line A-A' and perpendicular to a plane of the sensor chip is shown.

Here, in each of the charge accumulation units FD1, FD2, and FD3, controlled charges QA1, QA2, and QA3, which are charges collected by the photodiode PD and distributed via each of the readout gate transistors G1, G2, and G3, and the non-controlled charges QB1, QB2, and QB3, which are charges that flow into without going through the readout gate transistors G1, G2, and G3 are included. Here, each of the non-controlled charges QB1, QB2, and QB3 shows charges that flow into the charge accumulation units FD1, FD2, and FD3 without readout control being performed in a pixel circuit.

These non-controlled charges QB1, QB2, and QB3 are not the same with respect to the background light, and differ in each of the charge accumulation units FD1, FD2, and FD3 depending on the incident angle of the incident light.

In a case of (B) of FIG. 12, since more incident light is incident on the charge accumulation unit FD2 side than on the charge accumulation unit FD3 side, an amount of the non-controlled charge QB2 flowing into the charge accumulation unit FD2 is greater than an amount of the non-controlled charge QB3 flowing into the charge accumulation unit FD3.

FIG. 13 is a diagram showing that the charges accumulated in the charge accumulation unit change depending on the incident angle of the incident light with respect to the sensor chip. (A) of FIG. 13 shows an experiment concept in which the angle of the surface on which the pixel of the distance image sensor 32 is formed is tilted with respect to a radiation (emission) direction of collimated light, and the change in the incident angle of the incident light with respect to the pixel of the distance image sensor 32 by the lens 31 is pseudo-simplified.

In (B) of FIG. 13, a horizontal axis indicates the incident angle, and a vertical axis indicates a charge amount as a digital value (LSB) corresponding to each of the charge amount Q1 (solid line), Q2 (one-dot chain line), and Q3 (two-dot chain line) in each of the charge accumulation units FD1, FD2, and FD3. The amount of incident light is reduced by a reduction of a projected area by the incident angle of the incident light. Specifically, when the incident angle is θ, it changes cos (cosine) θ times. Therefore, ideally, the charge amount collected in the photodiode PD also changes by cos (cosine) θ times assuming that the incident angle is θ. Here, each of the controlled charges QA1, QA2, and QA3 collected in the photodiode PD and distributed to each of the charge accumulation units FD1, FD2, and FD3 by each of the readout gate transistors G1, G2, and G3 is the same.

Therefore, for example, when the incident angle θ is negative, the reason why the charge Q2 has a larger charge amount than the other charges Q1 and Q3 is that each of the non-controlled charges QB1, QB2, and QB3 differs depending on the incident angle of the incident light.

FIG. 14 is a conceptual diagram showing a relationship between each of the non-controlled charges QB1, QB2, and QB3 in each of the charges Q1, Q2, and Q3. (A) of FIG. 14 shows a case where each of the non-controlled charges QB1, QB2, and QB3 is the same, and shows each of the charges Q1, Q2, and Q3 at a small incident angle (less than 20°, which will be described later), such as an incident angle of 0°. In the case of (A) of FIG. 14, by removing the charge Q1 from each of the charges Q2 and Q3 as shown in Formula (1), the distance can be calculated with a high accuracy only from the charge generated by the reflected light, excluding all the charges generated by the background light.

On the other hand, (B) of FIG. 14 shows a case where each of the non-controlled charges QB1, QB2, and QB3 is not the same, and shows each of the charges Q1, Q2, and Q3 at a large incident angle such as an incident angle of 20°. In the case of (B) of FIG. 14, even when the charge Q1 is subtracted from each of the charges Q2 and Q3 as shown in Formula (1), since the charge amount generated by the background light in each of the charges Q2 and Q3 is different from that in the charge Q1, a difference by the difference between each of the non-controlled charges QB1, QB2, and QB3 remains in the subtraction result, and all the charges generated by the background light cannot be removed, the distance cannot be calculated with a high accuracy.

In the related art, the charge amounts of the non-controlled charges QB1, QB2, and QB3 flowing from the photodiode PD into each of the charge accumulation units FD1, FD2, and FD3 are in a negligible ratio (percentage of error range) compared to the charge amount generated by the reflected light, collected in the photodiode PD, and distributed to each of the charge accumulation units FD1, FD2, and FD3 by turning on the readout gate transistors G1, G2, and G3, and the accuracy of the distance calculated from the above Formula (1) is also within the error range.

However, in order to increase a resolution of the distance image or to reduce the chip size of the distance image sensor 32, it is necessary to reduce the area for forming the pixel.

Therefore, the charge amount generated by the reflected light decreases in accordance with an area ratio, and the difference in the charge amounts of the non-controlled charges QB1, QB2, and QB3 becomes a non-negligible ratio compared to the charge amount generated by the reflected light, and the accuracy of the distance calculated by Formula (1) decreases as the pixel area is decreased.

In view of the above-described problems, an object of the present invention is to provide a distance image capturing device and a distance image capturing method that obtain the distance between the object and the device with the same accuracy as when the pixel is not reduced, even when the pixel area in the distance image sensor is reduced, without being affected by each of the non-controlled charges that differs in the charge amount depending on the incident angle of the incident light, included in each of the charges accumulated in the charge accumulation unit.

Solution to Problem

A distance image capturing device according to the present invention includes a light source unit configured to emit radiation light into a measurement space which is a space to be measured; a distance image sensor configured to receive light including reflected light from an object in the measurement space as incident light, accumulate charges generated by the incident light for each pixel, and generate a distance image formed from a charge amount of the charges accumulated for each pixel; and a distance image processing unit configured to store a signal value based on a non-controlled charge included in the charge amount regardless of a control of accumulating the charges in the distance image sensor, from the charge amount in the distance image, and correct the distance to the object in the space by using the stored signal value.

In the distance image capturing device according to the present invention, the distance image sensor includes a photoelectric conversion element that collects the charges generated in accordance with the incident light, a charge accumulation unit that accumulates the charges in a frame cycle, and a pixel circuit that performs a control of accumulating the charges in the charge accumulation unit, for each pixel, and the distance image processing unit subtracts an adjustment voltage corresponding to the charge amount of the non-controlled charge which is the charge flowing into the charge accumulation unit regardless of the control by the pixel circuit, from an input voltage corresponding to the charge amount accumulated in the charge accumulation unit, and measures the distance between the distance image sensor and the object.

In the distance image capturing device according to the present invention, the charge accumulation unit includes at least one first charge accumulation unit that accumulates a background light charge generated by receiving background light of the space and two or more second charge accumulation units that accumulate a reflected light charge generated by receiving the reflected light of the radiation light from the object.

The distance image capturing device according to the present invention further includes: a storage unit configured to store each of a reference background light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is not emitted under predetermined ambient light, and a reference standard voltage acquired from each of the first charge accumulation unit and the second charge accumulation unit without accumulating the charges controlled by the pixel circuit in each of the first charge accumulation unit and the second charge accumulation unit.

In the distance image capturing device according to the present invention, the distance image sensor emits the radiation light into the measurement space, receives light including the reflected light from the object in the measurement space as incident light, and accumulates the charges generated by the incident light in each of the first charge accumulation unit and the second charge accumulation unit, and the distance image processing unit divides a background light voltage generated by the charge accumulated in the first charge accumulation unit by the reference background light voltage measured in advance and stored in the storage unit to obtain an adjustment ratio, and calculates the adjustment voltage for each of the input voltages by multiplying each of the reference standard voltages by the adjustment ratio.

In the distance image capturing device according to the present invention, the frame cycle includes each of a first frame cycle and a second frame cycle, in the first frame cycle, the distance image sensor emits the radiation light into the measurement space, receives light including the reflected light from the object in the measurement space as incident light, and accumulates the charges controlled by the pixel circuit in each of the first charge accumulation unit and the second charge accumulation unit, and the distance image processing unit acquires the input voltage generated by the accumulated charges, and in the second frame cycle, the distance image sensor emits the radiation light into the measurement space, receives the light including reflected light from the object in the measurement space as the incident light, and does not accumulate the charges controlled by the pixel circuit in each of the first charge accumulation unit and the second charge accumulation unit, and the distance image processing unit acquires an adjustment voltage corresponding to the non-controlled charge in each of the first charge accumulation unit and the second charge accumulation unit.

The distance image capturing device according to the present invention further includes a storage unit configured to store each of a reference reflected light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is emitted in a light-shielded environment, and a reference standard voltage acquired from each of the first charge accumulation unit and the second charge accumulation unit without accumulating the charges controlled by the pixel circuit in each of the first charge accumulation unit and the second charge accumulation unit.

In the distance image capturing device according to the present invention, the distance image processing unit calculates each of the adjustment voltages for each of the input voltages by dividing a result obtained by adding each of the input voltages generated by the charges accumulated in each of the first charge accumulation unit and the second charge accumulation unit by a result obtained by adding each of the reference reflected light voltages to obtain an adjustment ratio, and multiplying the reference standard voltage by the adjustment ratio.

In the distance image capturing device according to the present invention, the frame cycle includes each of a first frame cycle and a second frame cycle, in the first frame cycle, the distance image sensor emits the radiation light into the measurement space in a light-shielded environment, receives light including the reflected light from the object in the measurement space as incident light, and accumulates the charges controlled by the pixel circuit in each of the first charge accumulation unit and the second charge accumulation unit, and the distance image processing unit acquires the input voltage generated by the charges accumulated in each of the first charge accumulation unit and the second charge accumulation unit, and in the second frame cycle, the distance image sensor emits the radiation light into the measurement space in the light-shielded environment, receives the light including the reflected light from the object in the measurement space as the incident light, and does not accumulate the charges controlled by the pixel circuit in each of the first charge accumulation unit and the second charge accumulation unit, and the distance image processing unit acquires an adjustment voltage corresponding to the non-controlled charge by the charges in each of the first charge accumulation unit and the second charge accumulation unit.

The distance image capturing device according to the present invention further includes a storage unit configured to store each of a reference background light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is not emitted under predetermined ambient light, a first reference standard voltage acquired as a reference standard voltage from each of the first charge accumulation unit and the second charge accumulation unit without accumulating the charges controlled by the pixel circuit in each of the first charge accumulation unit and the second charge accumulation unit, a reference reflected light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is emitted in a light-shielded environment, and a second reference standard voltage acquired as a reference standard voltage from each of the first charge accumulation unit and the second charge accumulation unit without accumulating the charges controlled by the pixel circuit in each of the first charge accumulation unit and the second charge accumulation unit.

In the distance image capturing device according to the present invention, the distance image sensor emits the radiation light into the measurement space, receives light including the reflected light from the object in the measurement space as incident light, and accumulates the charges generated by the incident light for each pixel, the distance image processing unit divides the input voltage generated by the accumulated charges by the reference background light voltage that is measured in advance and stored in the storage unit to obtain a first adjustment ratio as an adjustment ratio, and calculates a first adjustment voltage for each of the input voltages by multiplying each of the first reference standard voltages by the first adjustment ratio, and divides a result obtained by adding each of the input voltages by an addition result obtained by adding each of the reference reflected light voltages to obtain a second adjustment ratio as an adjustment ratio, calculates each of second adjustment voltages for each of the input voltages by multiplying the second reference standard voltage by the second adjustment ratio, and adds the first adjustment voltage and the second adjustment voltage to calculate the adjustment voltage.

The distance image capturing device according to the present invention further includes a storage unit configured to acquire each of a reference background light voltage acquired from each of the charge accumulation units by accumulating the charges controlled by the pixel circuit in each of N (N is an integer of 3 or more) charge accumulation units, measured in advance in a state where the radiation light is not emitted under predetermined ambient light, a first reference standard voltage acquired as a reference standard voltage from each of the charge accumulation units without accumulating the charges controlled by the pixel circuit in each of the charge accumulation units, a reference reflected light voltage acquired from each of the charge accumulation units by accumulating the charges controlled by the pixel circuit in each of the N charge accumulation units, measured in advance in a state where the radiation light is emitted in a light-shielded environment, and a second reference standard voltage acquired as a reference standard voltage from each of the charge accumulation units without accumulating the charges controlled by the pixel circuit in each of the charge accumulation units, and configured to store each of a reference background light control voltage corresponding to a charge amount of a controlled charge generated by the background light, collected in the photoelectric conversion element, distributed to and accumulated in each of the N charge accumulation units, obtained from each of the reference background light voltage and the first reference standard voltage, a reference background light non-controlled voltage corresponding to a charge amount of a non-controlled charge generated by the background light and flowing into each of the N charge accumulation units without being distributed, a reference reflected light control voltage corresponding to a charge amount of a controlled charge generated by the reflected light, collected in the photoelectric conversion element, distributed to and accumulated in each of the N charge accumulation units, and a reference reflected light non-controlled voltage corresponding to a charge amount of a non-controlled charge generated by the reflected light and flowing into and accumulated in each of the N charge accumulation units without being distributed.

The distance image capturing device according to the present invention further includes a distance calculation unit configured to calculate and obtain a first ratio as a ratio of a light amount of background light in the environment in which the measurement is performed in advance obtained from a portion or all of the reference background light voltage, the first reference standard voltage, the reference background light control voltage, and the reference background light non-controlled voltage, stored in the storage unit, in a state of capturing the distance image, to a light amount of background light in the capturing state, calculate and obtain a second ratio as a ratio of a light amount of reflected light in the environment in which the measurement is performed in advance obtained from a portion or all of the reference reflected light voltage, the second reference standard voltage, the reference reflected light control voltage, and the reference reflected light non-controlled voltage, stored in the storage unit, to a light amount of reflected light in the capturing state, and solve a simultaneous equation obtained by using each of the first ratio and the second ratio to calculate a reflected light control voltage corresponding to a charge amount of a controlled charge generated by the reflected light in the capturing state and accumulated in the charge accumulation unit thereby obtaining a distance to the object.

The distance image capturing device according to the present invention further includes a storage unit configured to obtain each of a reference reflected light voltage corresponding to a charge amount including a controlled charge accumulated by distribution, by performing a control of accumulating and distributing in each of the N charge accumulation units, and a non-controlled charge flowing into and accumulated regardless of the distribution, measured in advance in a state where the radiation light is emitted in a light-shielded environment, and a second reference standard voltage acquired as a reference standard voltage corresponding to a charge amount of a non-controlled charge flowing into and accumulated without being controlled to be accumulated in each of the charge accumulation units, and configured to store each of a reference reflected light control voltage corresponding to a charge amount of a controlled charge generated by the reflected light, collected in the photoelectric conversion element, and distributed to and accumulated in each of the N charge accumulation units, obtained from each of the reference reflected light voltage and the second reference standard voltage, and a reference reflected light non-controlled voltage corresponding to a charge amount of a non-controlled charge generated by the reflected light and flowing into and accumulated in each of the N charge accumulation units without being distributed.

In the distance image capturing device according to the present invention, in an acquisition state for acquiring the distance, the frame cycle includes each of a first frame cycle and a second frame cycle, in one of two frame cycles of the first frame cycle and the second frame cycle, the distance image sensor acquires a first reference standard voltage as a reference standard voltage corresponding to each of charge amounts of non-controlled charges accumulated in each of the N charge accumulation units without emitting the radiation light into the measurement space, in the other of the two frame cycles, the distance image sensor acquires a voltage for obtaining a distance, corresponding to a charge amount including each of a controlled charge accumulated by distribution from each of the charge accumulation units by emitting the radiation light into the measurement space and performing a control of distributing charges in each of the N charge accumulation units and a non-controlled charge flowing into regardless of distribution, and the distance image capturing device further includes a distance calculation unit configured to calculate and obtain a ratio of a light amount of reflected light in the environment in which the measurement is performed in advance obtained from a portion or all of the reference reflected light voltage, the second reference standard voltage, the first reference standard voltage, and the voltage for obtaining the distance, stored in the storage unit, to a light amount of reflected light in the acquisition state, and solve a simultaneous equation to calculate a reflected light control voltage corresponding to the charge amount of the controlled charge thereby obtaining a distance to the object.

In the distance image capturing device according to the present invention, when acquiring the distance in a light-shielded environment or a dark environment in which ambient light is negligible, the frame cycle includes each of a first frame cycle and a second frame cycle, in one of two frame cycles of the first frame cycle and the second frame cycle, the distance image sensor acquires a second reference standard voltage from each of the charge accumulation units by emitting the radiation light, receiving incident light from the measurement space, accumulating non-controlled charges that flow into each of the N charge accumulation units without accumulating the charges controlled by the pixel circuit, in the other of the two frame cycles, the distance image sensor acquires a reference reflected light voltage, which also serves as a voltage for acquiring a distance corresponding to the charge amount including each of the non-controlled charge and the controlled charge accumulated by being controlled by the pixel circuit, by emitting the radiation light, receiving the incident light from the measurement space, distributing and accumulating the charges from the photoelectric conversion element in each of the charge accumulation units by the control of the pixel circuit, and the distance image capturing device further includes a distance calculation unit configured to solve a simultaneous equation using the second reference standard voltage and the reference reflected light voltage to calculate only a reflected light control voltage corresponding to the charge amount of the controlled charge thereby obtaining the distance to the object.

The distance image capturing device according to the present invention further includes a lens configured to receive the incident light from the space, in which the distance image sensor receives the incident light via the lens.

The distance image capturing device according to the present invention further includes a lens configured to receive the incident light from the space, in which the incident light is incident on each of the pixels via the lens, and the pixels for which the adjustment ratio is within a predetermined difference range are divided into groups in correspondence with a characteristic of the lens, and a median value of the reference standard voltages in the group is set as a reference standard voltage for all the pixels in the group.

In the distance image capturing device according to the present invention, the incident light is incident on each of the pixels via the lens, and a plurality of characteristics of the lens are stored in the storage unit in correspondence with the characteristic of the lens.

In the distance image capturing device according to the present invention, the incident light is incident on each of the pixels via the lens, and an adjustment function that outputs the adjustment ratio corresponding to each of positions of the pixels is stored in the storage unit in correspondence with characteristic of the lens.

A distance image capturing method according to the present invention includes a distance image generation process of, by a distance image sensor, emitting radiation light into a measurement space which is a space to be measured from a light source unit, receiving light including reflected light from an object in the measurement space as incident light, accumulating charges generated by the incident light for each pixel, and generating a distance image having a charge amount of the charges accumulated for each pixel; and a distance image processing process of acquiring the distance to the object in the space from the charge amount in the distance image, by a corrected charge amount obtained by removing a non-controlled charge included in the charge amount regardless of a control of accumulating the charges in the distance image sensor.

Advantageous Effects of Invention

The present invention can provide a distance image capturing device and a distance image capturing method that obtain the distance between the object and the device with the same accuracy as when the pixel area is not reduced, even when the pixel area in the distance image sensor is reduced, without being affected by each of the non-controlled charges that differs in the charge amount depending on the incident angle of the incident light, included in each of the charges accumulated in the charge accumulation unit.

DESCRIPTION OF EMBODIMENTS

First Embodiment

Figure 1:
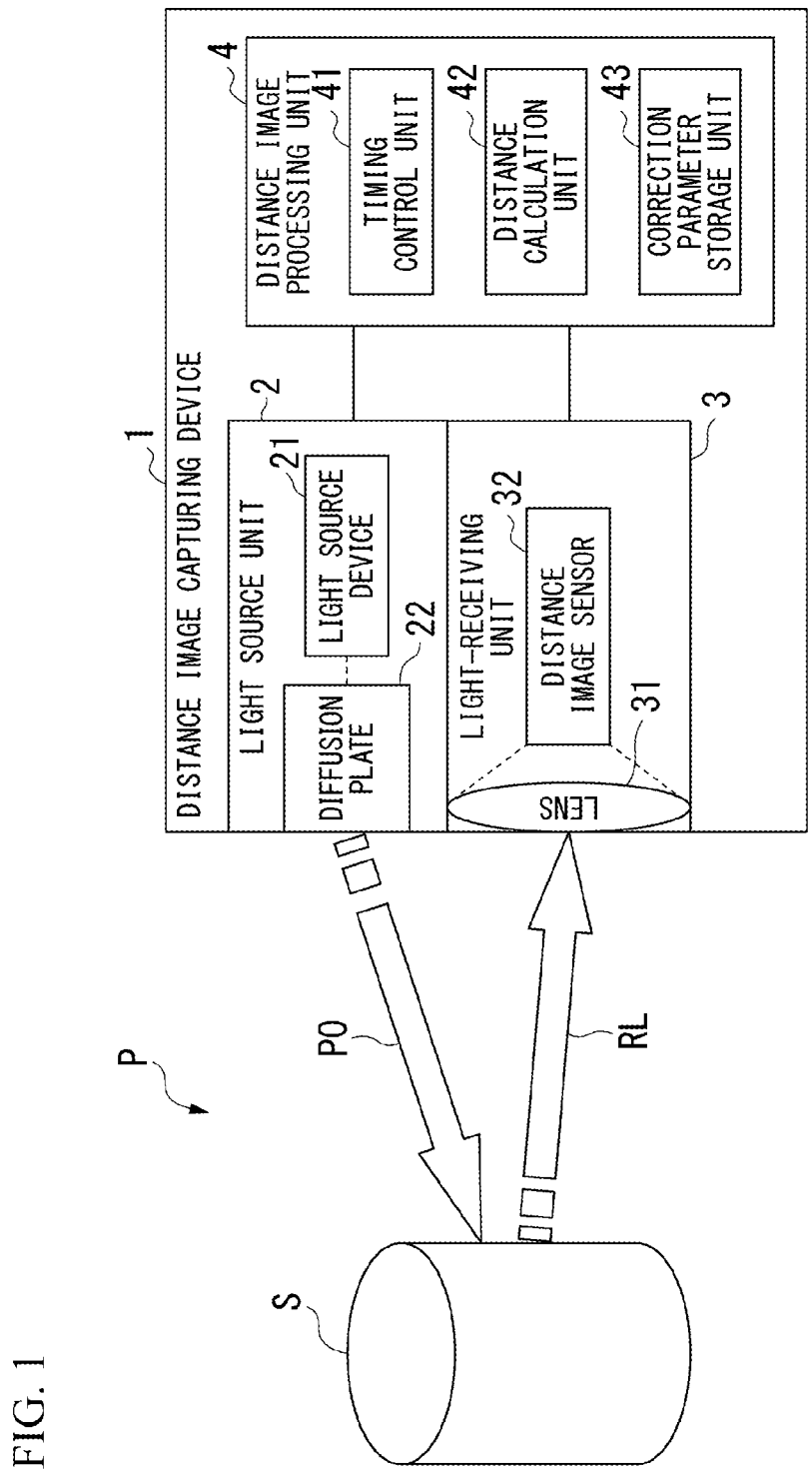
FIG. 1 is a block diagram showing a schematic configuration of a distance image capturing device according to a first embodiment of the present invention.

A first embodiment of the present invention will be described below with reference to the drawings. FIG. 1 is a block diagram showing a schematic configuration of a distance image capturing device according to a first embodiment of the present invention. Note that FIG. 1 also shows a subject S of which the distance thereto is to be measured by a distance image capturing device 1.

The distance image capturing device 1 configured as shown in FIG. 1 includes a light source unit 2, a light-receiving unit 3, and a distance image processing unit 4.

According to the control from the distance image processing unit 4, the light source unit 2 emits intermittent optical pulses PO at a predetermined cycle in a space (measurement space P) in which the subject S of which the distance is to be measured in the distance image capturing device 1 exists. The light source unit 2 is, for example, a surface emitting semiconductor laser module such as a vertical cavity surface emitting laser (VCSEL).

A light source device 21 is, for example, a light source that emits laser light in a near-infrared wavelength band (for example, a wavelength band with a wavelength of 850 nm to 940 nm) as the optical pulse PO that emits the subject S. The light source device 21 is, for example, a semiconductor laser light emitting element. The light source device 21 radiates the optical pulse as pulsed laser light in accordance with the control of a timing control unit 41.

A diffusion plate 22 is an optical component that diffuses the laser light in the near-infrared wavelength band emitted by the light source device 21 into a size of a predetermined cross-sectional area for emitting the measurement space P in which the subject S exists. The pulsed laser light diffused by the diffusion plate 22 is emitted from the light source unit 2 as the optical pulse PO, and emitted into the subject S in the measurement space P.

The light-receiving unit 3 receives reflected light RL of the optical pulse PO reflected by the subject S of which the distance thereto is to be measured in the distance image capturing device 1, and outputs a pixel signal corresponding to the received reflected light RL.

The lens 31 is an optical lens that guides the incident reflected light RL to the distance image sensor 32. The lens 31 emits the incident reflected light RL to the distance image sensor 32 side, and causes the pixel provided in the light receiving area of the distance image sensor 32 to receive (incident) the light.

The distance image sensor 32 is an image capturing element used in the distance image capturing device 1. The distance image sensor 32 includes a plurality of pixels in a two-dimensional light receiving area, and is an image capturing element having a distribution configuration provided with, in each pixel, one photoelectric conversion element, a plurality of charge accumulation units corresponding to the one photoelectric conversion element, and a component that distributes the charges to each of the charge accumulation units. The distance image sensor 32 distributes the charges generated by the photoelectric conversion element that composes the pixel to each of the charge accumulation units in accordance with the control from the timing control unit 41, and outputs pixel signals corresponding to the charge amounts distributed to each of the charge accumulation units.

Note that in the distance image sensor 32, a plurality of pixels are arranged in a two-dimensional grid pattern (matrix), and pixel signals for one frame corresponding to each of the pixels are output.

The distance image processing unit 4 is a control unit that controls the entire distance image capturing device 1 and is also a calculation unit that calculates the distance to the subject S to be measured in the distance image capturing device 1. The distance image processing unit 4 includes a timing control unit 41, a distance calculation unit 42, and a correction parameter storage unit 43.

The timing control unit 41 controls a timing at which the light source unit 2 emits the optical pulse PO into the subject S, a timing at which the distance image sensor 32 provided in the light-receiving unit 3 receives and accumulates the reflected light RL, and the like.

The distance calculation unit 42 outputs distance information obtained by calculating the distance between the distance image capturing device 1 and the subject S based on the pixel signal output from the distance image sensor 32. In addition, when calculating the distance information between the distance image capturing device 1 and the subject S, the distance calculation unit 42 subtracts and removes a voltage component corresponding to a non-controlled charge included in an input voltage used to calculate the distance, obtained from a charge amount in the pixel signal, from the input voltage as an adjustment voltage, obtains a corrected input voltage, and calculates the distance by Formula (1) (described in detail later).

The correction parameter storage unit 43 stores a correction parameter for generating the adjustment voltage to be subtracted from the input voltage when the distance calculation unit 42 removes the voltage corresponding to the non-controlled charge from the input voltage (described in detail later).

With such a configuration, in the distance image capturing device 1, the light-receiving unit 3 receives the reflected light RL in which the optical pulse PO in the near-infrared wavelength band emitted to the subject S by the light source unit 2 is reflected by the subject S, and the distance image processing unit 4 calculates and outputs the distance information obtained by measuring the distance to the subject S by the input voltage from which the voltage component corresponding to the non-controlled charge corresponding to the incident light is removed.

Although FIG. 1 shows the distance image capturing device 1 having a configuration in which the distance image processing unit 4 is provided inside, the distance image processing unit 4 may be a component provided outside the distance image capturing device 1.

Figure 2:
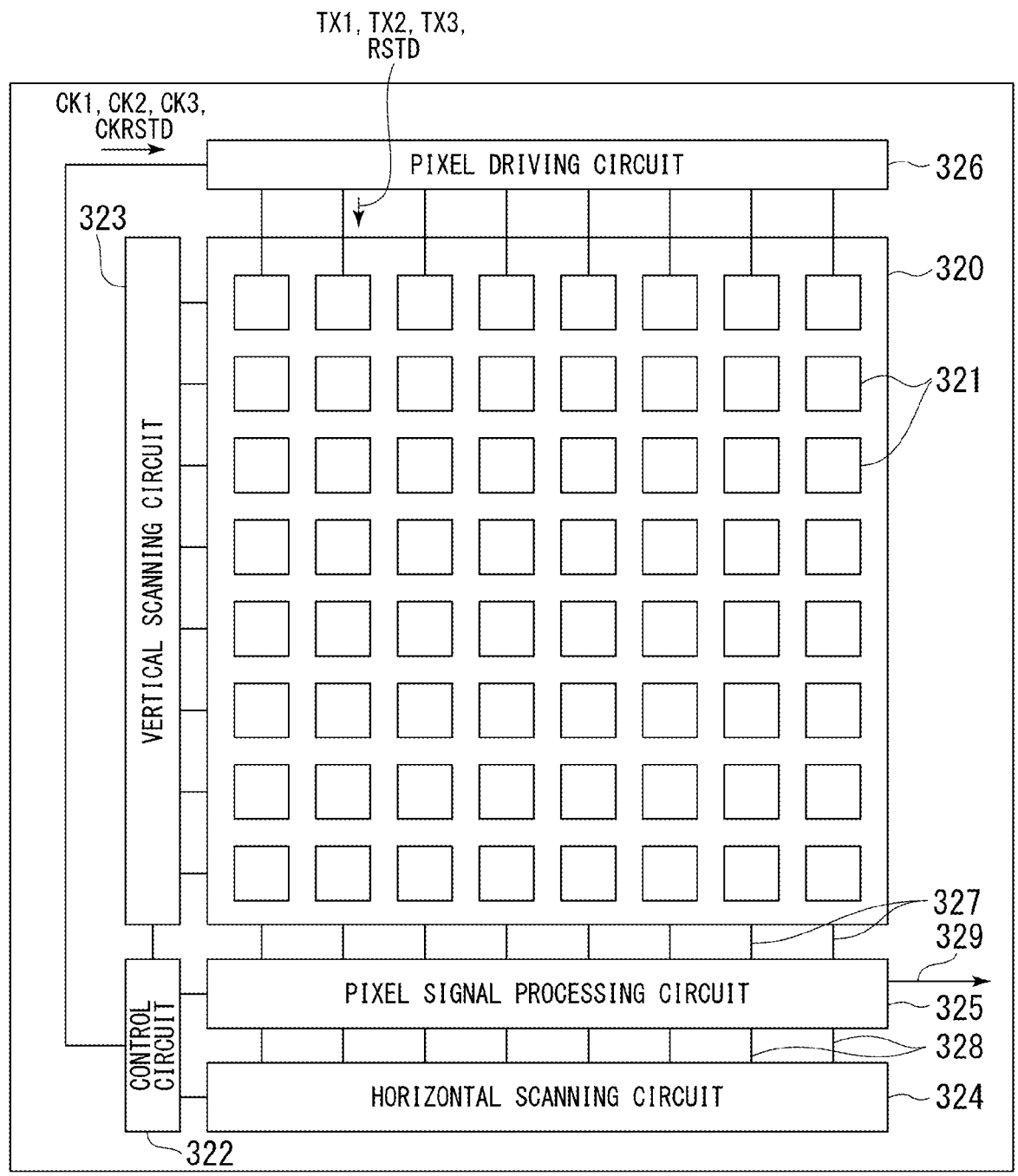
FIG. 2 is a block diagram showing a schematic configuration of an image capturing element (distance image sensor 32) used in a distance image capturing device 1 according to the first embodiment of the present invention.

Next, the configuration of the distance image sensor 32 used as the image capturing element in the distance image capturing device 1 will be described. FIG. 2 is a block diagram showing a schematic configuration of the image capturing element (distance image sensor 32) used in the distance image capturing device 1 according to the first embodiment of the present invention. In FIG. 2, the distance image sensor 32 includes a light-receiving pixel portion 320 in which a plurality of pixels 321 are arranged, a control circuit 322, a vertical scanning circuit 323, a horizontal scanning circuit 324, a pixel signal processing circuit 325, and a pixel driving circuit 326. Note that the distance image sensor 32 shown in FIG. 2 shows an example of the light-receiving pixel portion 320 in which a plurality of pixels 321 are arranged in a two-dimensional grid pattern in eight rows and eight columns.

The control circuit 322 controls components provided in the distance image sensor 32 such as the vertical scanning circuit 323, the horizontal scanning circuit 324, the pixel signal processing circuit 325, and the pixel driving circuit 326. For example, the control circuit 322 controls the operations of the components provided in the distance image sensor 32 according to control from the distance image processing unit 4 (more specifically, the timing control unit 41) included in the distance image capturing device 1. Note that the control of the components provided in the distance image sensor 32 by the control circuit 322 may be performed directly by the distance image processing unit 4 (more specifically, the timing control unit 41), for example. In this case, the distance image sensor 32 may be configured without the control circuit 322.

The pixel driving circuit 326 outputs an accumulation drive signal (accumulation drive signals TX1, TX2, and TX3, which is described later) that distributes and accumulates charges generated by the photoelectric conversion element (also referred to as photoelectric conversion element PD or photodiode PD described later) provided in the pixels 321 arranged in a grid pattern to a plurality of charge accumulation units (charge accumulation units CS1, CS2, and CS3 which will be described later) provided in the pixels 321, reset signals (reset signals RST1, RST2, and RST3 described later), and a reset drive signal (reset drive signal RSTD to be described later) for each column of the pixels 321 arranged in a grid pattern in the light-receiving pixel portion 320.

The vertical scanning circuit 323 is a driving circuit that controls each of the pixels 321 arranged in the light-receiving pixel portion 320 in accordance with the control from the control circuit 322, and causes each pixel 321 to output (read) a signal of a voltage (hereinafter, referred to as "voltage signal") corresponding to the charge amount obtained by photoelectrically converting incident light to a corresponding vertical signal line 327. The vertical scanning circuit 323 outputs control signals (selection drive signals SEL1, SEL2, and SEL3 which will be described later) for driving (controlling) and reading out the pixels 321 for each row of the pixels 321 arranged in a grid pattern in the light-receiving pixel portion 320.

Accordingly, a voltage signal corresponding to the charge amount distributed to each of the charge accumulation units (charge accumulation units CS1, CS2, and CS3 which will be described later) in the pixel 321 is read out to each of the vertical signal lines 327 corresponding to each column of the light-receiving pixel portion 320 and output to the pixel signal processing circuit 325.

In the light-receiving pixel portion 320, the pixel 321 receives the reflected light RI, in which the optical pulse PO emitted from the light source unit 2 to the subject S is reflected by the subject S, and generates the charge corresponding to the light amount (the amount of received light) of the received reflected light RL. In each pixel 321, by outputting an accumulation drive signal, the pixel driving circuit 326 distributes and accumulates the charge corresponding to the light amount (the amount of received light) of the received reflected light RL in one of the plurality of charge accumulation units. Then, in the pixel 321, by outputting the selection drive signal as a readout drive signal, the vertical scanning circuit 323 outputs a voltage signal having a magnitude corresponding to the charge amount of the charge distributed to and accumulated in each of the charge accumulation units to the corresponding vertical signal line 327. Note that a detailed description of the configuration and driving (controlling) method of the pixel 321 will be described later.

The pixel signal processing circuit 325 is a signal processing circuit that performs predetermined signal processing on the voltage signal output to the corresponding vertical signal line 327 from the pixel 321 in each of the columns in accordance with the control from the vertical scanning circuit 323. The predetermined signal processing includes, for example, noise suppression processing of suppressing noise included in the voltage signals by correlated double sampling (CDS).

Note that the pixel signal processing circuit 325 may be a pixel signal processing circuit group including a plurality of pixel signal processing circuits corresponding to each of the columns of the light-receiving pixel portion 320. In this case, the pixel signal processing circuit 325 outputs the voltage signal after the predetermined signal processing to an AD conversion circuit provided therein according to the control from the control circuit 322, and the AD conversion circuit outputs the AD-converted digital value to a horizontal signal line 329 for each row of the light-receiving pixel portion 320 under the control of the horizontal scanning circuit 324.

The vertical scanning circuit 323 sequentially outputs the readout drive signals for outputting the voltage signals corresponding to the pixel 321 in each of the columns to the pixel signal processing circuit 325.

The horizontal scanning circuit 324 causes the horizontal signal line 329 to sequentially output (read) the digital values obtained by AD converting the voltage signals after the signal processing according to the control from the control circuit 322. Accordingly, the voltage signals for one frame after the signal processing output from the pixel signal processing circuit 325 are sequentially output to the outside of the distance image sensor 32 via the horizontal signal line 329 as the pixel signals for one frame. At this time, the distance image sensor 32 outputs the voltage signal after the signal processing to the outside of the distance image sensor 32 as the pixel signal from an output circuit (not shown) such as an output amplifier.

In the following description, it is assumed that the pixel signal processing circuit 325 provided in the distance image sensor 32 performs noise suppression processing on the voltage signal output from the pixel 321, and then performs A/D conversion processing in the AD conversion circuit and outputs the voltage signal, that is, outputs the voltage signal converted into a digital value from the horizontal signal line 329.

Figure 3:
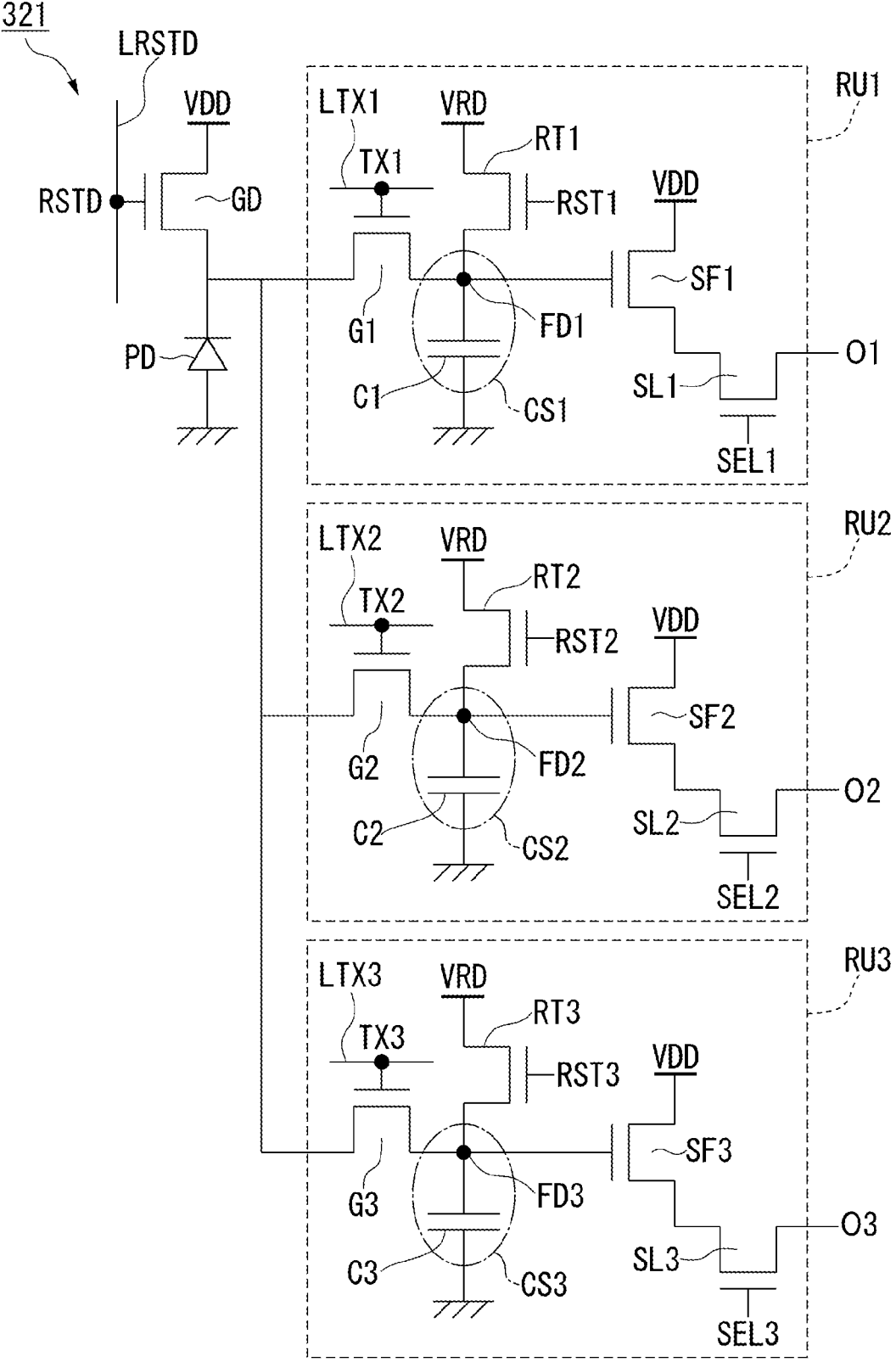
FIG. 3 is a circuit diagram showing an example of a configuration of pixels 321 arranged in a light-receiving pixel portion 320 of the image capturing element (distance image sensor 32) used in the distance image capturing device 1 according to the first embodiment of the present invention.

Next, the configuration of the pixels 321 arranged in the light-receiving pixel portion 320 included in the distance image sensor 32 will be described. FIG. 3 is a circuit diagram showing an example of the configuration of the pixels 321 arranged in the light-receiving pixel portion 320 of the image capturing element (distance image sensor 32) used in the distance image capturing device 1 according to the embodiment of the present invention. FIG. 3 shows an example of the configuration of one pixel 321 among the plurality of pixels 321 arranged in the light-receiving pixel portion 320. The pixel 321 is an example of a configuration including three pixel signal readout units.

The pixel 321 includes one photoelectric conversion element PD, a drain gate transistor GD, and three pixel signal readout units RU for outputting voltage signals from corresponding output terminals O. Each of the pixel signal readout units RU includes a readout gate transistor G, a floating diffusion FD, a charge accumulation capacitor C, a reset gate transistor RT, a source follower gate transistor SF, and a selection gate transistor SL. In each of the pixel signal readout units RU, the floating diffusion FD, and the charge accumulation capacitor C constitute a charge accumulation unit CS. The drain gate transistor GD, readout gate transistor G, reset gate transistor RT, source follower gate transistor SF, and selection gate transistor SL are N-channel MOS transistors.

In FIG. 3, the pixel signal readout units RU are distinguished by adding a number "1", "2", or "3" after the symbol "RU" of the three pixel signal readout units RU. In addition, similarly, for each component provided in each of the three pixel signal readout units RU, a number representing each pixel signal readout unit RU is indicated after the reference numeral to distinguish the pixel signal readout unit RU corresponding to each component. In the pixel 321 shown in FIG. 3, a pixel signal readout unit RU1 that outputs a voltage signal from an output terminal O1 includes a gate transistor G1, a floating diffusion FD1, a charge accumulation capacitor C1, a reset gate transistor RT1, a source follower gate transistor SF1, and a selection gate transistor SL1. In the pixel signal readout unit RU1, the charge accumulation unit CS1 is composed of the floating diffusion FD1 and the charge accumulation capacitor C1. A pixel signal readout unit RU2 and a pixel signal readout unit RU3 also have the same configuration.

The photoelectric conversion element PD is an embedded photodiode that photoelectrically converts incident light to generate a charge and accumulates the generated charge. Note that in the present invention, the structure of the photoelectric conversion element PD provided in the pixel 321 is not particularly defined. For this reason, the photoelectric conversion element PD may be, for example, a PN photodiode having a structure in which a P-type semiconductor and an N-type semiconductor are joined together, or a PIN photodiode having a structure in which an I-type semiconductor is sandwiched between a P-type semiconductor and an N-type semiconductor. In addition, the photoelectric conversion element provided in the pixel 321 is not limited to a photodiode, and may be, for example, a photogate type photoelectric conversion element.

The drain gate transistor GD is a transistor for discarding the charge generated and accumulated by the photoelectric conversion element PD and not transferred to each pixel signal readout unit RU in accordance with the drive signal input from the vertical scanning circuit 323. In other words, the drain gate transistor GD is a transistor that resets the charge generated by the photoelectric conversion element PD and not used for measuring the distance to the subject S.

The readout gate transistor G is a transistor for transferring the charge generated and accumulated by the photoelectric conversion element PD to the corresponding charge accumulation unit CS in accordance with the drive signal input from the vertical scanning circuit 323. The charge transferred by the readout gate transistor G is held (accumulated) in the corresponding charge accumulation unit CS.

Here, in the pixel signal readout unit RU1, the readout gate transistor G1 has a source coupled to a second terminal of the photoelectric conversion element PD, a gate coupled to a signal line LTX1 that propagates the accumulation drive signal TX1, and a drain coupled to the floating diffusion FD1 and a first terminal of the charge accumulation capacitor C1.

Similarly, in the pixel signal readout unit RU2, the readout gate transistor G2 has a source coupled to a second terminal of the photoelectric conversion element PD, a gate coupled to a signal line LTX2 that propagates the accumulation drive signal TX2, and a drain coupled to the floating diffusion FD2 and a first terminal of the charge accumulation capacitor C2.

In addition, similarly, in the pixel signal readout unit RU3, the readout gate transistor G3 has a source coupled to a second terminal of the photoelectric conversion element PD, a gate coupled to a signal line LTX3 that propagates the accumulation drive signal TX3, and a drain coupled to the floating diffusion FD3 and a first terminal of the charge accumulation capacitor C3.

Each of the accumulation drive signals TX1, TX2, and TX3 described above is supplied from the pixel driving circuit 326 via each of the signal lines LTX1, LTX2, and LTX3.

The charge accumulation capacitor C is a capacitor that holds (accumulates) the charge transferred by the corresponding readout gate transistor G.

The reset gate transistor RT is a transistor for discarding the charge held in the corresponding charge accumulation unit CS in accordance with the drive signal input from the vertical scanning circuit 323. That is, the reset gate transistor RT is a transistor that resets the charge held in the corresponding charge accumulation unit CS.

The source follower gate transistor SF is a transistor for amplifying a voltage signal corresponding to the charge amount accumulated in the charge accumulation unit CS coupled to the gate terminal and outputting it to the corresponding selection gate transistor SL.

The selection gate transistor SL is a transistor for outputting a voltage signal amplified by the corresponding source follower gate transistor SF from the corresponding output terminal O in accordance with the drive signal input from the vertical scanning circuit 323.

With the above-described configuration, in the pixel 321, the charge generated by photoelectric conversion of incident light by the photoelectric conversion element PD is distributed to each of the three charge accumulation units CS, and each of the voltage signals corresponding to the charge amount of the distributed charge is output to the pixel signal processing circuit 325.

The configuration of the pixels arranged in the distance image sensor 32 is not limited to the configuration including the three pixel signal readout units RU as shown in FIG. 3, and may be any pixel of configuration as long as it includes one photoelectric conversion element PD and a plurality of pixel signal readout units RU for distributing the charges generated and accumulated by the photoelectric conversion element PD. That is, the number of pixel signal readout units RU (charge accumulation units CS) provided in the pixels arranged in the distance image sensor 32 may be two, or may be four or more.

In addition, in the pixel 321 having the configuration shown in FIG. 3, an example in which the charge accumulation unit CS is configured by the floating diffusion FD and the charge accumulation capacitor C is shown. However, the charge accumulation unit CS may be composed of at least the floating diffusion FD. In other words, the pixel 321 may be configured without each of the charge accumulation capacitors C. This configuration has an effect of increasing a charge detection sensitivity (charge-voltage conversion gain CG). However, considering widening a dynamic range in the distance measurement in the distance image capturing device 1, a configuration that can hold (accumulate) a larger amount of charges is superior. For this reason, the pixel 321 is configured to be able to hold (accumulate) a larger amount of charges than in a case where the charge accumulation unit CS is composed only of the floating diffusion FD by providing the charge accumulation capacitor C in the pixel signal readout unit RU and configuring the charge accumulation unit CS with the floating diffusion FD and the charge accumulation capacitor C.

In addition, in the pixel 321 having the configuration shown in FIG. 3, although an example of the configuration including the drain gate transistor GD is shown, when it is not necessary to discard the charge accumulated (remaining) by the photoelectric conversion element PD, the pixels arranged in the distance image sensor 32 may be configured without the drain gate transistor GD.

Figure 4:
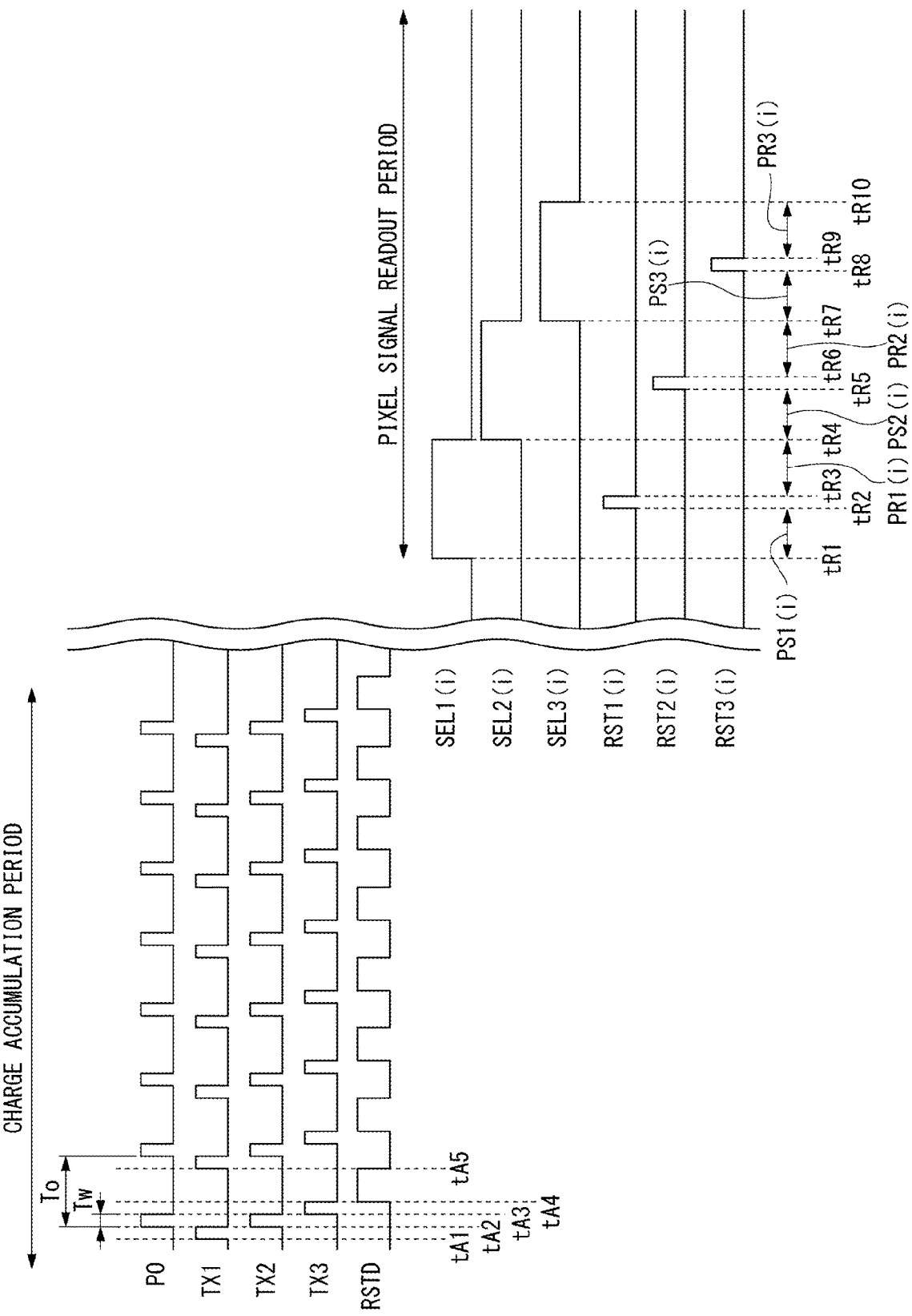
FIG. 4 is a timing chart showing a timing of driving the pixels 321 arranged in the light-receiving pixel portion 320 of the image capturing element (distance image sensor 32) used in the distance image capturing device 1 according to the first embodiment of the present invention.

Next, a method (timing) of driving (controlling) the pixel 321 in the distance image capturing device 1 will be described. FIG. 4 is a timing chart showing a timing of driving the pixels 321 arranged in the light-receiving pixel portion 320 of the image capturing element (distance image sensor 32) used in the distance image capturing device 1 according to the embodiment of the present invention. FIG. 4 shows a timing of the driving signal of the pixel 321 when causing the distance image sensor 32 to output pixel signals for one frame, and a timing of the optical pulse PO with which the light source unit 2 emits the subject S.

First, the driving (control) of the pixel 321 during a charge accumulation period in which the charges generated and accumulated by the photoelectric conversion element PD in accordance with the light amount of received light (the amount of received light) are distributed to each of the pixel signal readout units RU will be described. During the charge accumulation period, the light source unit 2 emits the optical pulse PO into the subject S. Then, by driving the pixel 321 in synchronization with the timing of emitting of the optical pulse PO, charges corresponding to the received background light and reflected light RI, are distributed to each of the charge accumulation units CS. The pixel driving circuit 326 simultaneously drives all the pixels 321 arranged in the light-receiving pixel portion 320, that is, so-called global shutter driving, to distribute and accumulate the charges in each of the charge accumulation units CS provided in all the pixels 321. The time during which the light source device 21 emits the pulsed laser light, that is, a pulse width Tw of the optical pulse PO is a predetermined very short time such as 10 nS. The reason is that a maximum measurement distance (hereinafter, referred to as "maximum measurement distance") is determined by the pulse width Tw of the optical pulse PO in the distance measurement by a pulse modulation method. When the pulse width Tw of the optical pulse PO described above is 10 nS, the maximum measurement distance is 1.5 m. In addition, when the pulse width Tw of the optical pulse PO is simply increased, that is, when the light emission time of the laser light in the light source device 21 is increased, although the photoelectric conversion element PD can receive a larger amount of reflected light RL, the resolution of the distance to the subject S to be measured is decreased. On the other hand, when the pulse width Tw of the optical pulse PO is short, the charge amount of the charge generated by photoelectric conversion by the photoelectric conversion element PD is also small. For this reason, in the distance image capturing device 1, emission of the optical pulse PO and charge distribution are performed a plurality of times so that a sufficient amount of charges are accumulated in each of the charge accumulation units CS during the charge accumulation period.

Here, a configuration in which each of the vertical scanning circuit 323 and the pixel driving circuit 326 drives (controls) the pixel 321 will be described. In the following description, the control circuit 322 outputs each of clock signals CK1, CK2, CK3, and CKRSTD for generating each of the accumulation drive signals TX1, TX2, and TX3 and a reset drive signal RSTD to the pixel driving circuit 326. In addition, the control circuit 322 outputs each of clock signals for generating each of selection drive signals SEL1, SEL2, and SEL3 and the reset signals RST1, RST2, and RST3 to the vertical scanning circuit 323.

In the charge accumulation period of the timing chart shown in FIG. 4, a driving timing of the pixel 321 when the emission of the optical pulse PO and the distribution of the charges in all the pixels 321 are performed a plurality of times is shown. Note that the description will be made assuming that, for the optical pulse PO in the charge accumulation period of the timing chart shown in FIG. 4, the optical pulse PO is emitted (the light source device 21 emits laser light) when it is at a "H (high)" level, and the emission of the optical pulse PO is stopped (the light source device 21 is turned off) when it is at a "L (Low)" level. Further, the timing chart shown in FIG. 4 will be described assuming that it is started from a state where all the pixels 321 are reset, that is, no charge is accumulated in the photoelectric conversion element PD and the charge accumulation unit CS.

In the charge accumulation period of the timing chart shown in FIG. 4, a driving timing of the pixel 321 when the emission of the optical pulse PO and the distribution of the charges in all the pixels 321 are performed a plurality of times is shown. As signal levels shown in FIG. 4, a voltage value on the higher side of the binary voltage pulse is "H" level, and a voltage value on the lower side is "L" level.

In the following description, times tA1 to tA5 are accumulation cycles for charge distribution, and a plurality of accumulation cycles are repeated during the charge accumulation period. In addition, for example, the time widths between times tA1, tA2, tA3, and tA4, that is, the pulse widths of each of the optical pulse PO and the accumulation drive signals TX1, TX2, and TX3 are the same Tw.

In the charge accumulation period, first, the pixel driving circuit 326 transfers and accumulates the charge corresponding to the background light before emission of the optical pulse PO, generated by photoelectric conversion by the photoelectric conversion element PD from time tA1 earlier by the same time as the pulse width Tw at which the light source unit 2 emits the optical pulse PO, to the charge accumulation unit CS1 via the readout gate transistor G1.

Thereafter, from time tA2, which is the same as the timing at which the light source unit 2 emits the optical pulse PO, the pixel driving circuit 326 transfers and accumulates the charge generated in accordance with light currently photoelectrically converted by the photoelectric conversion element PD to the charge accumulation unit CS2 via the readout gate transistor G2. Here, the charge accumulated in the charge accumulation unit CS2 is the charge corresponding to the reflected light RL reflected by the subject S within the time of the pulse width Tw during which the optical pulse PO is emitted. This charge includes, in addition to the charge corresponding to the background light, the charge corresponding to the reflected light RL incident with a small delay time proportional to the distance (absolute distance) to the subject S. More specifically, for example, when the subject S exists close to the subject S, the emitted optical pulse PO is reflected by the subject S in a short time and returns as the reflected light RL, and thus the charge accumulation unit CS2 includes a larger amount of charges corresponding to the reflected light RL reflected by the subject S existing in the close position.

Thereafter, from time tA3, which is the same as the timing at which the light source unit 2 stops emitting the optical pulse PO, the pixel driving circuit 326 transfers and accumulates the charges generated in accordance with the light currently photoelectrically converted by the photoelectric conversion element PD to the charge accumulation unit CS3 via the readout gate transistor G3. Here, the charge accumulated in the charge accumulation unit CS3 is the charge corresponding to the reflected light RL reflected by the subject S outside the time of the pulse width Tw during which the optical pulse PO is emitted. This charge includes, in addition to the charge corresponding to the background light, the charge corresponding to the reflected light RL incident with a large delay time proportional to the distance (absolute distance) to the subject S. More specifically, for example, when the subject S exists at a distant position, the emitted optical pulse PO takes a longer time to be reflected by the subject S and returns as the reflected light RL, and thus the charge accumulation unit CS3 includes a larger amount of charges corresponding to the reflected light RL reflected by the subject S existing at the distant position.

After that, from time tA4 when the same time as the pulse width Tw during which the light source unit 2 emits the optical pulse PO has passed, the pixel driving circuit 326 discards the charge generated in accordance with the light currently photoelectrically converted by the photoelectric conversion element PD, that is, the charge not used for measuring the distance to the subject S via the drain gate transistor GD. In other words, the photoelectric conversion element PD is reset.

After that, the pixel driving circuit 326 cancels the reset of the photoelectric conversion element PD at time tA5 earlier by the same time as the pulse width Tw during which the light source unit 2 emits the optical pulse PO next. Then, the pixel driving circuit 326, similarly to the timing from time tA1, transfers and accumulates the charge generated by photoelectric conversion by the photoelectric conversion element PD next, that is, the charge according to the background light before being emitted with the optical pulse PO next, to the charge accumulation unit CS1 via the readout gate transistor G1.

After that, the pixel driving circuit 326 repeats driving (hereinafter, referred to as "charge distribution driving") of the pixel 321 similar to that from time tA1 to time tA5. Accordingly, in the charge accumulation period, the charge amount corresponding to repeated charge distribution driving is accumulated and held in each of the charge accumulation units CS provided in all the pixels 321. Note that the maximum number of times the charge distribution driving is repeated in the charge accumulation period is determined by the cycle during which the distance image sensor 32 outputs (acquires) pixel signals for one frame. More specifically, it is the number of quotients obtained by dividing the time obtained by subtracting the pixel signal readout period from the time required for the distance image sensor 32 to acquire pixel signals for one frame by the time during which the light source device 21 emits pulsed laser light, that is, a pulse cycle time To of the optical pulse PO. In the distance image sensor 32, the greater the number of times the charge distribution driving is performed, the greater the charge amount accumulated (integrated) in each of the charge accumulation units CS, resulting in the higher sensitivity.

Accordingly, the distance image sensor 32 can improve the resolution of the distance to the subject S to be measured.

Subsequently, the driving (control) of the pixel 321 during the pixel signal readout period in which, after the charge accumulation period ends, the voltage signals corresponding to the charge amounts distributed to each of the charge accumulation units CS provided in each of the pixel signal readout units RU are sequentially output for each row of the pixels 321 arranged in the light-receiving pixel portion 320 will be described. In the pixel signal readout period, by so-called rolling driving, in which the pixels 321 arranged in the light-receiving pixel portion 320 are driven row by row, voltage signals corresponding to the charge amounts accumulated (integrated) and held in the charge accumulation units CS provided in the pixels 321 arranged in the corresponding row are output to the pixel signal processing circuit 325 in row order.

As described above, in the distance image sensor 32, the pixel signal processing circuit 325 performs predetermined signal processing such as noise suppression processing and A/D conversion processing on the voltage signals output from each of the pixels 321. Here, the correlated double sampling (CDS) processing performed by the pixel signal processing circuit 325 as noise suppression processing is processing of obtaining the difference between a voltage signal (hereinafter, referred to as "distance pixel voltage signal PS") corresponding to the charge amount accumulated (integrated) and held in the charge accumulation unit CS and a voltage signal (hereinafter, referred to as "reset voltage signal PR") corresponding to the charge amount in a state (reset state) where the charge accumulation unit CS is reset. For this reason, in the pixel signal readout period, the voltage signals of each of the distance pixel voltage signal PS and the reset voltage signal PR corresponding to each of the charge accumulation units CS provided in each of the pixels 321 are output to the pixel signal processing circuit 325 in row order.

During the pixel signal readout period of the timing chart shown in FIG. 4, when a plurality of pixels 321 are arranged in y rows (y is an integer of 1 or more) in a horizontal direction (row direction) and x columns (x is an integer of 1 or more) in a vertical direction (column direction) of the light-receiving pixel portion 320, the drive timing of the distance pixel 321 when voltage signals of each of the distance pixel voltage signal PS (i) and the reset voltage signal PR (i) is output from each of the pixels 321 (i) arranged in an i-th row ($1 \leq i \leq y$) of the light-receiving pixel portion 320 is shown. Note that in the timing chart shown in FIG. 4, each of the voltage signals is output in the order of charge accumulation units CS1(i), CS2(i), and CS3(i) provided in each of the pixels 321(i).

In the pixel signal readout period, first, during the period from time tR1 to time tR2, the vertical scanning circuit 323 outputs a distance pixel voltage signal PS1(i) from an output terminal O1(i) to the pixel signal processing circuit 325 via the vertical signal line. Accordingly, the pixel signal processing circuit 325 temporarily holds the distance pixel voltage signal PS1(i) output from a pixel signal readout unit RU1(i) via the vertical signal line.

After that, during the period from time tR3 to time tR4, the vertical scanning circuit 323 outputs a reset voltage signal PR1(i) from the output terminal O1(i) to the pixel signal processing circuit 325 via the vertical signal line. Accordingly, the pixel signal processing circuit 325 obtains the difference between the temporarily held distance pixel voltage signal PS1(i) and the reset voltage signal PR1(i) output from the pixel signal readout unit RU1(i) via the vertical signal line, that is, suppresses noise included in the voltage signal corresponding to the charge amount accumulated (integrated) and held in the charge accumulation unit CS1(i).

After that, during the period from time tR4 to time tR7, as in the period from time tR1 to time tR4, the vertical scanning circuit 323 outputs a distance pixel voltage signal PS2(i) and a reset voltage signal PR2(i) from an output terminal O2(i) to the pixel signal processing circuit 325 via the vertical signal line. Furthermore, during the period from time tR7 to time tR10, as in the period from time tR1 to time tR4, the vertical scanning circuit 323 outputs a distance pixel voltage signal PS3(i) and a reset voltage signal PR3(i) from an output terminal O3(i) to the pixel signal processing circuit 325 via the vertical signal line.

Thereafter, the vertical scanning circuit 323 sequentially drives (hereinafter, referred to as "pixel signal readout driving") the pixels 321 in the same manner as from time tR1 to time tR10 for each of the pixels 321 (for example, each of the pixels 321 arranged in an i+1 row) arranged in the other rows of the light-receiving pixel portion 320, and sequentially outputs each of the voltage signals from all the pixels 321 arranged in the light-receiving pixel portion 320.

With such a method (timing) of driving (controlling), the pixel driving circuit 326 distributes the charges generated and accumulated by the photoelectric conversion element PD in each of the pixels 321 arranged in the light-receiving pixel portion 320 to each of the pixel signal readout units RU a plurality of times.

In addition, the vertical scanning circuit 323 sequentially outputs voltage signals corresponding to the charge amounts accumulated (integrated) in the charge accumulation units CS provided in the pixel signal readout units RU to the pixel signal processing circuit 325 via the vertical signal line.

Note that the pixel signal processing circuit 325 performs A/D conversion processing on each voltage signal of which noise is suppressed for each row. Then, the horizontal scanning circuit 324 sequentially outputs the voltage signals (digitized voltage signals) of each row after the A/D conversion processing by the pixel signal processing circuit 325 via the horizontal signal line in the order of the columns of the light-receiving pixel portion 320. Accordingly, the distance image sensor 32 outputs pixel signals (pixel signals VQ1, VQ2, and VQ3 corresponding to each of the charge amounts Q1, Q2, and Q3 of each of the charge accumulation units CS1, CS2, and CS3) of all the pixels 321 for one frame to the outside. Accordingly, in the distance image capturing device 1, the pixel signals (pixel signals VQ1, VQ2, and VQ3) for one frame of the captured image are output to the distance calculation unit 42 in so-called raster order.

Note that as can also be seen from the driving (control) timing of the pixels 321 shown in FIG. 4, each of the pixel signals for one frame includes three voltage signals corresponding to each of the three pixel signal readout units RU (charge accumulation units CS) provided in the corresponding pixel 321. Based on the pixel signals for one frame output from the distance image sensor 32, the distance calculation unit 42 calculates the distance to the subject S for each pixel signal, that is, for each pixel 321.

Here, a method of calculating the distance between the distance image capturing device 1 and the subject S in the distance calculation unit 42 will be described. Here, the charge amount corresponding to the background light before the optical pulse PO distributed to the charge accumulation unit CS1 of the pixel signal readout unit RU1 is emitted is assumed to be a charge Q1. In addition, the charge amount corresponding to the reflected light RL incident with a short delay time from the background light distributed to the charge accumulation unit CS2 of the pixel signal readout unit RU2 is assumed to be a charge Q2. In addition, the charge amount corresponding to the reflected light RL incident with a large delay time from the background light distributed to the charge accumulation unit CS3 of the pixel signal readout unit RU3 is assumed to be a charge Q3. The distance calculation unit 42 obtains a distance L between each of the pixels 321 and the subject S by Formula (1) already described.

As described above, the distance image capturing device 1 obtains the distance L between the device and the subject S for each of the pixels 321 arranged in the light-receiving pixel portion 320 of the distance image sensor 32.

Note that as described above, the configuration of the pixels arranged in a grid pattern in the distance image sensor 32 is not limited to the configuration provided with the three pixel signal readout units RU1, RU2, and RU3 as shown in FIG. 3, and may be the pixels 321 having a configuration including one photoelectric conversion element PD and two or more pixel signal readout units RU for distributing charges generated and accumulated by the photoelectric conversion element PD. In this case, even in a distance image sensor in which pixels having different numbers of pixel signal readout units RU are arranged, the method (timing) of driving (controlling) the pixels can be easily realized by considering similarly to the method (timing) of driving (controlling) the pixels 321 in the distance image capturing device 1 shown in FIG. 4. More specifically, in a cycle that maintains a phase relationship so that phases of the drive signals input to the readout gate transistor G and the drain gate transistor GD provided in each of the pixel signal readout units RU do not overlap each other, by repeating charge distribution driving for the pixels, similarly to the distance image sensor 32, the charges in accordance with the corresponding light can be accumulated (integrated) in the charge accumulation unit CS provided in each pixel signal readout unit RU. Further, by sequentially outputting each of the voltage signals from all the pixels by the pixel signal readout driving, the pixel signals for one frame can be output to the outside of the distance image sensor, similarly to the distance image sensor 32. Accordingly, based on the pixel signals for one frame output from the distance image sensor in which pixels having different numbers of pixel signal readout units RU are arranged, the distance calculation unit 42 can similarly obtain the distance L between the distance image capturing device 1 and the subject S for each of the pixel signals (for each of the pixels).

In the present embodiment, in order to remove the voltage component of the non-controlled charge, as the correction parameter, a voltage corresponding to the charge amount of the non-controlled charge is acquired as a reference standard voltage in each of the charge accumulation units CS1, CS2, and CS3 by the following processing in advance, and written and stored in the correction parameter storage unit 43.

Similarly, a voltage corresponding to the charge amount generated by the background light is acquired as a reference background light voltage in each of the charge accumulation units CS1, CS2, and CS3, and is written and stored in the correction parameter storage unit 43.

In the present embodiment, data of the reference standard voltage corresponding to the non-controlled charge generated by the background light and the reference background light voltage corresponding to the background light charge generated by the background light are acquired in advance, for example, when the distance image capturing device 1 is shipped or activated, that is, before capturing a distance image, and is written and stored in the correction parameter storage unit 43.

Figure 5:
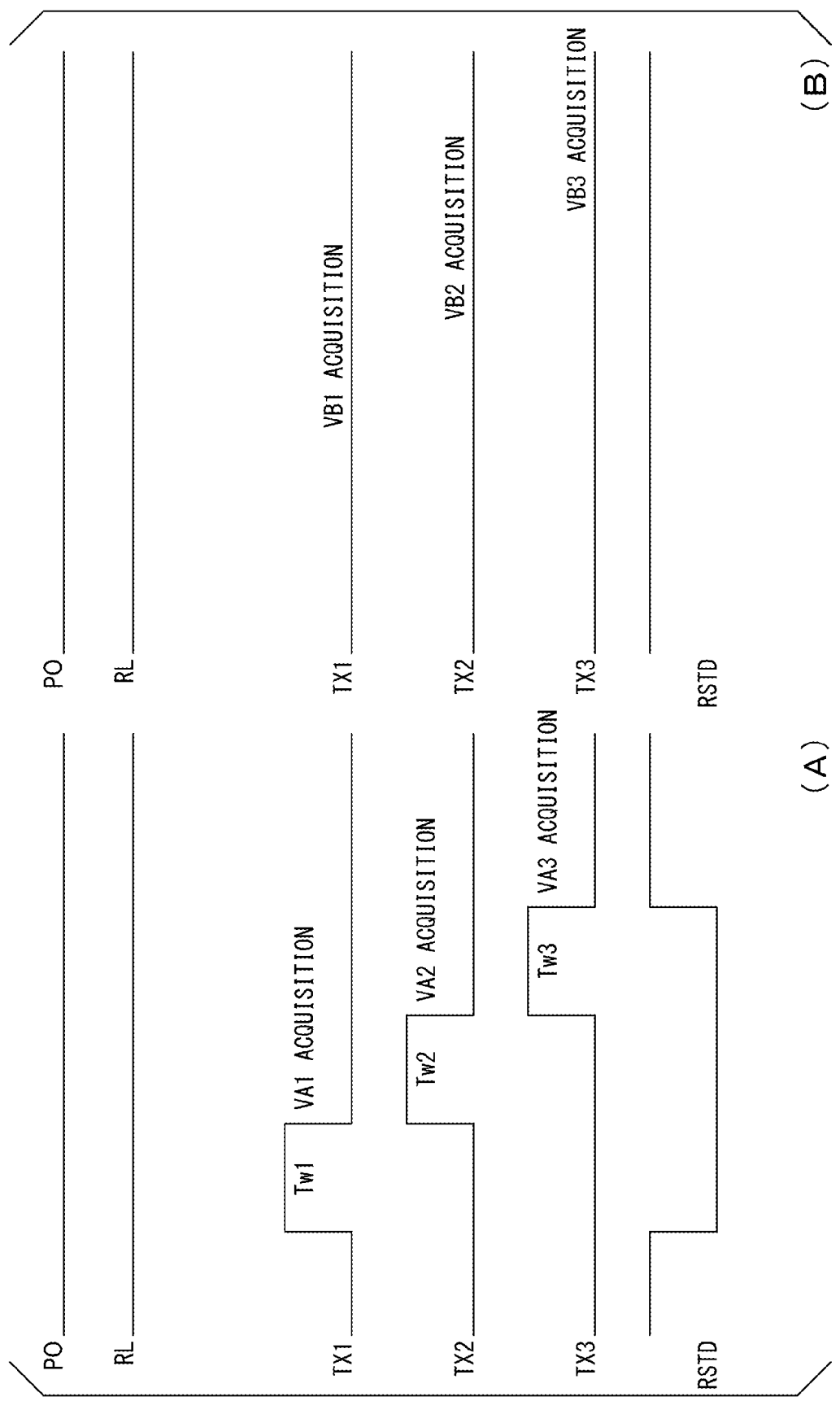
FIG. 5 is a timing chart showing processing of acquiring each of a reference background light voltage and a reference standard voltage in the first embodiment of the present invention.

FIG. 5 is a timing chart showing processing of acquiring each of the reference background light voltage and the reference standard voltage in the first embodiment of the present invention. For example, when the distance image capturing device 1 is activated, the distance calculation unit 42 causes the timing control unit 41 to perform timing output processing in each of a reference background light voltage acquisition frame and a reference standard voltage acquisition frame.

(A) of FIG. 5 shows the processing of acquiring each of a reference background light voltage VA1 corresponding to the charge amount generated by the background light accumulated in the charge accumulation unit CS1, a reference background light voltage VA2 corresponding to the charge amount generated by the background light accumulated in the charge accumulation unit CS2, and a reference background light voltage VA3 corresponding to the charge amount generated by the background light accumulated in the charge accumulation unit CS3 in the reference background light voltage acquisition frame.

In (A) of FIG. 5, the distance image sensor 32 supplies each of the accumulation drive signals TX1, TX2, and TX3 to the readout gate transistors G1, G2, and G3 with each of pulse widths Tw1, Tw2, and Tw3, by the same processing as the description of the operation in the frame cycle in FIG. 4. Accordingly, the charges collected by the photodiode PD from the incident light are distributed to the charge accumulation units CS1, CS2, and CS3, thereby accumulating background light charges. At this time, unlike the processing in FIG. 4, the timing control unit 41 controls the light source device 21 so as not to radiate the optical pulse PO. For this reason, the incident light input to the photodiode PD of each pixel 321 of the distance image sensor 32, more strictly, the incident light that is input to a silicon region of the pixel including the photodiode PD is only the background light in the capturing environment.

Accordingly, during the accumulation period in the reference background light voltage acquisition frame, the charges generated by the lens 31 at different incident angles in each of the pixels 321 are accumulated in each of the charge accumulation units CS1, CS2, and CS3 in each pixel circuit.

Then, the readout processing is performed in the same manner as in the description of FIG. 4, and the pixel signal processing circuit 325 outputs the reference background light voltage VA1 corresponding to the charge amount of the background light charge (that is, the reference background light charge) only by the background light accumulated in the charge accumulation unit CS1, the reference background light voltage VA2 corresponding to the charge amount of the background light charge accumulated in the charge accumulation unit CS2, and the reference background light voltage VA3 corresponding to the charge amount of the background light charge accumulated in the charge accumulation unit CS3 as pixel signals. The distance calculation unit 42 writes and stores each of the acquired reference background light voltages VA1, VA2, and VA3 together with identification information for identifying each of the pixels 321 in the light-receiving pixel portion 320 to the correction parameter storage unit 43. Alternatively, the distance calculation unit 42 may write and store each of the reference background light voltages VA1, VA2, and VA3 acquired in the same order as the order in which the pixel signals are read out from the pixel signal processing circuit 325 in the correction parameter storage unit 43. Here, in the same pixel 321, among charges generated by photoelectric conversion by the incident light input to the silicon region of the pixel including the photodiode PD, the charges accumulated in each of the charge accumulation units CS1, CS2, and CS3 collected in the photodiode PD, and controlled and distributed by each of the readout gate transistors G1, G2, and G3 are the same. The reason why each of the reference background light voltages VA1, VA2, and VA3 is different is that the non-controlled charges that flow into and are accumulated in each of the charge accumulation units CS1, CS2, and CS3 are different.

(B) of FIG. 5 shows processing of acquiring each of a reference standard voltage VB1 corresponding to the charge amount of the non-controlled charge flowing into and accumulated in the charge accumulation unit CS1 without going through the readout gate transistor G1, a reference standard voltage VB2 corresponding to the charge amount of the non-controlled charge that flows into and accumulated in the charge accumulation unit CS2 without going through the readout gate transistor G2, and a reference standard voltage VB3 corresponding to the charge amount of the non-controlled charge that flows into and is accumulated in the charge accumulation unit CS3 without going through the readout gate transistor G3 generated by the background light in the reference standard voltage acquisition frame.

In (B) of FIG. 5, the distance image sensor 32 accumulates and reads out the charges by the same processing as the description of the operation in the frame cycle in FIG. 4. On the other hand, as in the case of (A) of FIG. 5, the timing control unit 41 controls the light source device 21 so as not to radiate the optical pulse PO, and unlike the case of (A) of FIG. 5, controls the control circuit 322 so as not to output each of the accumulation drive signals TX1, TX2, and TX3, and does not distribute charges (that is, controlled charges to be accumulated in the charge accumulation units) to each of the charge accumulation units CS1, CS2, and CS3.

In addition, the timing control unit 41 controls the control circuit 322 to output a reset drive signal RSTD that turns on the drain gate transistor GD at the timing of distributing the charges to each of the charge accumulation units CS1, CS2, and CS3, and discards the charges corresponding to the controlled charges that are collected in the photodiode PD, controlled and distributed by each of the readout gate transistors G1, G2, and G3, and accumulated in each of the charge accumulation units. However, since the period during which the distribution is performed by the readout gate transistors G1, G2, and G3 is an extremely short time of about 30 ns, the amount of charge collected by the photodiode PD is small, and most of the time it can be held by the photodiode PD, as in (A) of FIG. 5, the drain gate transistor GD may be turned off in the period during which each readout gate transistor G performs distribution, and in that case, when the drain gate transistor GD is turned on immediately after the distribution period, the charge held in the photodiode PD is discarded to the drain.

For this reason, each of the readout gate transistors G1, G2, and G3 remains off, and the controlled charges by the background light are not accumulated in each of the charge accumulation units CS1, CS2, and CS3. That is, since the controlled charges by the background light are not propagated through each of the readout gate transistors G1, G2, and G3, only each of the non-controlled charges QB1, QB2, and QB3 that flows into without going through each of the readout gate transistors G1, G2, and G3 is accumulated in each of the charge accumulation units CS1, CS2, and CS3.

Then, in (B) of FIG. 5 as well, readout processing is performed in the same manner as in (A) of FIG. 5, and the reference standard voltage VB1 corresponding to the charge amount of the non-controlled charge QB1 accumulated in the charge accumulation unit CS1, the reference standard voltage VB2 corresponding to the charge amount of the non-controlled charge QB2 accumulated in the charge accumulation unit CS2, and the reference standard voltage VB3 corresponding to the charge amount of the non-controlled charge accumulated in the charge accumulation unit CS3 are output from the pixel signal processing circuit 325 as pixel signals. The distance calculation unit 42 writes and stores each of the acquired reference standard voltages VB1, VB2, and VB3 to the correction parameter storage unit 43 together with identification information for identifying each of the pixels 321 in the light-receiving pixel portion 320. Alternatively, the distance calculation unit 42 may write and store the reference standard voltages VB1, VB2, and VB3 acquired in the same order as the order in which the pixel signals are read out from the pixel signal processing circuit 325 in the correction parameter storage unit 43.

Then, in the frame cycle for measuring the distance between the distance image sensor 32 and the subject S, as already described, the pixel signal processing circuit 325 outputs each of the pixel signals VQ1, VQ2, and VQ3 corresponding to each of the charge accumulation units CS1, CS2, and CS3 to the distance calculation unit 42 for each pixel 321 in correspondence with one frame as the pixel signals (digital values).

At this time, the distance calculation unit 42 sequentially reads out each of the reference background light voltages VA1, VA2, and VA3 corresponding to each of the pixel signals VQ1, VQ2, and VQ3 for each pixel 321 supplied from the pixel signal processing circuit 325 and corresponding to the pixel 321, and the reference standard voltages VB1, VB2, and VB3 from the correction parameter storage unit 43 in order.

Then, the distance calculation unit 42 divides the pixel signal VQ1 by the reference background light voltage VA1 (VQ1/VA1) to calculate an adjustment ratio $\beta$.

The adjustment ratio $\beta$ is a value indicating a background light intensity ratio at the time point of acquiring the correction parameter and the time point of calculating the distance, and is the same value for VQ2'/VA2 and VQ3'/VA3 in a linearity region (non-saturation region) of the signal intensity. Here, a corrected pixel signal VQ2' is a voltage that does not include the charge component corresponding to the reflected light RL in the charge amount corresponding to the reflected light RL incident with a short delay time from the background light distributed to the charge accumulation unit CS2. Similarly, a corrected pixel signal VQ3' is a voltage that does not include the charge component corresponding to the reflected light RL in the charge amount corresponding to the reflected light RL incident with a large delay time from the background light distributed to the charge accumulation unit CS3.

By using the calculated adjustment ratio $\beta$ and each of the reference standard voltages VB1, VB2, and VB3, the distance calculation unit 42 calculates adjustment voltages VP1, VP2, and VP3 corresponding to each of the pixel signals VQ1, VQ2, and VQ3, by using the following Formulas (2), (3), and (4). Here, each of the adjustment voltages VP1, VP2, and VP3 is a voltage generated by accumulating non-controlled charges in each of the charge accumulation units CS1, CS2, and CS3, generated during distance measurement.

$$VP1 = \beta \times VB1 = (VQ1/VA1) \times VB1 \quad (2)$$

$$VP2 = \beta \times VB2 = (VQ1/VA1) \times VB2 \quad (3)$$

$$VP3 = \beta \times VB3 = (VQ1/VA1) \times VB3 \quad (4)$$

By Formulas (2), (3), and (4) described above, each of the adjustment voltages VP1, VP2, and VP3 can be obtained based on each of the reference standard voltages VB1, VB2, and VB3 corresponding to the adjustment ratio β, that is, the background light intensity at the time point of calculating the distance L.

Then, by using each of the acquired adjustment voltages VP1, VP2, and VP3, the distance calculation unit 42 calculates the corrected pixel signals VQ1', VQ2', and VQ3' from each of the pixel signals VQ1, VQ2, and VQ3 by removing the voltage component generated by the accumulation of the non-controlled charge in the charge accumulation unit CS, generated during the distance measurement by using the following Formulas (5), (6), and (7).

$$VQ1' = VQ1 - VP1 \quad (5)$$

$$VQ2' = VQ2 - VP2 \quad (6)$$

$$VQ3' = VQ3 - VP3 \quad (7)$$

By using each of the corrected pixel signals VQ1', VQ2', and VQ3' thus obtained, the distance calculation unit 42 calculates the distance L between the distance image sensor 32 and the subject S by the following Formula (8) corresponding to the Formula (1) already described.

$$L = [(VQ3' - VQ1')/(VQ2' + VQ3' - 2VQ1')] \times Dm \quad (8)$$

In the above Formula (8), Dm is (c/2)Tw.

As described above, the distance image capturing device 1 obtains the distance L between the distance image sensor 32 and the subject S for each of the pixels 321 arranged in the light-receiving pixel portion 320 of the distance image sensor 32. According to the present embodiment, by using the corrected pixel signals VQ1', VQ2', and VQ3' obtained by correcting each of the pixel signals VQ1, VQ2, and VQ3 with each of the adjustment voltages VP1, VP2, and VP3, Formula (1) for obtaining the distance, which has been used in the related art, can be used as it is.

Figure 6:
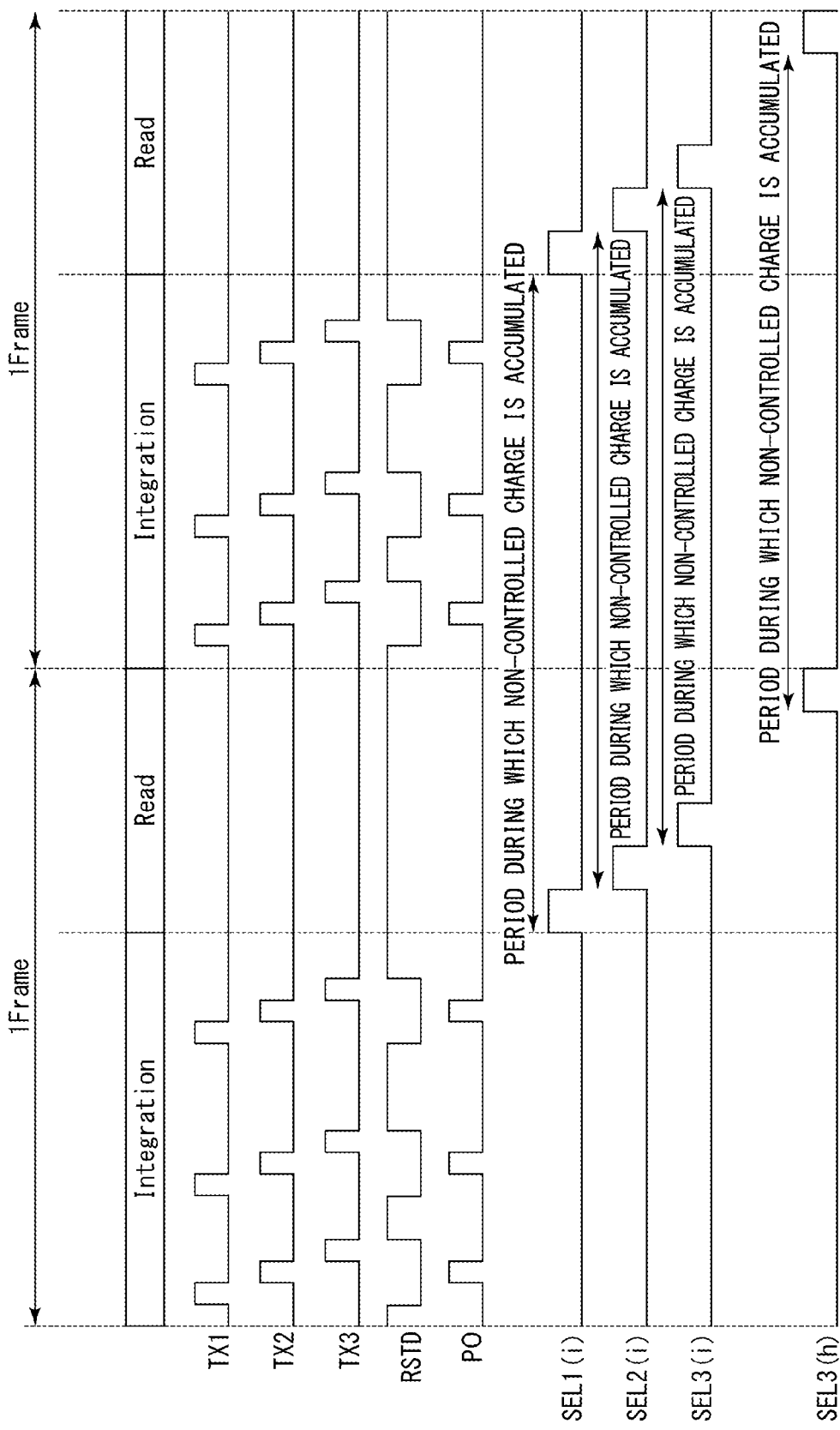
FIG. 6 is a timing chart showing a period during which non-controlled charges are accumulated.

FIG. 6 is a timing chart showing the period during which the non-controlled charge is accumulated. FIG. 6 is a timing chart shown similarly to FIG. 4, and shown over two frame cycles, as described in FIG. 4 for each frame cycle, there are a charge accumulation period (Integration) in which an optical pulse PO is emitted to accumulate charges with respect to the charge accumulation unit CS and a pixel signal readout period (Read) in which charges are read out from the charge accumulation unit CS. Here, the controlled charges collected by the photodiode PD and controlled and distributed by each of the readout gate transistors G1, G2, and G3 are accumulated in each of the charge accumulation units CS1, CS2, and CS3 only during the charge accumulation period (Integration). After the charge is read out, the charge accumulation unit CS is temporarily discarded and reset by the reset gate transistor RT, but the charge is not discarded until the next charge readout period. That is, since the charge is discarded only once per frame (Integration+Read), the non-controlled charge is accumulated in the charge accumulation unit CS for approximately one frame period. That is, the period during which the non-controlled charge is accumulated in the charge accumulation unit CS is longer than the period during which the controlled charge is accumulated in the charge accumulation unit CS.

For this reason, in the related art, when the area of the pixel 321 is reduced, the ratio of the charge amount of the non-controlled charge accumulated in the charge accumulation unit CS without going through the readout gate transistor G to the charge amount of the controlled charge collected by the photodiode PD and distributed to and accumulated in the charge accumulation unit CS through the readout gate transistor G becomes large, and the accuracy of the distance L to be obtained is decreased. Furthermore, as the area of the pixel 321 is reduced, the accumulation ratio of non-controlled charges increases step by step, so the accuracy of the distance L obtained gradually decreases.

However, according to the present embodiment, even when the ratio of the charge amount of the non-controlled charge accumulated in the charge accumulation unit CS without going through the readout gate transistor G to the charge amount of the controlled charge through the readout gate transistor G increases, and even when the area of the pixel 321 is reduced, it is possible to eliminate the influence of each of the non-controlled charges, which is included in each of the charges accumulated in the charge accumulation unit CS and of which the charge amount differs depending on the incident angle of the incident light, and the distance L between the subject S and the device can be obtained with a similar or higher accuracy.

Further, according to the present embodiment, after the lens 31 is attached and the distance image capturing device 1 is assembled, the reference background light voltages VA1, VA2, and VA3 and the reference standard voltages VB1, VB2, and VB3 can be measured without using special calibration equipment, and each of the pixel signals VQ1, VQ2, and VQ3 can be easily corrected in accordance with the individual characteristics of each of the attached lens 31 and the difference in relative position between the attached lens 31 and the distance image sensor 32.

In addition, in the present embodiment, when the lens 31 has a plurality of different characteristics that change the incident angle of the incident light to the distance image sensor 32, such as having a plurality of F values, by obtaining the reference background light voltages VA1, VA2, and VA3 and the reference standard voltages VB1, VB2, and VB3 for each of the characteristics, each of the pixel signals VQ1, VQ2, and VQ3 corresponding to the characteristics may be corrected by writing and storing it in the correction parameter storage unit 43 in advance in correspondence with each of the characteristics. In this case, the distance calculation unit 42 reads the correction parameters such as the reference background light voltages VA1, VA2, and VA3 corresponding to the characteristic of the lens used in the charge accumulation period in the frame cycle and the reference standard voltages VB1, VB2, and VB3 from the correction parameter storage unit 43, and corrects each of the pixel signals VQ1, VQ2, and VQ3 by using the read correction parameters.

In addition, in the present embodiment, the reference background light voltages VA1, VA2, and VA3 and the reference standard voltages VB1, VB2, and VB3 corresponding to each of all of the pixels 321 in the light-receiving pixel portion 320 are stored in the correction parameter storage unit 43. However, since incident light is incident on each of the pixels 321 through the lens 31 provided in front of the light-receiving pixel portion 320 with respect to the subject S, a configuration may be adopted in which the storage capacity of the correction parameter storage unit 43 is decreased by dividing each of the pixels 321 into groups so that the adjustment ratio β falls within a predetermined difference range in correspondence with the characteristic of the lens 31, and using the median values of each of the reference background light voltages VA1, VA2, and VA3 and each of the reference standard voltages VB1, VB2, and VB3 in the pixels 321 in each of the groups as the reference background light voltages VA1, VA2, and VA3 and the reference standard voltages VB1, VB2, and VB3 for all the pixels 321 in the group.

Figure 7:
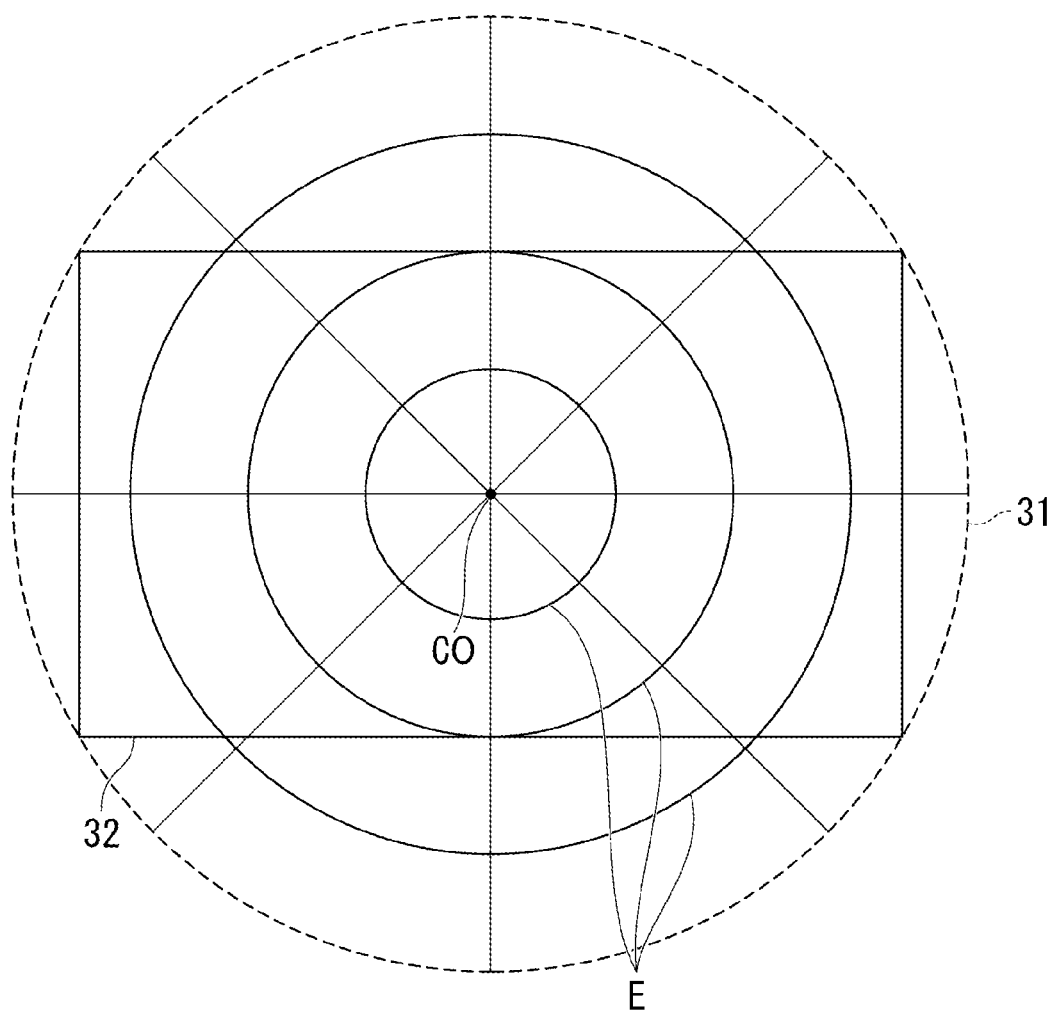
FIG. 7 is a diagram showing a tendency of change in an incident angle of incident light incident on each pixel in a characteristic of a lens 31.

FIG. 7 is a diagram showing a tendency of change in the incident angle of the incident light incident on each pixel in the characteristic of the lens 31.

As shown in FIG. 7, since the incident angle of the incident light gradually changes continuously in a concentric circle (concentric circle E) around a center of area CO of a chip of the distance image sensor 32, as described above, it is possible to adopt a configuration in which predetermined pixels 321 having similar incident angles are grouped.

In addition, as another configuration, a configuration may be adopted in which the correction parameter values of the reference background light voltages VA1, VA2, and VA3 and the reference standard voltages VB1, VB2, and VB3 in the pixel 321 at a position of a predetermined radius of the concentric circle E centered on the center of area CO are stored in the correction parameter storage unit 43. In this case, a complementary function that complements the correction parameter value in the concentric circle E with the predetermined radius to the correction parameter value of each of the pixels 321 in the region sandwiched by the concentric circles E is written and stored in advance in the correction parameter storage unit 43 for each region. Then, the distance calculation unit 42 reads out the correction parameter value and the complementary function in the concentric circle E as necessary, and for the correction parameter value of the pixel 321 in the region sandwiched by the concentric circles E, generates the correction parameter values of the pixels 321 corresponding to the concentric circles E sandwiching the region by the complementary function.

In the present embodiment, although the characteristic of the lens 31 have been described with an example in which the incident angle of incident light gradually changes continuously in a concentric circle (concentric circle E), depending on the characteristic of the lens to be used, it is not necessary to change it concentrically, and it may be changed in accordance with the characteristic of the incident angle of the incident light of the lens.

In addition, in the present embodiment, an example in which the circuit in the distance image sensor 32 is formed by an n-channel transistor is shown, but it may be formed by a p-channel transistor by changing a polarity of the semiconductor.

Second Embodiment

Although a distance image capturing device according to a second embodiment has the same configuration as that of the first embodiment shown in FIG. 1, while the pixel 321 of the first embodiment has three pixel signal readout units RU1, RU2, and RU3, in the present embodiment, the pixel 321 has four pixel signal readout units RU1, RU2, RU3, and RU4 (now shown).

Each of the pixel signal readout units RU1, RU2, RU3, and RU4 includes each of the charge accumulation units CS1, CS2, CS3, and CS4 (not shown).

In the case of the configuration of the present embodiment, as in the first embodiment, in the charge accumulation unit CS1, the background light charge collected by the photodiode PD by the incident light only from the background light is distributed and accumulated during the distribution time Tw1 (the same time width as the pulse width Tw, and the same applies to Tw2, Tw3, and Tw4 shown below). Each of the distribution times Tw1, Tw2, Tw3, and Tw4 (not shown) is the pulse width of the accumulation drive signal TX1 applied to readout gate transistor G1, the accumulation drive signal TX2 applied to the readout gate transistor G2, the accumulation drive signal TX3 applied to the readout gate transistor G3, and the accumulation drive signal TX4 (not shown) applied to the readout gate transistor G4 (not shown). Each of Tw1, Tw2, Tw3, and Tw4 is the same as the pulse width Tw of the optical pulse PO.

Similar to the timing chart of FIG. 4, the background light charge collected by the photodiode PD is distributed to the charge accumulation unit CS1 during the distribution time Tw1 before the optical pulse PO is emitted. In each of the charge accumulation units CS2, CS3, and CS4, as in the timing chart of FIG. 4, at each of the distribution time Tw2 when the optical pulse PO is emitted, the next distribution time Tw3, and the next distribution time Tw4, the background light charge collected by the photodiode PD and the charge corresponding to the reflected light RL are distributed.

In the present embodiment, as in the first embodiment, each piece of data of the reference standard voltages VB1, VB2, VB3, and VB4 corresponding to the non-controlled charges generated by the background light, and each piece of data of the reference background light voltages VA1, VA2, VA3, and VA4 corresponding to the background light charges generated by the background light are acquired in advance, for example, when the distance image capturing device 1 is shipped or activated, that is, before the distance image is captured, and are written and stored in the correction parameter storage unit 43.

Figure 8:
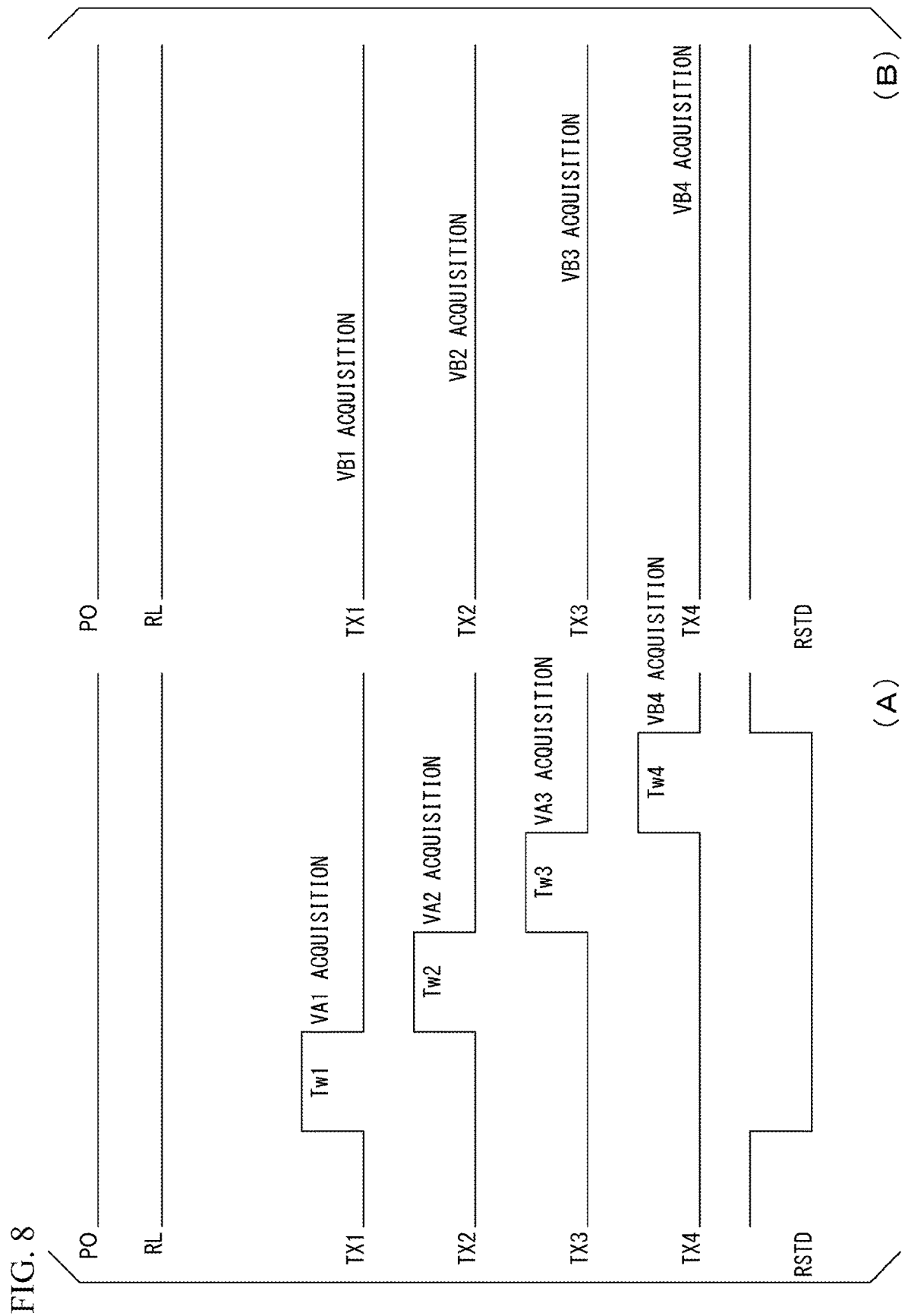
FIG. 8 is a timing chart showing processing of acquiring each of a reference background light voltage and a reference standard voltage in a second embodiment of the present invention.

FIG. 8 is a timing chart showing processing of acquiring each of the reference background light voltage and the reference standard voltage in the second embodiment of the present invention. For example, when the distance image capturing device 1 is activated, the distance calculation unit 42 causes the timing control unit 41 to perform reference background light voltage acquisition processing in the reference background light voltage acquisition frame and reference standard voltage acquisition processing in the reference standard voltage acquisition frame.

(A) of FIG. 8 shows, in the reference background light voltage acquisition frame, similar to (A) FIG. 5, the processing of acquiring the reference background light voltage VA4 accumulated in the charge accumulation unit CS4 together with each of the reference background light voltages VA1, VA2, and VA3.

In (A) of FIG. 8, the distance image sensor 32 accumulates the charge in the charge accumulation unit CS and reads out the charge from the charge accumulation unit CS. When accumulating the charges, the timing control unit 41 controls the light source device 21 so as not to radiate the optical pulse PO. For this reason, the incident light input to each pixel 321 of the distance image sensor 32 is only the background light in the capturing environment.

Accordingly, during the charge accumulation period in the reference background light voltage acquisition frame, the incident light, which is only by the background light of which an incident angle is changed to a different angle by the lens 31, is incident on each of the charge accumulation units CS1, CS2, CS3, and CS4 in each pixel 321.

Then, the readout processing is performed in the same manner as in the description of (A) FIG. 5, and the pixel signal processing circuit 325 outputs the reference background light voltage VA1 corresponding to the charge amount of the background light charge (that is, the reference background light charge) only by the background light accumulated in the charge accumulation unit CS1, the reference background light voltage VA2 corresponding to the charge amount of the background light charge accumulated in the charge accumulation unit CS2, the reference background light voltage VA3 corresponding to the charge amount of background light charge accumulated in the charge accumulation unit CS3, and the reference background light voltage VA4 corresponding to the charge amount of the background light charge accumulated in the charge accumulation unit CS4 as pixel signals. The distance calculation unit 42 writes and stores each of the acquired reference background light voltages VA1, VA2, VA3, and VA4 together with identification information for identifying each of the pixels 321 in the light-receiving pixel portion 320 in the correction parameter storage unit 43. Alternatively, the distance calculation unit 42 may write and store each of the reference background light voltages VA1, VA2, VA3, and VA4 acquired in the same order as the order in which the pixel signals are read out from the pixel signal processing circuit 325 in the correction parameter storage unit 43.

(B) of FIG. 8 shows, as in (B) of FIG. 5, in the reference standard voltage acquisition frame, processing of acquiring each of the reference standard voltages VB1, VB2, and VB3, and the reference standard voltage VB4 corresponding to the charge amount of the non-controlled charge that flows into and is accumulated in the charge accumulation unit CS4 along with the background light.

In (B) of FIG. 8, the distance image sensor 32 accumulates and reads out the charges by the same processing as the description of the operation in the frame cycle in FIG. 4. On the other hand, the timing control unit 41 controls the light source device 21 so as not to radiate the optical pulse PO, controls the control circuit 322 so as not to output each of the accumulation drive signals TX1, TX2, TX3, and TX4, and does not distribute the charges to each of the charge accumulation units CS1, CS2, CS3, and CS4.

In addition, the timing control unit 41 controls the control circuit 322 to output the reset drive signal RSTD that turns on the drain gate transistor GD at the timing of distributing the charges to each of the charge accumulation units CS1, CS2, CS3, and CS4, thereby discarding the charges. However, since the period during which each of the readout gate transistors G1, G2, G3, an G4 perform the distribution is an extremely short time of about 40 ns, the amount of charges collected in the photodiode PD is small, and most of the time it can be held by the photodiode PD, as in (A) of FIG. 8, the drain gate transistor GD may be turned off during the distribution period, and in that case, when the drain gate transistor GD is turned on immediately after the distribution period, the charge held by the photodiode PD is discarded to the drain.

Accordingly, each of the readout gate transistors G1, G2, G3, and G4 remains off, and the charge by the background light is not propagated to each of the charge accumulation units CS1, CS2, CS3, and CS4 via each of the readout gate transistors G1, G2, G3, and G4. For this reason, only the non-controlled charges QB1, QB2, QB3, and QB4 that flow into without going through each of the readout gate transistors G1, G2, G3, and G4 are accumulated in each of the charge accumulation units CS1, CS2, CS3, and CS4.

Then, readout processing is performed in the same manner as in (A) of FIG. 8, and as the pixel signals, the pixel signal processing circuit 325 outputs the reference standard voltages VB1, VB2, and VB3 as well as the reference standard voltage VB4 corresponding to the charge amount of the non-controlled charge accumulated in the charge accumulation unit CS4 as the pixel signal. The distance calculation unit 42 writes and stores each of the acquired reference standard voltages VB1, VB2, VB3, and VB4 to the correction parameter storage unit 43 together with identification information for identifying each of the pixels 321 in the light-receiving pixel portion 320. Alternatively, the distance calculation unit 42 may write and store each of the reference standard voltages VB1, VB2, VB3, and VB4 acquired in the same order as the order in which the pixel signals are read out from the pixel signal processing circuit 325 in the correction parameter storage unit 43.

Then, in the frame cycle for measuring the distance between the distance image sensor 32 and the subject S, as already described, the pixel signal processing circuit 325 outputs each of the pixel signals VQ1, VQ2, VQ3, and VQ4 corresponding to each of the charge accumulation units CS1, CS2, CS3, and CS4 to the distance calculation unit 42 for each pixel 321 in correspondence with one frame as the pixel signals (digital values).

At this time, the distance calculation unit 42 sequentially reads out the reference background light voltages VA1, VA2, VA3, and VA4 corresponding to the read pixel 321 and the reference standard voltages VB1, VB2, VB3, and VB4 from the correction parameter storage unit 43.

The distance calculation unit 42 divides the pixel signal VQ1 by the reference background light voltage VA1 (VQ1/VA1) to calculate an adjustment ratio $\beta$. The adjustment ratio $\beta$ is a value indicating a background light intensity ratio at the time point of acquiring the correction parameter and the time point of calculating the distance, and VQ2'/VA2, VQ3'/VA3, and VQ4'/VA4 also have the same value in the linearity region (non-saturation region) of the signal intensity. Here, the corrected pixel signal VQ2' is a voltage that does not include the charge component corresponding to the reflected light RI, in the charge amount corresponding to the background light and the reflected light RL distributed to the charge accumulation unit CS2. Similarly, the corrected pixel signal VQ3' is a voltage that does not include the charge component corresponding to the reflected light RL in the charge amount corresponding to the background light and the reflected light RL distributed to the charge accumulation unit CS3, and the corrected pixel signal VQ4' is a voltage that does not include the charge component corresponding to the reflected light RL in the charge amount corresponding to the background light and the reflected light RL distributed to the charge accumulation unit CS4.

By using the adjustment ratio $\beta$ and the reference standard voltages VB1, VB2, VB3, and VB4, the distance calculation unit 42 calculates each of adjustment voltages VP1, VP2, VP3, and VP4 generated by accumulation of non-controlled charges in the charge accumulation unit CS, generated during the distance measurement corresponding to each of the pixel signals VQ1, VQ2, VQ3 and VQ4, by the following Formulas (9), (10), (11), and (12).

$$VP1 = \beta \times VB1 = (VQ1/VA1) \times VB1 \qquad (9)$$

$$VP2 = \beta \times VB2 = (VQ1/VA1) \times VB2 \qquad (10)$$

$$VP3 = \beta \times VB3 = (VQ1/VA1) \times VB3 \qquad (11)$$

$$VP4 = \beta \times VB4 = (VQ1/VA1) \times VB4 \qquad (12)$$

Then, by using each of the adjustment voltages VP1, VP2, VP3, and VP4, the distance calculation unit 42 calculates each of the corrected pixel signals VQ1', VQ2', VQ3', and VQ4' of the pixel signals VQ1, VQ2, VQ3, and VQ4 by the following Formulas (13), (14), (15), and (16).

$$VQ1'=VQ1-VP1 \qquad (13)$$

$$VQ2'=VQ2-VP2 \qquad (14)$$

$$VQ3'=VQ3-VP3 \qquad (15)$$

$$VQ4'=VQ4-VP4 \qquad (16)$$

As described above, even when there are four pixel signal readout units RU1, RU2, RU3, and RU4, the corrected pixel signals VQ1', VQ2', VQ3', and VQ4' can be calculated in the same manner as in the case of three pixel signal readout units RU1, RU2, and RU3. That is, when the number of pixel signal readout units is three or more, the voltage values of the pixel signals VQ1, VQ2, VQ3, and VQ4 can be accurately corrected by the correction method described above.

Third Embodiment

In each of the first embodiment and the second embodiment, before measuring the distance between the subject S and the distance image sensor 32, the reference background light voltage and the reference standard voltage are written and stored in the correction parameter storage unit 43 in advance. However, in a third embodiment, a correction parameter is acquired for each distance measurement processing.

The present embodiment has the same configuration as the distance image capturing device 1 shown in FIG. 1, and operations different from those of the first and second embodiments will be described below.

In the present embodiment, two frames of each of the first frame and the second frame are used to acquire one distance image. For this reason, in the first and second embodiments, for example, distance measurement is performed 60 times per second, whereas in the present embodiment, distance measurement is performed 30 times per second.

Figure 9:
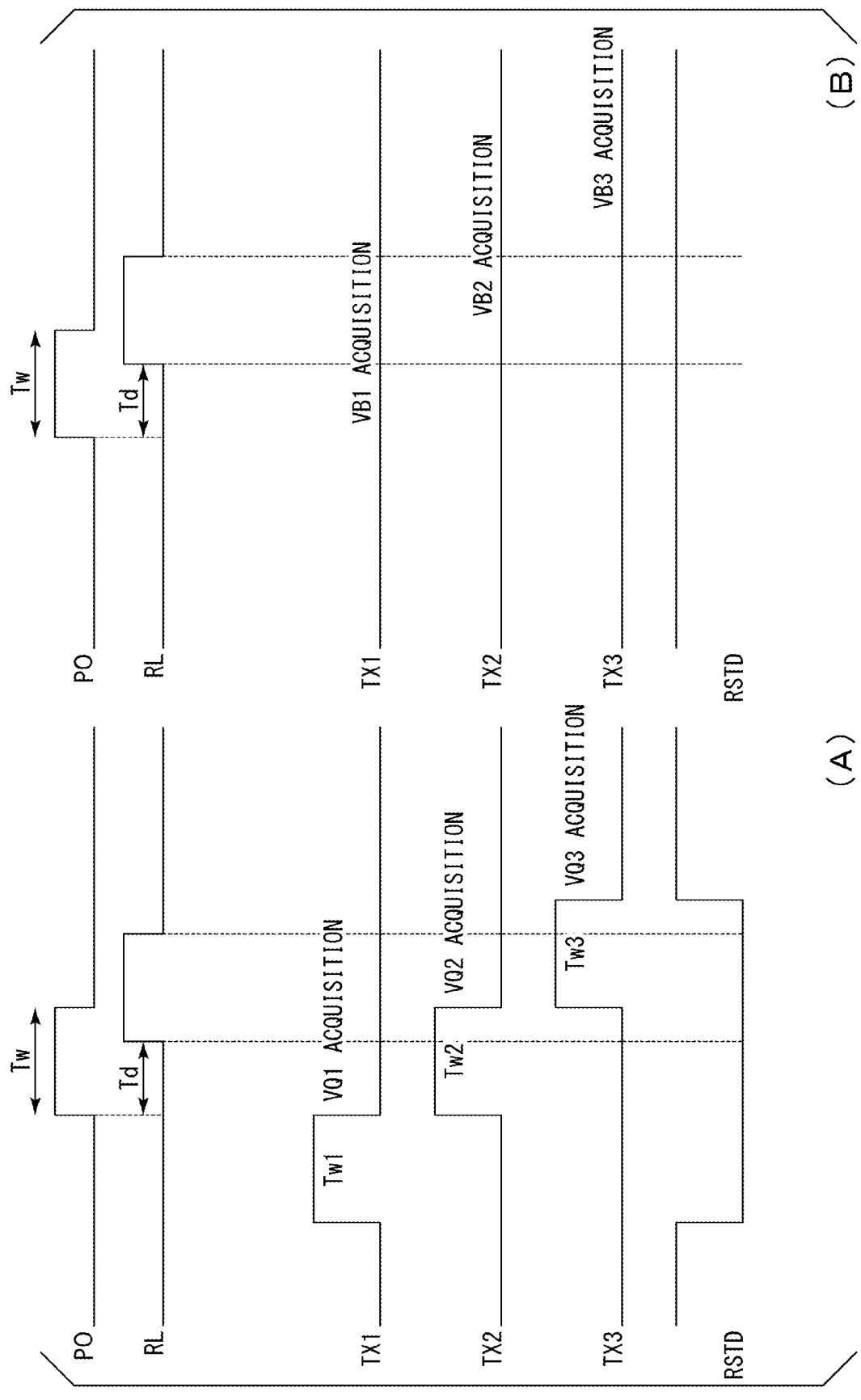
FIG. 9 is a timing chart showing processing of acquiring each of a reference background light voltage and a reference standard voltage in a third embodiment of the present invention.

FIG. 9 is a timing chart showing processing of acquiring each of the reference background light voltage and the reference standard voltage in the third embodiment of the present invention. (A) of FIG. 9 shows the timing chart for the first frame, and (B) of FIG. 9 shows the timing chart for the second frame.

In (A) of FIG. 9, in the first frame, similarly to the processing described in FIG. 4, the optical pulse PO is emitted, and processing of receiving reflected light RL from the subject S (delay time Td from the emitting timing of the optical pulse PO) is performed to capture a distance image, and each of the pixel signals VQ1, VQ2, and VQ3 are obtained. Then, the distance calculation unit 42 writes and stores each of the acquired pixel signals VQ1, VQ2, and VQ3 to the correction parameter storage unit 43.

The pixel signal VQ1 is a voltage corresponding to the charge amount of charge collected by the photodiode PD by the incident light only from the background light, and distributed to and accumulated in the charge accumulation unit CS1. In addition, the pixel signal VQ2 is a voltage corresponding to the charge amount of the charge collected by the photodiode PD by the incident light including a portion of the background light and the reflected light RL, and distributed to and accumulated in the charge accumulation unit CS2. The pixel signal VQ3 is a voltage corresponding to the charge amount of the charge collected by the photodiode PD by the incident light including a portion of the background light and the reflected light RL, and distributed to and accumulated in the charge accumulation unit CS3. Each of the pixel signals VQ1, VQ2, and VQ3 includes each of the reference standard voltages VB1, VB2, and VB3, which is the voltage component of the non-controlled charge with the charge amount corresponding to the incident light.

In (B) of FIG. 9, in the second frame, similar to the first frame in (A) of FIG. 9, in order to radiate the optical pulse PO, the reflected light RL (delay time Td from the timing of radiating the optical pulse PO) from the subject S is received. However, by the same processing as in (B) FIG. 5, the distance calculation unit 42 acquires each of the reference standard voltages VB1, VB2, and VB3 for each of the charge accumulation units CS1, CS2, and CS3. Here, in the timing chart in (B) of FIG. 9, at the timing of distributing the charges to each of the charge accumulation units CS1, CS2, and CS3, the reset drive signal RSTD for turning on the drain gate transistor GD is output to discard the charges. However, since the period during which each of the readout gate transistors G1, G2, and G3 performs the distribution is an extremely short time of about ns, the charges collected in the photodiode PD are small, and most of the time it can be held by the photodiode PD, as in (A) of FIG. 9, the drain gate transistor GD may be turned off during the distribution period, and in this configuration, when the drain gate transistor GD is turned on immediately after the distribution period, the charges held by the photodiode PD are discarded to the drain.

Then, the distance calculation unit 42 reads each of the pixel signals VQ1, VQ2, and VQ3 from the correction parameter storage unit 43.

The distance calculation unit 42 sets each of the reference standard voltages VB1, VB2, and VB3 as each of the adjustment voltages VP1, VP2, and VP3 of the pixel signals VQ1, VQ2, and VQ3, and calculates the corrected pixel signals VQ1', VQ2', and VQ3' by using the following Formulas (17), (18), and (19).

$$VQ1'=VQ1-VP1 \qquad (17)$$

$$VQ2'=VQ2-VP2 \qquad (18)$$

$$VQ3'=VQ3-VP3 \qquad (19)$$

Then, the distance calculation unit 42 calculates the distance L between the subject S and the distance image sensor 32 in the distance image capturing device 1 by using the corrected pixel signals VQ1', VQ2', and VQ3' thus obtained, by using Formula (8).

According to the present embodiment, since each of the reference standard voltages VB1, VB2, and VB3 is acquired as a correction parameter for each distance calculation processing, and it is not necessary to write and store the reference background light voltages VA1, VA2, and VA3 and the reference standard voltages VB1, VB2, and VB3 corresponding to all the pixels 321 in the correction parameter storage unit 43 in advance as in the first and second embodiments, the capacity of the correction parameter storage unit 43 can be reduced.

In addition, according to the present embodiment, since the pixel signal for measurement is acquired in the first frame, and a pixel signal of a reference standard voltage for correcting the pixel signal for measurement is acquired in the next second frame, in addition to the method of measuring the delay of a single optical pulse shown in the present invention, for example, it can be applied to a TOF sensor using CW (continuous wave) modulation, which emits continuously modulated light, obtains a phase shift amount between the radiation light and the reflected light, and uses it to calculate the distance, and can be applied to various other TOF sensors.

For example, although a TOF sensor using CW (continuous wave) modulation normally uses two frames to measure the distance, in order to perform the same correction as in the present embodiment, two frames for correction may be added and four frames may be used to acquire one distance image.

Fourth Embodiment

In the first to third embodiments, the voltage components corresponding to the non-controlled charges generated by the background light and flowing into the charge accumulation units CS1, CS2, and CS3 are removed from each of the pixel signals VQ1, VQ2, and VQ3.

On the other hand, in the fourth embodiment, the voltage component corresponding to the non-controlled charge generated by reflected light RL in which the optical pulse PO (pulse width Tw) is reflected by the subject S and flowing into each of the charge accumulation units CS1, CS2, and CS3 is removed from each of the pixel signals VQ1, VQ2, and VQ3.

As already described, when any one of the first to third embodiments is applied, the non-controlled charge by the background light can be corrected. In the present embodiment, for the fourth embodiment, since it is known that correction is possible, the description will be made by using a state where background light does not exist, that is, a state where the background light is not incident on the distance image sensor 32 and is shielded from ambient light in a darkroom or the like.

In the present embodiment, a reference reflected light voltage VC1 corresponding to a charge amount of a reflected light charge C1 generated by the reflected light accumulated in the charge accumulation unit CS1, a reference reflected light voltage VC2 corresponding to a charge amount of a reflected light charge C2 generated by the reflected light accumulated in the charge accumulation unit CS2, a reference reflected light voltage VC3 corresponding to a charge amount of a reflected light charge C3 generated by the reflected light accumulated in the charge accumulation unit CS3, a reference standard voltage VD1 corresponding to a charge amount of a non-controlled charge D1 generated by the reflected light accumulated in the charge accumulation unit CS1, a reference standard voltage VD2 corresponding to a charge amount of a non-controlled charge D2 generated by the reflected light accumulated in the charge accumulation unit CS2, and a reference standard voltage VD3 corresponding to a charge amount of a non-controlled charge D3 generated by the reflected light accumulated in the charge accumulation unit CS3 are acquired in advance, for example, when the distance image capturing device 1 is shipped or activated, that is, before capturing a distance image, and are written and stored in the correction parameter storage unit 43.

Figure 10:
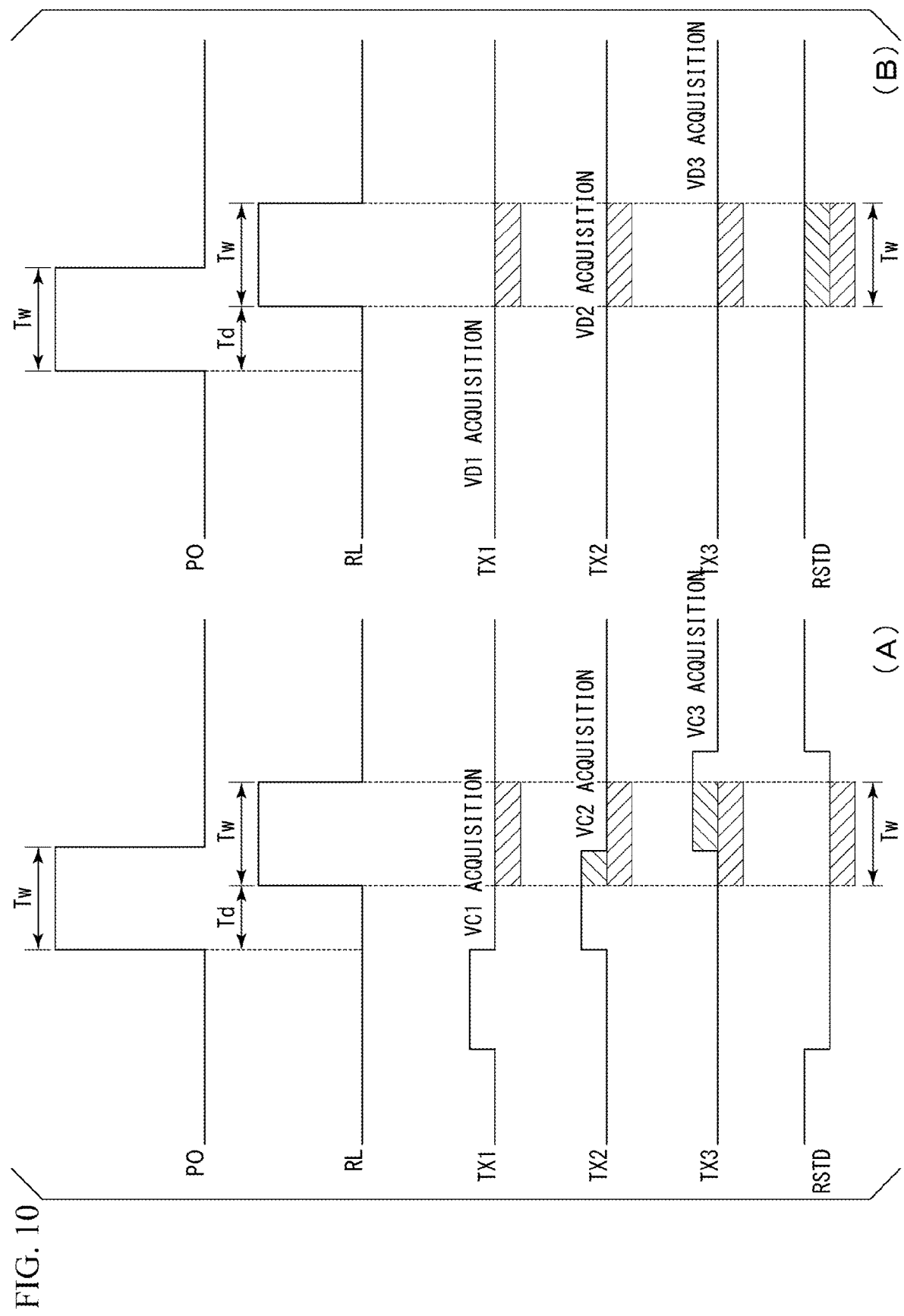
FIG. 10 is a timing chart showing processing of acquiring each of a reference background light voltage and a reference standard voltage in a fourth embodiment of the present invention.
Figure 11:
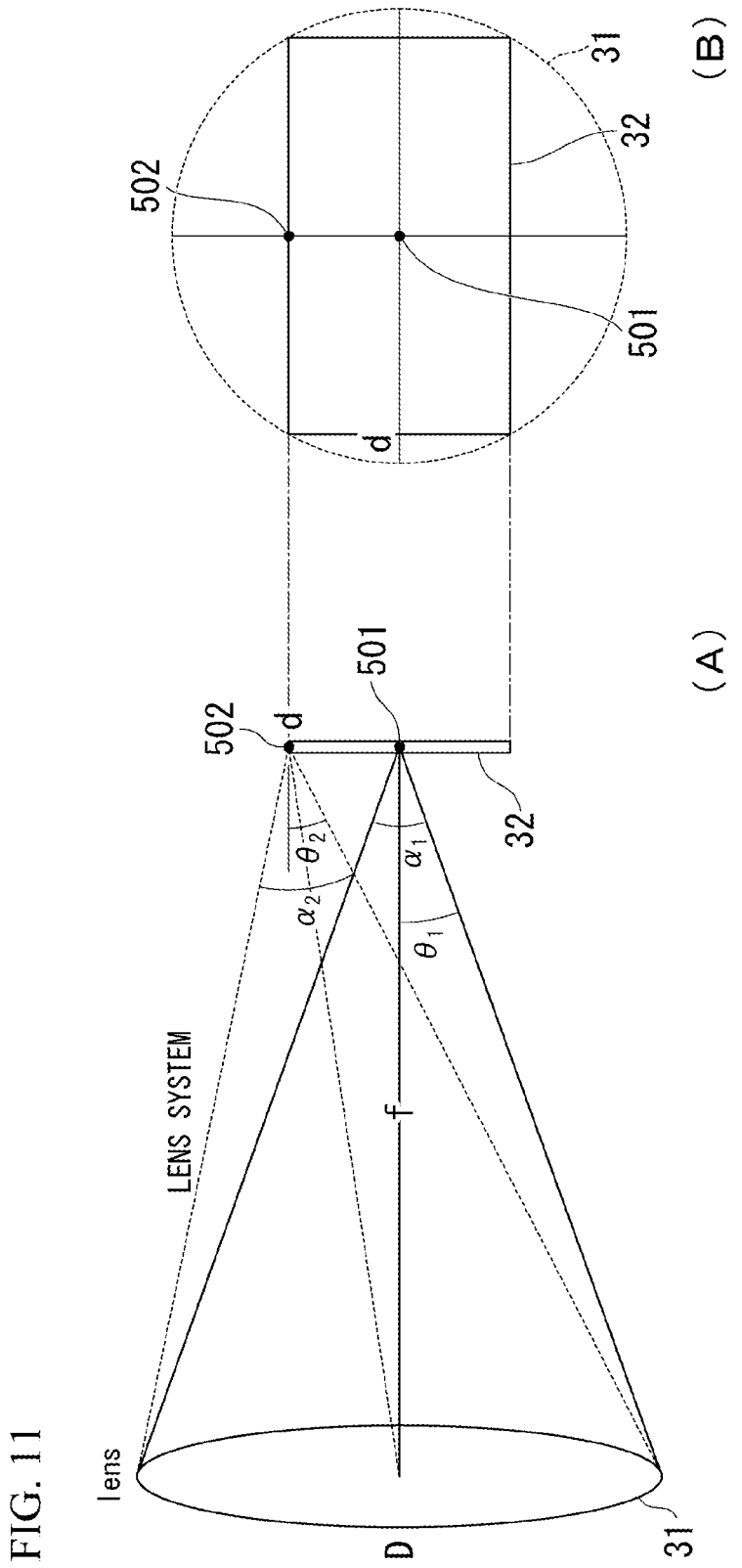
FIG. 11 is a conceptual diagram showing an incident angle of incident light with respect to each pixel in a distance image sensor.

FIG. 10 is a timing chart showing the processing of acquiring each of the reference reflected light voltage and the reference standard voltage in the fourth embodiment of the present invention.

(A) of FIG. 10 shows the processing of acquiring each of the reference reflected light voltage VC1 corresponding to the charge amount generated by the incident light only from the reflected light accumulated in the charge accumulation unit CS1, the reference reflected light voltage VC2 corresponding to the charge amount generated by the incident light only from the reflected light accumulated in the charge accumulation unit CS2, and the reference reflected light voltage VC3 corresponding to the charge amount generated by the incident light only from the reflected light accumulated in the charge accumulation unit CS3 in the reference reflected light voltage acquisition frame.

In (A) of FIG. 10, the distance image sensor 32 accumulates charges in each of the charge accumulation units CS1, CS2, and CS3, and reads out the charges from each of the charge accumulation units CS1, CS2, and CS3, by the same processing as the distance measurement that radiates the optical pulse PO in the same manner as the description of the operation in the frame cycle in FIG. 4.

Accordingly, during the accumulation period in the reference reflected light voltage acquisition frame, in each of the charge accumulation units CS1, CS2, and CS3 in each pixel 321, only the reflected light incident on each of the pixels 321 at different incident angles through the lens 31 becomes incident light, and charges generated are accumulated.

Then, the readout processing is performed in the same manner as in the description of FIG. 4, and the pixel signal processing circuit 325 outputs the reference reflected light voltage VC1 corresponding to the charge amount of the reflected light charge (that is, the reference reflected light charge) only by the reflected light accumulated in the charge accumulation unit CS1, the reference reflected light voltage VC2 corresponding to the charge amount only by the reflected light accumulated in the charge accumulation unit CS2, and the reference reflected light voltage VC3 corresponding to the charge amount only by the reflected light accumulated in the charge accumulation unit CS3 as pixel signals. The distance calculation unit 42 writes and stores each of the acquired reference reflected light voltages VC1, VC2, and VC3 together with identification information for identifying each of the pixels 321 in the light-receiving pixel portion 320 to the correction parameter storage unit 43. Alternatively, the distance calculation unit 42 may write and store each of the reference reflected light voltages VC1, VC2, and VC3 acquired in the same order as the order in which the pixel signals are read out from the pixel signal processing circuit 325 in the correction parameter storage unit 43.

(B) of FIG. 10 shows the processing of acquiring each of the reference standard voltage VD1 corresponding to the charge amount of the non-controlled charge that flows into and is accumulated in the charge accumulation unit CS1 along with the reflected light, the reference standard voltage VD2 corresponding to the charge amount of the non-controlled charge that flows into and is accumulated in the charge accumulation unit CS2 along with the reflected light, and the reference standard voltage VD3 corresponding to the charge amount of the non-controlled charge that flows into and is accumulated in the charge accumulation unit CS3 along with the reflected light, in the reference standard voltage acquisition frame.

In (B) of FIG. 10, the distance image sensor 32 accumulates and reads out the charges by the same processing as the description of the operation in the reference standard voltage acquisition frame in (B) of FIG. 5. That is, the timing control unit 41 controls the light source device 21 to radiate the optical pulse PO, on the other hand, controls the control circuit 322 so as not to output each of the accumulation drive signals TX1, TX2, and TX3, and does not distribute the charges to each of the charge accumulation units CS1, CS2, and CS3.

In addition, the timing control unit 41 controls the control circuit 322 to output the reset drive signal RSTD that turns on the drain gate transistor GD at the timing of distributing the charges to each of the charge accumulation units CS1, CS2, and CS3, thereby discarding the charges generated by the reflected light. However, since the period during which each of the readout gate transistors G1, G2, and G3 performs the distribution is an extremely short time of about 30 ns, the amount of charges collected in the photodiode PD is extremely small, and most of the time it can be held by the photodiode PD, as in (A) of FIG. 10, the drain gate transistor GD may be turned off during the charge distribution period, and in that case, the charge held by the photodiode PD is discarded to the drain when the drain gate transistor GD is turned on immediately after the distribution period.

Accordingly, each of the readout gate transistors G1, G2, and G3 remains off, and the charges by the reflected light are not propagated to each of the charge accumulation units CS1, CS2, and CS3 via each of the readout gate transistors G1, G2, and G3. For this reason, only the non-controlled charges QD1, QD2, and QD3 that flow into without going through each of the readout gate transistors G1, G2, and G3 are accumulated in each of the charge accumulation units CS1, CS2, and CS3.

Then, readout processing is performed in the same manner as in (A) of FIG. 10, and the reference standard voltage VD1 corresponding to the charge amount of the non-controlled charge QD1 accumulated in the charge accumulation unit CS1, the reference standard voltage VD2 corresponding to the charge amount of the non-controlled charge QD2 accumulated in the charge accumulation unit CS2, and the reference standard voltage VD3 corresponding to the charge amount of non-controlled charge QD3 accumulated in the charge accumulation unit CS3 are output from the pixel signal processing circuit 325 as pixel signals. The distance calculation unit 42 writes and stores each of the acquired reference standard voltages VD1, VD2, and VD3 to the correction parameter storage unit 43 together with identification information for identifying each of the pixels 321 in the light-receiving pixel portion 320. Alternatively, the distance calculation unit 42 may write and store each of the reference standard voltages VD1, VD2, and VD3 acquired in the same order as the order in which the pixel signals are read out from the pixel signal processing circuit 325 in the correction parameter storage unit 43.

Then, in the frame cycle for measuring the distance between the distance image sensor 32 and the subject S, as already described, the pixel signal processing circuit 325 outputs each of the pixel signals VQ1, VQ2, and VQ3 corresponding to each of the charge accumulation units CS1, CS2, and CS3 to the distance calculation unit 42 for each pixel 321 in correspondence with one frame as the pixel signals (digital values).

At this time, the distance calculation unit 42 sequentially reads out the reference reflected light voltages VC1, VC2, and VC3, and the reference standard voltages VD1, VD2, and VD3 corresponding to the read pixel 321 from the correction parameter storage unit 43.

Then, the distance calculation unit 42 calculates a reflected light total charge voltage VCALL corresponding to the charge amount of the charge generated by the reflected light in the reference reflected light voltage acquisition frame by using the following Formula (20).

$$VCALL = (VC2 - VC1) + (VC3 - VC1) \quad (20)$$

The distance calculation unit 42 extracts the reflected light charge component generated by the reflected light included in each of the reference reflected light voltages VC1, VC2, and VC3 as the reflected light total charge voltage VCALL, by the above Formula (20).

Then, the distance calculation unit 42 calculates the reflected light total charge voltage VQALL corresponding to the charge amount of the charge generated by the reflected light in the frame for measuring the distance between the distance image sensor 32 and the subject S, by the following Formula (21).

$$VQALL = (VQ2 - VQ1) + (VQ3 - VQ1) \quad (21)$$

The distance calculation unit 42 extracts the reflected light charge component generated by the reflected light included in each of the pixel signals VQ1, VQ2, and VQ3 as the reflected light total charge voltage VQALL, by the above Formula (21).

The distance calculation unit 42 divides the reflected light total charge voltage VQALL by the reflected light total charge voltage VCALL (VQALL/VCALL) to calculate the adjustment ratio $\beta$.

The adjustment ratio $\beta$ indicates the intensity ratio of the reflected light RL between the reference reflected light voltage acquisition frame and the frame for measuring the distance between the distance image sensor 32 and the subject S.

For this reason, the distance calculation unit 42 calculates adjustment voltages VR1, VR2, and VR3 for correcting each of the pixel signals VQ1, VQ2, and VQ3, by each of the following Formulas (22), (23), and (24).

$$VR1 = \beta \times VD1 = (VQALL/VCALL) \times VD1 \quad (22)$$

$$VR2 = \beta \times VD2 = (VQALL/VCALL) \times VD2 \quad (23)$$

$$VR3 = \beta \times VD3 = (VQALL/VCALL) \times VD3 \quad (24)$$

Then, the distance calculation unit 42 calculates each of the corrected pixel signals VQ1', VQ2', and VQ3', by each of the following Formulas (25), (26), and (27).

$$VQ1' = VQ1 - VR1 \quad (25)$$

$$VQ2' = VQ2 - VR2 \quad (26)$$

$$VQ3' = VQ3 - VR3 \quad (27)$$

The distance calculation unit 42 calculates the distance L between the distance image sensor 32 and the subject S by using the obtained corrected pixel signals VQ1', VQ2', and VQ3' according to Formula (8) in the first embodiment.

Fifth Embodiment

In the fourth embodiment above, before measuring the distance between the subject S and the distance image sensor 32, the reference reflected light voltage and the reference standard voltage are written and stored in the correction parameter storage unit 43 in advance, but in the fifth embodiment, a correction parameter is acquired for each distance measurement processing.

The present embodiment has the same configuration as the distance image capturing device 1 shown in the fourth embodiment already described, and thus operations different from the fourth embodiment will be described below.

In the present embodiment, two frames of each of the first frame and the second frame are used to acquire one distance image. For this reason, in the fourth embodiment, for example, distance measurement is performed 60 times per second, whereas in the present embodiment, distance measurement is performed 30 times per second.

Further, in the present embodiment as well, as in the fourth embodiment, the description will be made by using a state where background light does not exist, that is, a state where the background light is not incident on the distance image sensor 32 and is shielded from ambient light in a darkroom or the like.

In the present embodiment, (A) of FIG. 10 in the timing chart of FIG. 10 shows the timing chart of the first frame, and (B) of FIG. 10 shows the timing chart of the second frame.

In (A) of FIG. 10, in the first frame, similarly to the processing in the fourth embodiment, the optical pulse PO is emitted, and processing of receiving the reflected light RL from the subject S (delay time Td from the emission timing of the optical pulse PO) is performed to capture a distance image, and the pixel signals VQ1, VQ2, and VQ3 are obtained. Then, the distance calculation unit 42 writes and stores each of the acquired pixel signals VQ1, VQ2, and VQ3 to the correction parameter storage unit 43.

The pixel signal VQ1 is a voltage corresponding to the charge amount of the charges accumulated in the charge accumulation unit CS1. In addition, the pixel signal VQ2 is a voltage corresponding to the charge amount of the charges collected by the photodiode PD by the incident light including a portion of the reflected light RL and accumulated in the charge accumulation unit CS2, and the pixel signal VQ3 is a voltage corresponding to the charge amount of the charges collected by the photodiode PD by the incident light including a portion of the reflected light RL and accumulated in the charge accumulation unit CS3. Each of the pixel signals VQ1, VQ2, and VQ3 includes each of the reference standard voltages VD1, VD2, and VD3, which are voltage components of the non-controlled charges having the charge amount corresponding to the incident light.

In the second frame shown in (B) of FIG. 10, similar to the first frame shown in (A) of FIG. 10, in order to radiate the optical pulse PO, the reflected light RL from the subject S (delay time Td from the timing of radiating the optical pulse PO) is received. However, by the same processing as in (B) FIG. 5, the distance calculation unit 42 acquires each of the reference standard voltages VD1, VD2, and VD3 for each of the charge accumulation units CS1, CS2, and CS3.

Then, the distance calculation unit 42 reads each of the pixel signals VQ1, VQ2, and VQ3 from the correction parameter storage unit 43.

The distance calculation unit 42 sets each of the reference standard voltages VD1, VD2, and VD3 as each of adjustment voltages VO1, VO2, and VO3 of the pixel signals VQ1, VQ2, and VQ3, and calculates the corrected pixel signals VQ1', VQ2', and VQ3' by using the following Formulas (28), (29), and (30).

$$VQ1'=VQ1-VO1 \tag{28}$$

$$VQ2'=VQ2-VO2 \tag{29}$$

$$VQ3'=VQ3-VO3 \tag{30}$$

Then, the distance calculation unit 42 calculates the distance L between the subject S and the distance image sensor 32 in the distance image capturing device 1 by using the corrected pixel signals VQ1', VQ2', and VQ3' thus obtained, by using Formula (8).

According to the present embodiment, since each of the reference standard voltages VD1, VD2, and VD3 is acquired as a correction parameter for each distance calculation processing, and it is not necessary to write and store the reference reflected light voltages VC1, VC2, and VC3 and the reference standard voltages VD1, VD2, and VD3 corresponding to all the pixels 321 in the correction parameter storage unit 43 in advance as in the fourth embodiment, the capacity of the correction parameter storage unit 43 can be reduced.

In addition, according to the present embodiment, since the pixel signal for measurement is acquired in the first frame, and the pixel signal of the reference standard voltage for correcting the pixel signal for measurement is acquired in the next second frame, in addition to the method of measuring the delay of a single optical pulse shown in the present invention, similarly to the fourth embodiment, it can be applied to a TOF sensor using CW modulation, which emits continuously modulated light, obtains the phase shift amount between the radiation light and the reflected light, and uses it to calculate the distance, and can be applied to various other TOF sensors.

Sixth Embodiment

A distance image capturing device according to a sixth embodiment has the same configuration as that of the first embodiment shown in FIG. 1, and as shown in FIG. 3, the pixel 321 has three pixel signal readout units RU1, RU2, and RU3, and each of the pixel signal readout units RU1, RU2, and RU3 includes each of the charge accumulation units CS1, CS2, and CS3.

In the case of the configuration of the present embodiment, as in the first embodiment, in the charge accumulation unit CS1, the background light charge collected by the photodiode PD by the incident light only from the background light is distributed and accumulated during the distribution time Tw1 (the same time width as the pulse width Tw, and the same applies to Tw2, and Tw3 shown below). Each of the distribution times Tw1, Tw2, and Tw3 is the pulse width of the accumulation drive signal TX1 applied to readout gate transistor G1, the accumulation drive signal TX2 applied to the readout gate transistor G2, and the accumulation drive signal TX3 applied to the readout gate transistor G3, and each of Tw1, Tw2, and Tw3 is the same as the pulse width Tw of the optical pulse PO.

Similar to the timing chart of FIG. 4, the background light charge collected by the photodiode PD is distributed to the charge accumulation unit CS1 during the distribution time Tw1 before the optical pulse PO is emitted. In each of the charge accumulation units CS2 and CS3, as in the timing chart of FIG. 4, during each of the distribution time Tw2 when the optical pulse PO is emitted, and the next distribution time Tw3, the background light charge collected by the photodiode PD and the charge corresponding to the reflected light RL are distributed.

In addition, the sixth embodiment differs from the first embodiment in the operation of measuring the distance, and has a configuration in which each of the voltage component corresponding to the non-controlled charge generated by the reflected light RL in which the optical pulse PO (pulse width Tw) is reflected by the subject S and flowing into each of the charge accumulation units CS1, CS2, and CS3, the voltage component corresponding to the controlled charges generated by the background light RL and distributed to each of the charge accumulation units CS1, CS2, and CS3, and the voltage component corresponding to non-controlled charges generated by background light and flowing into each of the charge accumulation units CS1, CS2, and CS3 is subtracted and corrected from the pixel signals VQ1, VQ2, and VQ3, that is, the voltages (reflected light control voltages VCL2 and VCL3 which will be described later) corresponding only to the charge amounts (charge amounts QCL2 and QCL3 which will be described later) generated by the reflected light RL and collected in the photoelectric conversion element PD are calculated, and the distance between the distance image capturing device 1 and the subject S is obtained.

Figure 15:
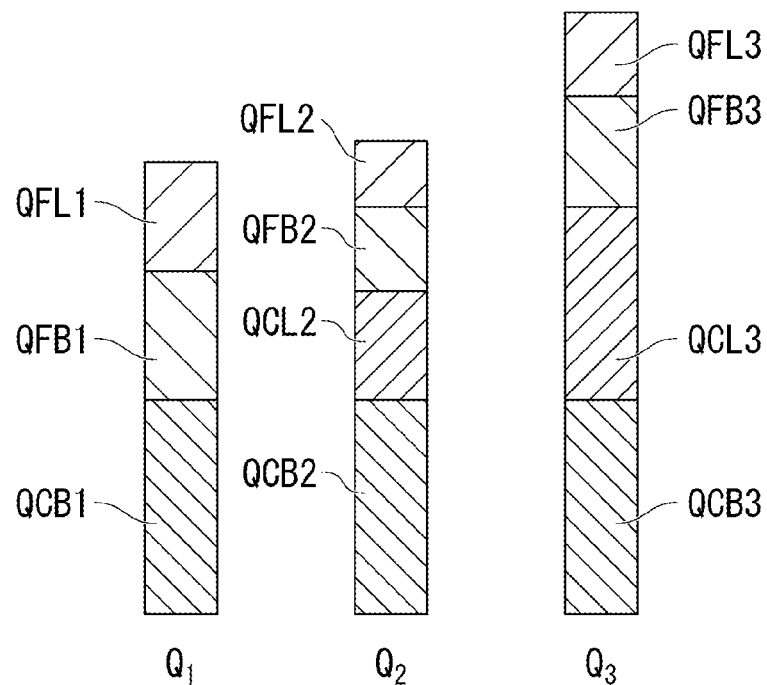
FIG. 15 is a conceptual diagram showing a relationship among charge amounts QCB1, QCB2, and QCB3, charge amounts QFB1, QFB2, and QFB3, charge amounts QCL2 and QCL3, and charge amounts QFL1, QFL2, and QFL3 in each of charge amounts Q1, Q2, and Q3 accumulated in each of charge accumulation units CS1, CS2, and CS3.

FIG. 15 is a conceptual diagram showing a relationship among the charge amounts QCB1, QCB2, and QCB3, the charge amounts QFB1, QFB2, and QFB3, charge amounts QCL1 (not shown, described later), QCL2, and QCL3, and the charge amounts QFL1, QFL2, and QFL3 in each of the charge amounts Q1, Q2, and Q3 accumulated in each of the charge accumulation units CS1, CS2, and CS3.

Here, each of the charge amounts QCB1, QCB2, and QCB3 is the charge amount of the controlled charges generated by the background light, collected in the photoelectric conversion element PD, and distributed to and accumulated in each of the charge accumulation units CS1, CS2, and CS3 by the readout gate transistors G1, G2, and G3 from the photoelectric conversion element PD. In addition, each of the charge amounts QFB1, QFB2, and QFB3 is the charge amount of the non-controlled charges generated by the background light and flowed into and accumulated in each of the charge accumulation units CS1, CS2, and CS3. Each of the charge amounts QCL1 (not shown, described later), QCL2, and QCL3 is the charge amount of the controlled charges generated by the reflected light RL, collected in the photoelectric conversion element PD, and distributed to and accumulated in each of the charge accumulation units CS1, CS2, and CS3 by the readout gate transistors G1, G2, and G3 from the photoelectric conversion element PD. The charge amounts QFL1, QFL2, and QFL3 are the charge amounts of non-controlled charges that are generated by the reflected light RL and flowed into and accumulated in each of the charge accumulation units CS1, CS2, and CS3. Here, among the electrons (charges) generated by incident light, the electrons (charges) collected in the photoelectric conversion element PD and distributed to the charge accumulation unit CS via the readout gate transistor G are the controlled charges, on the other hand, the electrons (charges) flowing into the charge accumulation unit CS without going through the readout gate transistor G are the non-controlled charges.

Figure 12:
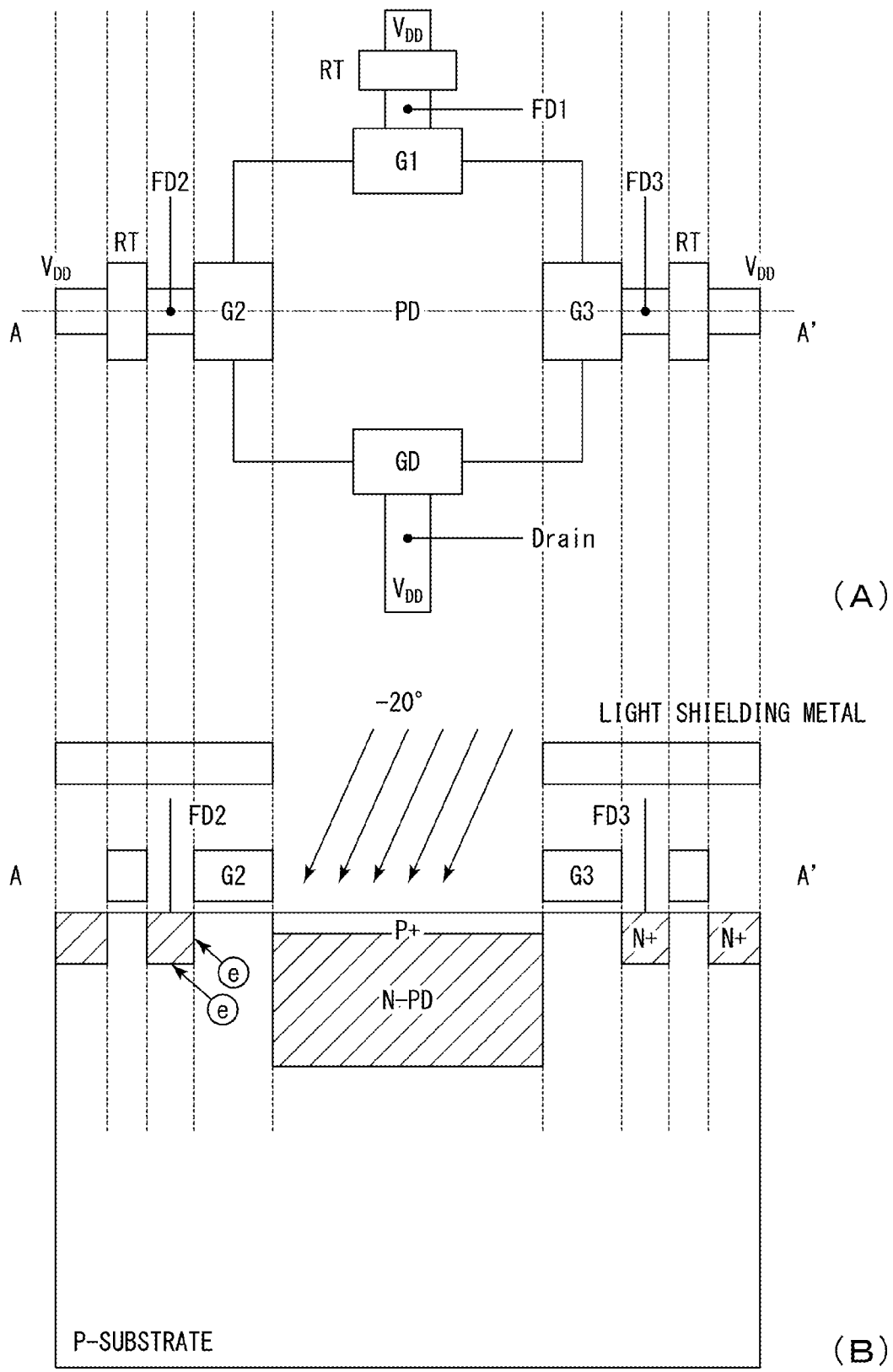
FIG. 12 is a diagram showing a generation of non-controlled charges QB1, QB2, and QB3 included in each of charges Q1, Q2, and Q3 depending on an incident angle of incident light with respect to a pixel.
Figure 13:
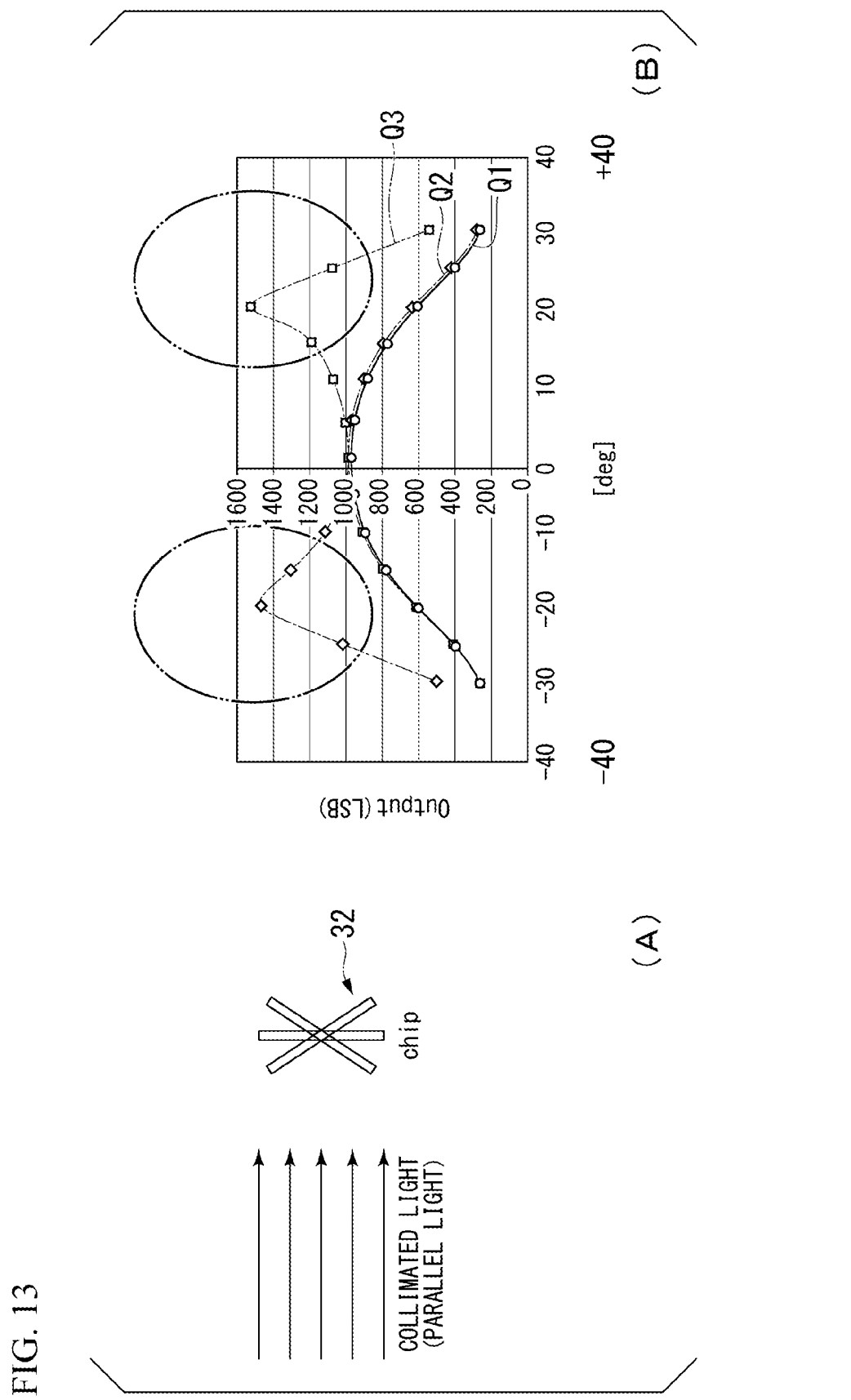
FIG. 13 is a diagram showing how a charge accumulated in a charge accumulation unit changes depending on an incident angle of incident light with respect to a sensor chip.
Figure 14:
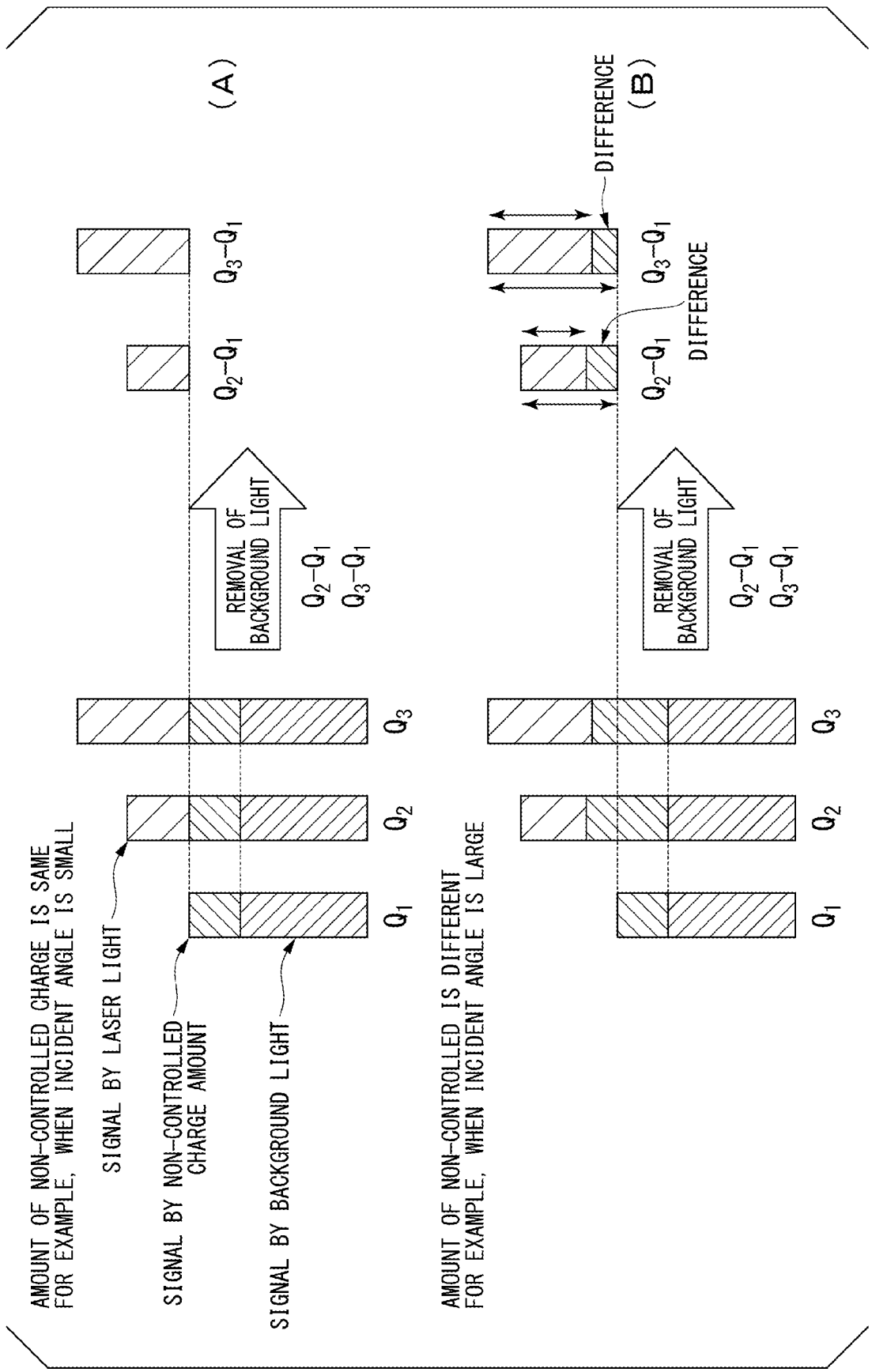
FIG. 14 is a conceptual diagram showing a relationship between each of non-controlled charges QB1, QB2, and QB3 in each of charges Q1, Q2, and Q3.

That is, the controlled charge by the reflected light RL is the charge generated by the reflected light RL and collected in the photoelectric conversion element PD, and is the charge distributed to each of the charge accumulation units CS1, CS2, and CS3 via each of the readout gate transistors G1, G2, and G3 (see FIGS. 3 and 12). In addition, the non-controlled charge by the reflected light RL is the charge generated by the reflected light RL, and is the charge flowing into each of the charge accumulation units CS1, CS2, and CS3 without going through the readout gate transistors G1, G2, and G3.

Similarly, the controlled charge by the background light is the charge generated by the background light and collected in the photoelectric conversion element PD, and is the charge distributed to each of the charge accumulation units CS1, CS2, and CS3 via each of the readout gate transistors G1, G2, and G3. In addition, the non-controlled charge by the background light is the charge generated by the background light, and is the charge flowing into each of the charge accumulation units CS1, CS2, and CS3 without going through the readout gate transistors G1, G2, and G3.

In the present embodiment, as the parameters necessary when subtracting and correcting the charge amounts QFB1, QFB2, and QFB3 by the non-controlled charges and the non-controlled voltages corresponding to the charge amounts QFL1, QFL2, and QFL3 from the signal voltages corresponding to the charge amounts accumulated in each of the charge accumulation units CS1, CS2, and CS3, and calculating the reflected light control voltages VCL2 and VCL3 corresponding only to the charge amounts QCL2 and QCL3 by the controlled charges, generated by the reflected light RL, collected in the photoelectric conversion element PD, and distributed by the readout gate transistors G1, G2, and G3, before starting a frame for distance measurement, each of the following parameters is acquired in advance and written and stored in the correction parameter storage unit 43.

That is, by the reference background light voltage acquisition frame in the already described first embodiment (a frame in which the readout gate transistor G is turned on and off in a state where the optical pulse PO shown in (A) of FIG. 5 is not emitted) and the reference standard voltage acquisition frame (a frame in which the readout gate transistor G is not driven in a state where the optical pulse PO shown in (B) of FIG. 5 is not emitted), a reference background light control voltage VPCB1 corresponding to a charge amount (controlled charge amount) QPCB1 of the controlled charge generated by the background light, which is distributed from the photoelectric conversion element PD via the readout gate transistor G1 and accumulated in the charge accumulation unit CS1, a reference background light control voltage VPCB2 corresponding to a controlled charge amount QPCB2 generated by the background light, read out from the photoelectric conversion element PD and distributed via the readout gate transistor G2, and accumulated in the charge accumulation unit CS2, a reference background light control voltage VPCB3 corresponding to a controlled charge amount QPCB3 generated by the background light, distributed from the photoelectric conversion element PD via the readout gate transistor G3 and accumulated in the charge accumulation unit CS3, a reference background light non-controlled voltage VPFB1 corresponding to a charge amount (non-controlled charge amount) QPFB1 of the non-controlled charge generated by background light and flowing into and accumulated in the charge accumulation unit CS1 in a non-controlled state, a reference background light non-controlled voltage VPFB2 corresponding to a non-controlled charge amount QPFB2 generated by background light and flowing into and accumulated in the charge accumulation unit CS2 in a non-controlled state, and a reference background light non-controlled voltage VPFB3 corresponding to a non-controlled charge amount QPFB3 generated by background light and flowing into and accumulated in the charge accumulation unit CS3 in a non-controlled state are acquired in advance, for example, when the distance image capturing device 1 is shipped or activated, that is, before capturing a distance image, and are written and stored in the correction parameter storage unit 43.

Alternatively, the reference background light voltage VA acquired in the reference background light voltage acquisition frame and the reference standard voltage VB acquired in the reference standard voltage acquisition frame are acquired in advance before the distance image is captured, and are written and stored in the correction parameter storage unit 43.

Of course, both the reference background light control voltage VPCB and the reference background light non-controlled voltage VPFB, and the reference background light voltage VA and the reference standard voltage VB may be acquired in advance before the distance image is captured, and may be written and stored in the correction parameter storage unit 43.

The processing of acquiring the reference background light control voltages VPCB1, VPCB2, and VPCB3 and the reference background light non-controlled voltages VPFB1, VPFB2, and VPFB3 will be described later.

In addition, by the reference reflected light voltage acquisition frame in the fourth embodiment (a frame in which the readout gate transistor G is turned on and off in a state where the optical pulse PO is emitted in a light-shielded environment, as shown in (A) of FIG. 10) and the reference standard voltage acquisition frame (a frame in which the readout gate transistor G is not driven in a state where the optical pulse PO is emitted in a light-shielded environment, as shown in (B) of FIG. 10), a reference reflected light control voltage VPCL1 corresponding to a controlled charge amount QPCL1 generated by the reflected light, distributed from the photoelectric conversion element PD via the readout gate transistor G1 and accumulated in the charge accumulation unit CS1, a reference reflected light control voltage VPCL2 corresponding to a controlled charge amount QPCL2 generated by the reflected light, distributed from the photoelectric conversion element PD via the readout gate transistor G2 and accumulated in the charge accumulation unit CS2, a reference reflected light control voltage VPCL3 corresponding to a controlled charge amount QPCL3 generated by the reflected light, distributed from the photoelectric conversion element PD via the readout gate transistor G3 and accumulated in the charge accumulation unit CS3, a reference reflected light non-controlled voltage VPFL1 corresponding to a non-controlled charge amount QPFL1 generated by reflected light and flowing into and accumulated in the charge accumulation unit CS1 in a non-controlled state, a reference reflected light non-controlled voltage VPFL2 corresponding to a non-controlled charge amount QPFL2 generated by reflected light and flowing into and accumulated in the charge accumulation unit CS2 in a non-controlled state, and a reference reflected light non-controlled voltage VPFL3 corresponding to a non-controlled charge amount QPFL3 generated by reflected light and flowing into and accumulated in the charge accumulation unit CS3 in a non-controlled state are acquired in advance, for example, when the distance image capturing device 1 is shipped or activated, that is, before capturing a distance image, and are written and stored in the correction parameter storage unit 43.

Alternatively, the reference reflected light voltage VC acquired in the reference reflected light voltage acquisition frame and the reference standard voltage VD acquired in the reference standard voltage acquisition frame are acquired in advance before the distance image is captured, and are written and stored in the correction parameter storage unit 43.

Of course, both the reference reflected light control voltage VPCL and the reference reflected light non-controlled voltage VPFL, and the reference reflected light voltage VC and the reference standard voltage VD may be acquired in advance before the distance image is captured, and may be written and stored in the correction parameter storage unit 43.

The processing of acquiring the reference reflected light control voltages VPCL1, VPCL2, and VPCL3 and the reference reflected light non-controlled voltages VPFL1, VPFL2, and VPFL3 described above will be described later.

In addition, in the first embodiment, in the non-controlled charge by the background light, as described with reference to FIG. 6, the background light is emitted to the distance image sensor 32 to generate electrons, accumulated in the charge accumulation unit CS, over a charge accumulation period (Integration) in which an optical pulse PO is emitted to accumulate charges in the charge accumulation unit CS and a pixel signal readout period (Read) in which charges are read out from the charge accumulation unit CS. That is, the non-controlled charges by the background light continue to flow into the charge accumulation unit CS and are accumulated as they are in the period of approximately one frame (Integration+Read).

On the other hand, the non-controlled charge by the reflected light RL is accumulated in the charge accumulation unit CS only during the charge accumulation period (Integration).

That is, the period in which the non-controlled charge by the background light is accumulated is longer than the period in which the non-controlled charge by the reflected light RL is accumulated.

For this reason, the non-controlled charge amount flowing into and accumulated in the charge accumulation unit CS is dominated by the amount of background light. However, since the influence of the non-controlled charge amount by the reflected light RL increases as the background light intensity decreases, in the present embodiment, the accuracy of distance measurement is further improved by correcting the non-controlled voltage corresponding to the non-controlled charge amount by both the background light and the reflected light RL.

Next, in the present embodiment, processing of correcting the non-controlled voltage by the non-controlled charge flowing into the charge accumulation unit CS without going through the readout gate transistor G, extracting only the reflected light control voltages (reflected light control voltages VCL2 and VCL3) based on the charge amounts of the controlled charges generated by the reflected light RL, collected in the photoelectric conversion element PD and distributed to the charge accumulation unit CS via the readout gate transistor G, and calculating the distance between the subject S and the distance image capturing device 1 by using the reflected light control voltage will be described.

The pixel signals VQ1, VQ2, and VQ3 supplied from the pixel circuit 321 of the light-receiving unit 3, in correspondence with each of the charge amounts Q1, Q2, and Q3 accumulated in each of the charge accumulation units CS1, CS2, and CS3 shown in FIG. 15 are indicated by the following Formulas (31) to (33).

$$VQ1=VCB1+VCL1+VFB1+VFL1 \quad (31)$$

$$VQ2=VCB2+VCL2+VFB2+VFL2 \quad (32)$$

$$VQ3=VCB3+VCL3+VFB3+VFL3 \quad (33)$$

In the above Formulas (31) to (33), VCB is a voltage corresponding to the charge amount generated by the background light, distributed by the readout gate transistor G from the photoelectric conversion element PD, and accumulated in the charge accumulation unit CS, that is, a background light control voltage corresponding to the controlled charge amount QCB by the background light. VCL is a voltage corresponding to the charge amount generated by the reflected light, distributed from the photoelectric conversion element PD by the readout gate transistor G, and accumulated in the charge accumulation unit CS, that is a reflected light control voltage corresponding to the controlled charge amount QCL by the reflected light RL. VFB is a voltage corresponding to the charge amount generated by the background light and flows into and is accumulated in the charge accumulation unit CS in a non-controlled state, that is, a background light non-controlled voltage corresponding to the non-controlled charge amount QFB by the background light. VFL is a voltage corresponding to the charge amount generated by the reflected light, flows into and is accumulated in the charge accumulation unit CS in a non-controlled state, that is, a reflected light non-controlled voltage corresponding to the non-controlled charge amount QFL by the reflected light RL.

In the above Formula (31), since the optical pulse PO is radiated after the charge is distributed from the photoelectric conversion element PD to the charge accumulation unit CS1, the reflected light RL is not incident on the distance image sensor 32 at the time point when the charge is distributed to the charge accumulation unit CS1. Therefore, in the charge accumulation unit CS1, the controlled charge amount QCB1 and non-controlled charge amount QFB1 by the background light and the non-controlled charge amount QFL1 by the reflected light RL are accumulated as the charge amount Q1, and the controlled charge amount QCL1 by the reflected light RL is not accumulated. For this reason, the reflected light control voltage VCL1 becomes 0 as shown by the following Formula (34).

$$VCL1=0 \tag{34}$$

In addition, in each of the background light control voltages VCB1, VCB2, and VCB3, since the charges generated by the background light and collected in the photoelectric conversion element PD are distributed to the charge accumulation units CS1, CS2, and CS3 via the readout gate transistors G1, G2, and G3 by the accumulation drive signals TX1, TX2, and TX3 having the same pulse width, the same voltage value is obtained as shown in the following Formula (35).

$$VCB1=VCB2=VCB3 \tag{35}$$

Accordingly, each of the Formulas (31), (32), and (33) is derived from Formulas (34) and (35) into each of the following Formulas (36), (37), and (38).

$$VQ1=VCB1+VFB1+VFL1 \tag{36}$$

$$VQ2=VCB1+VCL2+VFB2+VFL2 \tag{37}$$

$$VQ3=VCB1+VCL3+VFB3+VFL3 \tag{38}$$

The pixel signals VQ1, VQ2, and VQ3 described above are actually measured values in the frame for distance measurement, and are known values.

However, the background light control voltage VCB1, the background light non-controlled voltages VFB1, VFB2, and VFB3, the reflected light control voltages VCL2 and VCL3, and the reflected light non-controlled voltages VFL1, VFL2, and VFL3, that are the parameters that constitute each of the pixel signals VQ1, VQ2, and VQ3, are each unknown because they are mixed as the charge amounts as shown in FIG. 15.

When each of the background light control voltage VCB1 and the reflected light control voltages VCL2 and VCL3 can be obtained among the unknown values, the distance between the subject S and the distance image capturing device 1 can be calculated.

As already described in FIG. 5 in the first embodiment, in the reference background light voltage acquisition frame ((A) of FIG. 5) in the state where the optical pulse PO is not emitted, the accumulation drive signals TX1, TX2, and TX3 are driven to acquire the reference background light voltages VA1, VA2, and VA3 corresponding to the charges accumulated in each of the charge accumulation units CS1, CS2, and CS3. In addition, in the reference standard voltage acquisition frame ((B) of FIG. 5), the reference standard voltages VB1, VB2, and VB3 corresponding to the charges accumulated in each of the charge accumulation units CS1, CS2, and CS3 are acquired without driving the accumulation drive signals TX1, TX2, and TX3.

Here, the reference background light voltage VA acquired in the reference background light control voltage acquisition frame is the sum of the reference background light control voltage VPCB corresponding to the charge amount generated by the background light and distributed to and accumulated in the charge accumulation unit CS by the readout gate transistor G from the photoelectric conversion element PD, and the reference background light non-controlled voltage VPFB corresponding to the charge amount that flows into and is accumulated in the charge accumulation unit CS in a non-controlled state.

In addition, the reference standard voltage VB acquired in the reference standard voltage acquisition frame is a reference background light non-controlled voltage VPFB that is generated by the background light and corresponds to the charge amount that flows into and is accumulated in the charge accumulation unit CS in a non-controlled state.

For this reason, each of the reference background light control voltages VPCB1, VPCB2, and VPCB3 is represented by the following Formula (39) by using the reference background light voltage VA1 and the reference standard voltage VB1.

$$VPCB1=VPCB2=VPCB3=VA1-VB1 \tag{39}$$

In addition, each of the reference background light non-controlled voltages VPFB1, VPFB2, and VPFB3 is represented by the following Formulas (40) to (42) by using the reference standard voltages VB1, VB2, and VB3.

$$VPFB1=VB1 \tag{40}$$

$$VPFB2=VB2 \tag{41}$$

$$VPFB3=VB3 \tag{42}$$

By using the reference background light voltages VA1, VA2, and VA3 acquired in the reference background light voltage acquisition frame and the reference standard voltage acquisition frame, and the reference standard voltages VB1, VB2, and VB3, according to the above Formulas (39) to (42), the reference background light control voltage VPCB corresponding to the controlled charge amount by the background light and the reference background light non-controlled voltage VPFB corresponding to the non-controlled charge amount by the background light can be represented.

The difference between each of the reference background light control voltage VPCB obtained from each of the reference background light voltage VA acquired in the reference background light voltage acquisition frame ((A) of FIG. 5), the reference standard voltage VB acquired in the reference standard voltage acquisition frame ((B) of FIG. 5), the reference background light non-controlled voltage VPFB, the background light control voltage VCB acquired in the frame for distance measurement, and the background light non-controlled voltage VFB is due to the difference in the incident background light intensity due to different environments.

Therefore, a ratio CP1 between the reference background light control voltage VPCB obtained by using the reference background light voltage acquisition frame and the reference standard voltage acquisition frame and the background light control voltage VCB acquired in the frame for measuring the distance, and a ratio CP2 between the reference background light non-controlled voltage VPFB and the background light non-controlled voltage VFB acquired in the frame for distance measurement are the same when each voltage is in a signal level having linearity.

As described above, since the ratio CP1 and the ratio CP2 are the same, a background light correction coefficient R_B between the reference background light non-controlled voltage VPFB, the background light non-controlled voltage VFB, the reference background light control voltage VPCB, and the background light control voltage VCB is represented by the following Formula (43).

$$R\_B = \text{(background light non-controlled voltage of distance measurement frame)/(reference background light non-controlled voltage)}$$

$$= VFB/VPFB$$

$$= \text{(background light control voltage of distance measurement frame)/(reference background light control voltage)}$$

$$= VCB/VPCB \quad (43)$$

In addition, the above Formula (43) is also represented as the following Formula (44) by using the relationship between Formulas (35) and (39).

$$R\_B = VCB1/VPCB1 \quad (44)$$

By using Formulas (39), (43), and (44) described above, the background light correction coefficient R_B is represented by the following Formula (45).

$$R\_B = VCB1/VPCB1$$

$$= VCB1/(VA1-VB1)$$

$$= VFB1/VPFB1$$

$$= VFB2/VPFB2$$

$$= VFB3/VPFB3 \quad (45)$$

From the above Formula (45), each of the background light non-controlled voltages VFB1, VFB2, and VFB3 corresponding to the background light is represented by each of the following Formulas (46), (47), and (48).

$$VFB1 = R\_B \times VPFB1 = R\_B \times VB1 \quad (46)$$

$$VFB2 = R\_B \times VPFB2 = R\_B \times VB2 \quad (47)$$

$$VFB3 = R\_B \times VPFB3 = R\_B \times VB3 \quad (48)$$

According to each of the above Formulas (46), (47), and (48), each of the background light non-controlled voltages VFB1, VFB2, and VFB3 at the time of the frame for distance measurement can be obtained from each of the reference background light non-controlled voltages VPFB1, VPFB2, and VPFB3 and the background light correction coefficient R_B.

In addition, when the background light correction coefficient R_B can also be acquired by referring to the background light control voltage VCB1 to be obtained and the known reference background light voltage VA1 and reference standard voltage VB1 stored in the correction parameter storage unit 43, when paying attention to the part of "R_B=VCB1/(VA1−VB1)" in the above Formula (45).

Next, processing of obtaining the reflected light non-controlled voltage VFL in the frame for measuring the distance from the reference reflected light control voltage VPCL by the reflected light RL and the reference reflected light non-controlled voltage VPFL, obtained from the reference reflected light voltage VC acquired in the reference reflected light voltage acquisition frame ((A) of FIG. 10) and the reference standard voltage VD acquired in the reference standard voltage acquisition frame ((B) of FIG. 10), will be described.

First, in an environment where light is shielded and background light is not incident, in the reference reflected light voltage acquisition frame ((A) of FIG. 10) according to the state where the optical pulse PO is emitted, the accumulation drive signals TX1, TX2, and TX3 are driven to acquire each of the reference reflected light voltages VC1, VC2, and VC3 corresponding to the charge amounts accumulated in each of the charge accumulation units CS1, CS2, and CS3. In addition, in the reference standard voltage acquisition frame ((B) of FIG. 10) according to the state where the optical pulse PO is emitted, the reference standard voltages VD1, VD2, and VD3 corresponding to the charges generated by the reflected light RL flowing into the charge accumulation unit CS are acquired without driving the accumulation drive signals TX1, TX2, and TX3 (acquired in the same manner as in the first embodiment).

Here, the reference reflected light voltage VC acquired in the reference reflected light control voltage acquisition frame is the sum of the reference reflected light control voltage VPCL corresponding to the charge amount generated by the reflected light, distributed from the photoelectric conversion element PD by the readout gate transistor G, and accumulated in the charge accumulation unit CS, and the reference background light non-controlled voltage VPFL corresponding to the charge amount that flows into and is accumulated in the charge accumulation unit CS in a non-controlled state.

In addition, the reference standard voltage VD acquired in the reference standard voltage acquisition frame is a reference reflected light non-controlled voltage VPFL that is generated by the reflected light and corresponds to the charge amount that flows into and is accumulated in the charge accumulation unit CS in a non-controlled state.

Therefore, each of the reference reflected light control voltages VPCL1, VPCL2, and VPCL3 is represented by each of the following Formulas (49), (50), and (51) by using the reference reflected light voltages VC1, VC2, and VC3 and the reference standard voltages VD1, VD2, and VD3.

$$VPCL1 = VC1 - VD1 \quad (49)$$

$$VPCL2 = VC2 - VD2 \quad (50)$$

$$VPCL3 = VC3 - VD3 \quad (51)$$

In addition, each of the reference reflected light non-controlled voltages VPFL1, VPFL2, and VPFL3 corresponding to the reflected light is represented by each of the following Formulas (52), (53), and (54) by using the reference standard voltages VD1, VD2, and VD3.

$$VPFL1 = VD1 \quad (52)$$

$$VPFL2 = VD2 \quad (53)$$

$$VPFL3 = VD3 \quad (54)$$

From the above Formulas (49) to (54), by using the reference reflected light voltages VC1, VC2, and VC3 acquired in the reference reflected light voltage acquisition frame ((A) of FIG. 10) and the reference standard voltages VD1, VD2, and VD3 acquired in the reference standard voltage acquisition frame ((B) of FIG. 10), the reference reflected light control voltage VPCL corresponding to the controlled charge by the reflected light and the reference reflected light non-controlled voltage VPFL corresponding to the non-controlled charge by the reflected light can be represented.

Further, in the frame for measuring the distance, when the charge accumulation unit CS1 is a charge accumulation unit that accumulates only the background light, since the controlled charges generated by the reflected light are accumulated in the charge accumulation units CS2 and CS3, the reflected light total controlled charge voltage VCALL corresponding to the total charge amount of controlled charges generated by the reflected light RL is represented by the following Formula (55).

$$VCALL=VCL2+VCL3 \quad (55)$$

Similarly, a reference reflected light total controlled charge voltage VPCALL corresponding to the total charge amount of the controlled charges generated by the reflected light RL, acquired in the reference reflected light voltage acquisition frame ((A) of FIG. 10) and the reference standard voltage acquisition frame ((B) of FIG. 10) is represented by the following Formula (56).

$$VPCALL=VPCL2+VPCL3$$

$$=(VC2-VD2)+(VC3-VD3) \quad (56)$$

In addition, the difference between each of the reference reflected light control voltage VPCL obtained from each of the reference reflected light voltage VC acquired in the reference reflected light voltage acquisition frame ((A) of FIG. 10) and the reference standard voltage VD acquired in the reference standard voltage acquisition frame ((B) of FIG. 10), the reference reflected light non-controlled voltage VPFL, the reflected light control voltage VCL acquired in the frame for measuring distance, and the reflected light non-controlled voltage VFL is due to the difference in the intensity of the incident reflected light RL.

Therefore, a ratio CP3 between the reference reflected light control voltage VPCL obtained by using the reference reflected light voltage acquisition frame and the reference standard voltage acquisition frame and the reflected light control voltage VCL acquired in the frame for distance measurement, and a ratio CP4 between the reference reflected light non-controlled voltage VPFL and the reflected light non-controlled voltage VFL acquired in the frame for distance measurement are the same when each voltage is in a signal level having linearity.

As described above, since the ratio CP3 and the ratio CP4 are the same, a reflected light correction coefficient R_L among the reference reflected light non-controlled voltage VPFL, the reflected light non-controlled voltage VFL, the reference reflected light control voltage VPCL, and the reflected light control voltage VCL is represented by the following Formula (57).

R_L=(reflected light non-controlled voltage of distance measurement frame)/(reference reflected light non-controlled voltage)

$$=VFL/VPFL$$

=(reflected light control voltage of distance measurement frame)/(reference reflected light control voltage)

$$=VCL/VPCL \quad (57)$$

In addition, the above Formula (57) is also represented as the following Formula (58) by using the relationship between Formulas (55) and (56) showing the total charge amount of the controlled charges generated by the reflected light RL.

R_L=(reflected light total controlled charge voltage of distance measurement frame)/(reference reflected light total controlled charge voltage)

$$=VCALL/VPCALL \quad (58)$$

By using Formulas (57) and (58) described above, the reflected light correction coefficient R_L is represented by the following Formula (59).

$$R\_L=(VCL2+VCL3)/((VC2-VD2)+(VC3-VD3))$$

$$=VFL1/VPFL1$$

$$=VFL2/VPFL2$$

$$=VFL3/VPFL3 \quad (59)$$

From the above Formula (59), each of the reflected light non-controlled voltages VFL1, VFL2, and VFL3 is represented by the following Formulas (60), (61), and (62) by using the reflected light correction coefficient R_L.

$$VFL1=R\_L \times VPFL1=R\_L \times VD1 \quad (60)$$

$$VFL2=R\_L \times VPFL2=R\_L \times VD2 \quad (61)$$

$$VFL3=R\_L \times VPFL3=R\_L \times VD3 \quad (62)$$

According to each of the above Formulas (60), (61), and (62), each of the reflected light non-controlled voltages VFL1, VFL2, and VFL3 at the time of the frame for distance measurement can be obtained from the reference reflected light non-controlled voltage and the reflected light correction coefficient R_L.

In addition, the reflected light correction coefficient R_L can be acquired by referring to the reflected light control voltages VCL2 and VCL3 to be obtained and the known reference reflected light voltages VC2 and VC3 and the reference standard voltages VD2 and VD3 stored in the correction parameter storage unit 43, when focusing on the part "R_L=(VCL2+VCL3)/((VC2−VD2)+(VC3−VD3))" in Formula (59).

From the above, each of the background light non-controlled voltages VFB1, VFB2, and VFB3 and the reflected light non-controlled voltages VFL1, VFL2, and VFL3, which are unknowns in Formulas (36), (37), and (38) is a simultaneous three-dimensional linear equation consisting of the reference background light voltage VA1, the reference standard voltages VB1, VB2, and VB3, the reference reflected light voltages VC2 and VC3, the reference standard voltages VB1, VB2, and VB3, the background light control voltage VCB1 to be obtained, and reflected light control voltages VCL2 and VCL3 stored in the correction parameter storage unit 43.

Since there are only three unknowns in this simultaneous three-dimensional linear equation, the background light control voltage VCB1 to be obtained and the reflected light control voltages VCL2 and VCL3, the solution can be obtained strictly.

That is, the distance calculation unit 42 obtains the background light control voltage VCB1 and the reflected light control voltages VCL2 and VCL3 by solving the above-described simultaneous three-dimensional linear equation, and calculates the distance L between the distance image capturing device 1 and the subject S by Formula (63) described later.

Alternatively, by storing the solution obtained by solving the above simultaneous three-dimensional linear equation in a storage unit or writing it in a program, and obtaining the background light control voltage VCB1 and the reflected light control voltages VCL2 and VCL3, the distance L between the distance image capturing device 1 and the subject S is calculated.

As described above, in the reference background light voltage acquisition frame ((A) of FIG. 5), the reference standard voltage acquisition frame ((B) of FIG. 5), the reference reflected light voltage acquisition frame ((A) of FIG. 10), and the reference standard voltage acquisition frame ((B) of FIG. 10), the reference background light voltages VA1, VA2, and VA3, the reference reflected light voltages VC1, VC2, and VC3, and the reference standard voltages VB1, VB2, VB3, VD1, VD2, and VD3 are acquired as actually measured values, and are written and stored in the correction parameter storage unit 43 together with identification information for identifying each of the pixels 321 in the light-receiving pixel portion 320.

Alternatively, by using Formulas (39) to (42) and Formulas (49) to (54), from each of the reference background light voltages VA1, VA2, and VA3, the reference reflected light voltages VC1, VC2, and VC3, and the reference standard voltages VB1, VB2, VB3, VD1, VD2, and VD3, each of the reference background light control voltages VPCB1, VPCB2, and VPCB3, the reference background light non-controlled voltages VPFB1, VPFB2, and VPFB3, the reference reflected light control voltages VPCL1, VPCL2, and VPCL3, and reference reflected light non-controlled voltages VPFL1, VPFL2, and VPFL3 is obtained, and is written and stored in the correction parameter storage unit 43 together with identification information for identifying each of the pixels 321 in the light-receiving pixel portion 320.

In addition, a configuration may be adopted in which each of the reference background light voltages VA1, VA2, and VA3, the reference reflected light voltages VC1, VC2, and VC3, and the reference standard voltages VB1, VB2, VB3, VD1, VD2, and VD3 is written and stored in the correction parameter storage unit 43 together with identification information identifying each of the pixels 321 in the light-receiving pixel portion 320, and each of the reference background light control voltages VPCB1, VPCB2, and VPCB3, the reference background light non-controlled voltages VPFB1, VPFB2, and VPFB3, the reference reflected light control voltages VPCL1, VPCL2, and VPCL3, and the reference reflected light non-controlled voltages VPFL1, VPFL2, and VPFL3, which is obtained with reference to these is also written and stored in the correction parameter storage unit 43.

Then, the distance calculation unit 42 refers to, in the frame for distance measurement, each time each of the pixel signals VQ1, VQ2, and VQ3 is obtained, each of the reference background light voltages VA1, VA2, and VA3, the reference reflected light voltages VC1, VC2, and VC3, and the reference standard voltages VB1, VB2, VB3, VD1, VD2, and VD3 stored in the correction parameter storage unit 43, or the reference background light control voltages VPCB1, VPCB2, and VPCB3, the reference background light non-controlled voltages VPFB1, VPFB2, and VPFB3, the reference reflected light control voltages VPCL1, VPCL2, and VPCL3, and reference reflected light non-controlled voltages VPFL1, VPFL2, and VPFL3, and solves the simultaneous three-dimensional linear equation to calculate the background light control voltage VCB1 and the reflected light control voltages VCL2 and VCL3. Alternatively, by storing the solution obtained by solving the above simultaneous three-dimensional linear equation in a storage unit or writing it in a program, the background light control voltage VCB1 and the reflected light control voltages VCL2 and VCL3 are calculated.

In addition, the distance calculation unit 42 calculates the distance L between the distance image sensor 32 and the subject S by using each of the background light control voltage VCB1 and the reflected light control voltages VCL2 and VCL3, by using the following Formula (63) corresponding to the already described Formula (1).

$$L = ((V3-V1)/(V2+V3-2V1)) \times Dm$$

$$= (((VCB1+VCL3)-VCB1)/((VCB1+VCL2)+(VCB1+VCL3)-2\times VCB1)) \times Dm$$

$$= (VCL3/(VCL2+VCL3)) \times Dm \quad (63)$$

In the above Formula (63), Dm is (c/2)Tw. Tw is the pulse width of the optical pulse PO.

According to the present embodiment, even when the ratio of the charge amount of the non-controlled charge accumulated without going through the readout gate transistor G to the charge amount of the controlled charge accumulated in the charge accumulation unit CS through the readout gate transistor G increases, even when the area of the pixel 321 is reduced, and even when the non-controlled charges, which are included in each of the charges accumulated in the charge accumulation units CS and have different charge amounts depending on the incident angle of the incident light, vary greatly, the influence of each can be eliminated, and the distance L between the distance image capturing device 1 and the subject S can be obtained with the same or higher accuracy than when the pixel area is not reduced.

In addition, according to the present embodiment, after the distance image capturing device 1 is assembled with the lens 31 attached, without using special calibration equipment, the reference background light voltages VA1, VA2, and VA3, the reference reflected light voltages VC1, VC2, and VC3, and the reference standard voltages VB1, VB2, VB3, VD1, VD2, and VD3 can be measured. Further, it is possible to easily and accurately calculate each of the reflected light control voltages VCL2 and VCL3 corresponding to the charge amounts generated by the reflected light RL, collected in the photoelectric conversion element PD, and distributed to the charge accumulation units CS2 and CS3 by the readout gate transistors G2 and G3, that does not include the background light non-controlled voltage VFB and the reflected light non-controlled voltage VFL, by corresponding to the individual characteristics of the attached lens 31 or the difference or the like in the relative position between the attached lens 31 and the distance image sensor 32.

Seventh Embodiment

Although a distance image capturing device according to a seventh embodiment has the same configuration as that of the sixth embodiment described above, while the pixel 321 of the sixth embodiment has three pixel signal readout units RU1, RU2, and RU3 as shown in FIG. 3, in the present embodiment, the pixel 321 has four pixel signal readout units RU1, RU2, RU3, and RU4 (now shown).

Each of the pixel signal readout units RU1, RU2, RU3, and RU4 includes each of the charge accumulation units CS1, CS2, CS3, and CS4 (not shown).

In the case of the configuration of the present embodiment, as in the sixth embodiment, in the charge accumulation unit CS1, the background light charge collected by the photodiode PD by the incident light only by the background light is distributed and accumulated during the distribution time Tw1 (the same time width as the pulse width Tw, and the same applies to Tw2, Tw3, and Tw4 shown below). Each of the distribution times Tw1, Tw2, Tw3, and Tw4 (not shown) is the pulse width of the accumulation drive signal TX1 applied to readout gate transistor G1, the accumulation drive signal TX2 applied to the readout gate transistor G2, the accumulation drive signal TX3 applied to the readout gate transistor G3, and the accumulation drive signal TX4 (not shown) applied to the readout gate transistor G4 (not shown). Each of Tw1, Tw2, Tw3, and Tw4 is the same as the pulse width Tw of the optical pulse PO.

Similar to the timing chart of FIG. 4, the background light charge collected by the photodiode PD is distributed to the charge accumulation unit CS1 during the distribution time Tw1 before the optical pulse PO is emitted. In each of the charge accumulation units CS2, CS3, and CS4, as in the timing chart of FIG. 4, at each of the distribution time Tw2 when the optical pulse PO is emitted, the next distribution time Tw3, and the next distribution time Tw4, the background light charge collected by the photodiode PD and the charge corresponding to the reflected light RL are distributed.

Figure 16:
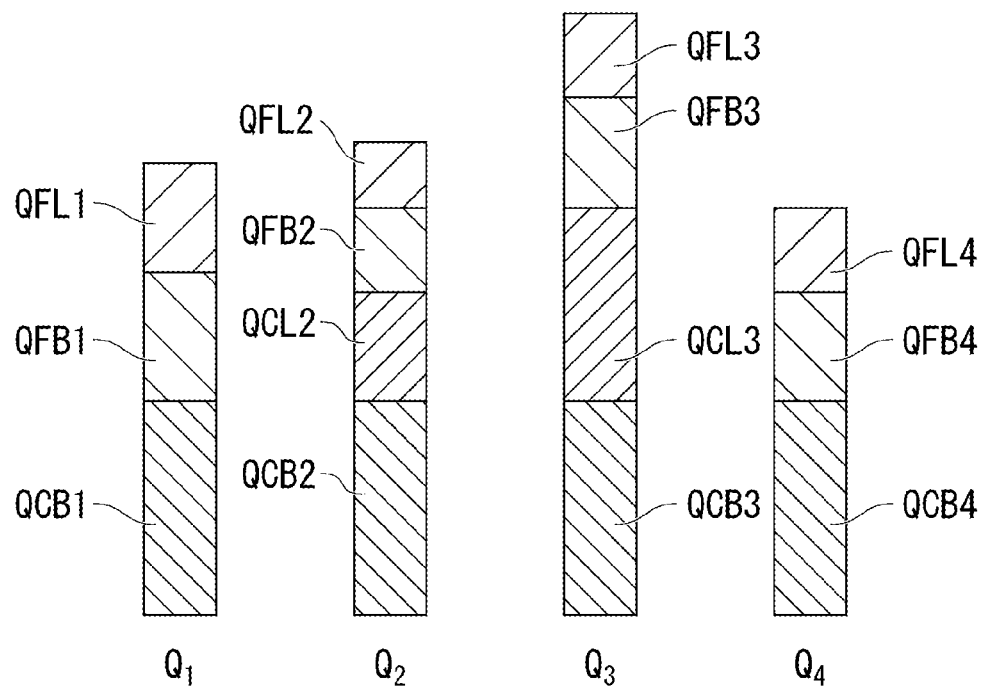
FIG. 16 is a conceptual diagram showing a relationship among charge amounts QCB1, QCB2, QCB3, and QCB4, charge amounts QFB1, QFB2, QFB3, and QFB4, charge amounts QCL2 and QCL3, and charge amounts QFL1, QFL2, QFL3, and QFL4 in each of charge amounts Q1, Q2, Q3, and Q4 accumulated in each of charge accumulation units CS1, CS2, CS3, and CS4.

FIG. 16 is a conceptual diagram showing a relationship among charge amounts QCB1, QCB2, QCB3, and QCB4, charge amounts QFB1, QFB2, QFB3, and QFB4, charge amounts QCL1 (not shown, described later), QCL2, QCL3, and QCL4 (not shown, described later), and charge amounts QFL1, QFL2, QFL3, and QFL4 in each of the charge amounts Q1, Q2, Q3, and Q4 accumulated in each of the charge accumulation units CS1, CS2, CS3, and CS4.

That is, each of the charge amounts QCB1, QCB2, QCB3, and QCB4 is the charge amount of the controlled charges generated by the background light, collected in the photoelectric conversion element PD, and distributed to and accumulated in each of the charge accumulation units CS1, CS2, CS3, and CS4 by the readout gate transistors G1, G2, G3, and G4 from the photoelectric conversion element PD. In addition, each of the charge amounts QFB1, QFB2, QFB3, and QFB4 is the charge amount of non-controlled charges generated by background light and flowed into and accumulated in each of the charge accumulation units CS1, CS2, CS3, and CS4. Each of the charge amounts QCL1 (not shown, described later), QCL2, QCL3, and QCL4 (not shown, described later) is the charge amount of the controlled charges generated by the reflected light, collected in the photoelectric conversion element PD, and distributed to and accumulated in each of the charge accumulation units CS1, CS2, CS3, and CS4 by the readout gate transistors G1, G2, G3, and G4 from the photoelectric conversion element PD. Each of the charge amounts QFL1, QFL2, QFL3, and QFL4 is the charge amount of the non-controlled charge that is generated by the reflected light and flowed into and accumulated in each of the charge accumulation units CS1, CS2, CS3, and CS4.

Here, the controlled charge by the reflected light RL is the charge collected by the photodiode PD and distributed to each of the charge accumulation units CS1, CS2, CS3, and CS4 via each of the readout gate transistors G1, G2, G3, and G4 (see FIGS. 3 and 12). In addition, the non-controlled charge by the reflected light RL is the charge that flows into without going through the readout gate transistors G1, G2, G3, and G4.

Similarly, the controlled charge by the background light is the charge collected by the photodiode PD and distributed to each of the charge accumulation units CS1, CS2, CS3, and CS4 via each of the readout gate transistors G1, G2, G3, and G4. In addition, the non-controlled charge by the background light is the charge that flows into without going through the readout gate transistors G1, G2, G3, and G4.

In the present embodiment, in addition to the reference background light control voltages VPCB1, VPCB2, and VPCB3 and the reference background light non-controlled voltages VPFB1, VPFB2, and VPFB3 in the sixth embodiment, a reference background light control voltage VPCB4 corresponding to a background light charge amount QPCB4 generated by the background light, which is distributed from the photoelectric conversion element PD via the readout gate transistor G4 and accumulated in the charge accumulation unit CS4, and a reference background light non-controlled voltage VPFB4 corresponding to a non-controlled charge amount QPFB4 generated by the background light and flowing into and accumulated in the charge accumulation unit CS4 in a non-controlled state are acquired in advance, for example, when the distance image capturing device 1 is shipped or activated, that is, before capturing a distance image, and are written and stored in the correction parameter storage unit 43.

Alternatively, the reference background light voltage VA acquired in the reference background light voltage acquisition frame and the reference standard voltage VB acquired in the reference standard voltage acquisition frame are acquired in advance before the distance image is captured, and are written and stored in the correction parameter storage unit 43.

Of course, both the reference background light control voltage VPCB and the reference background light non-controlled voltage VPFB, and the reference background light voltage VA and the reference standard voltage VB may be acquired in advance before the distance image is captured, and may be written and stored in the correction parameter storage unit 43.

Similarly, in addition to the reference reflected light control voltages VPCL1, VPCL2, and VPCL3 and the reference reflected light non-controlled voltages VPFL1, VPFL2, and VPFL3 in the sixth embodiment, a reference reflected light control voltage VPCL4 corresponding to a reflected light charge amount QPCL4 generated by the reflected light RL, collected in the photoelectric conversion element PD, and distributed via the readout gate transistor G4, and a reference reflected light non-controlled voltage VPFL4 corresponding to a non-controlled charge amount QPFL4 generated by the reflected light and flowing into and accumulated in the charge accumulation unit CS4 in a non-controlled state are acquired in advance, for example, when the distance image capturing device 1 is shipped or activated, that is, before capturing a distance image, and are written and stored in the correction parameter storage unit 43.

Alternatively, the reference reflected light voltage VC acquired in the reference reflected light voltage acquisition frame and the reference standard voltage VD acquired in the reference standard voltage acquisition frame are acquired in advance before the distance image is captured, and are written and stored in the correction parameter storage unit 43.

Of course, both the reference reflected light control voltage VPCL and the reference reflected light non-controlled voltage VPFL, and the reference reflected light voltage VC and the reference standard voltage VD may be acquired in advance before the distance image is captured, and may be written and stored in the correction parameter storage unit 43.

Next, in the present embodiment, processing of correcting the non-controlled voltage by the non-controlled charge flowing into without going through the readout gate transistor, extracting only the control voltage by the charge amount of the controlled charge generated by the reflected light RL, collected in the photoelectric conversion element PD, and distributed to the charge accumulation unit CS via the readout gate transistor G, and calculating the distance between the subject S and the distance image capturing device based on the charge amount will be described.

The pixel signals VQ1, VQ2, VQ3, and VQ4 corresponding to each of the charge amounts Q1, Q2, Q3, and Q4 accumulated in each of the charge accumulation units CS1, CS2, CS3, and CS4 in FIG. 16 are indicated by the following Formulas (64) to (67).

$$VQ1=VCB1+VCL1+VFB1+VFL1 \quad (64)$$

$$VQ2=VCB2+VCL2+VFB2+VFL2 \quad (65)$$

$$VQ3=VCB3+VCL3+VFB3+VFL3 \quad (66)$$

$$VQ4=VCB4+VCL4+VFB4+VFL4 \quad (67)$$

In the above Formulas (64) to (67), VCB is a background light control voltage corresponding to the controlled charge amount QCB generated by the background light, distributed by the readout gate transistor G from the photoelectric conversion element PD, and accumulated in the charge accumulation unit CS. VCL is a reflected light control voltage corresponding to the controlled charge amount QCL by the reflected light RL, which is generated by the reflected light, distributed from the photoelectric conversion element PD by the readout gate transistor G, and accumulated in the charge accumulation unit CS. VFB is a background light non-controlled voltage corresponding to the non-controlled charge amount QFB by the background light, generated by the background light and flowing into and accumulated in the charge accumulation unit CS in a non-controlled state. VFL is a reflected light non-controlled voltage corresponding to the non-controlled charge amount QFL by the reflected light RL, generated by the reflected light RL and flowing into and accumulated in the charge accumulation unit CS in a non-controlled state.

In the above Formula (64), since the optical pulse PO is emitted after the charge is distributed from the photoelectric conversion element PD to the charge accumulation unit CS1, the reflected light RL is not incident on the distance image sensor 32 at the time point when the charge is distributed to the charge accumulation unit CS1. Therefore, in the charge accumulation unit CS1, the controlled charge amount QCB1 and non-controlled charge amount QFB1 by the background light and the non-controlled charge amount QFL1 by the reflected light RL are accumulated as the charge amount Q1, and the controlled charge amount QCL1 by the reflected light RL is not accumulated. For this reason, the reflected light control voltage VCL1 becomes 0 as shown by the following Formula (68). In addition, in the present embodiment, since the state where the reflected light RL is incident on the distance image sensor 32 at the timing of distributing the charge from the photoelectric conversion element PD to the charge accumulation units CS2 and CS3 is described as an example, also in the charge accumulation unit CS4, the controlled charge amount QCB4 and the non-controlled charge amount QFB4 by the background light and the non-controlled charge amount QFL4 by the reflected light RL are accumulated, and the controlled charge amount QCL4 by the reflected light RL is not accumulated. For this reason, in the case of this example, the reflected light control voltage VCL4 becomes 0 as shown by the following Formula (68), similarly to the reflected light control voltage VCL1.

$$VCL1=VCL4=0 \quad (68)$$

In addition, in each of the background light control voltages VCB1, VCB2, VCB3, and VCB4, since the charges generated by the background light and collected in the photoelectric conversion element PD are distributed to the charge accumulation units CS1, CS2, CS3, and CS4 via the readout gate transistors G1, G2, G3, and G4 by the accumulation drive signals TX1, TX2, TX3, and TX4 having the same pulse width, it becomes the same as shown in the following Formula (69).

$$VCB1=VCB2=VCB3=VCB4 \quad (69)$$

Accordingly, each of the Formulas (64) to (67) becomes each of the following Formulas (70), (71), (72), and (73).

$$VQ1=VCB1+VFB1+VFL1 \quad (70)$$

$$VQ2=VCB1+VCL2+VFB2+VFL2 \quad (71)$$

$$VQ3=VCB1+VCL3+VFB3+VFL3 \quad (72)$$

$$VQ4=VCB1+VFB4+VFL4 \quad (73)$$

The pixel signals VQ1, VQ2, VQ3, and VQ4 described above are actually measured values in the frame for distance measurement, and are known values.

However, the background light control voltage VCB1, the background light non-controlled voltages VFB1, VFB2, VFB3, and VFB4, the reflected light control voltages VCL2 and VCL3, and the reflected light non-controlled voltages VFL1, VFL2, VFL3, and VFL4, that are the parameters that constitute each of the pixel signals VQ1, VQ2, VQ3, and VQ4 are each unknown because they are mixed as charge amounts as shown in FIG. 16.

When each of the background light control voltage VCB1 and the reflected light control voltages VCL2 and VCL3 can be obtained among the unknown values, the distance between the subject S and the distance image capturing device 1 can be calculated.

Then, as in the sixth embodiment, the background light correction coefficient R_B between the reference background light non-controlled voltage VPFB and the background light non-controlled voltage VFB is represented by the following Formula (74) based on the relationship that the reference background light voltage acquisition frame ((A) of FIG. 5), the reference standard voltage acquisition frame ((B) of FIG. 5), and the frame for measuring the distance have the same background light intensity ratio.

$$R\_B=VCB1/(VA1-VB1) \quad (74)$$

Accordingly, each of the background light non-controlled voltages VFB1, VFB2, VFB3, and VFB4 corresponding to the background light is represented by each of the following Formulas (75), (76), (77), and (78).

$$VFB1 = R\_B \times VPFB1 = R\_B \times VB1 \quad (75)$$

$$VFB2 = R\_B \times VPFB2 = R\_B \times VB2 \quad (76)$$

$$VFB3 = R\_B \times VPFB3 = R\_B \times VB3 \quad (77)$$

$$VFB4 = R\_B \times VPFB4 = R\_B \times VB4 \quad (78)$$

According to each of the above Formulas (75), (76), (77), and (78), each of the background light non-controlled voltages VFB1, VFB2, VFB3, and VFB4 at the time of the frame for distance measurement can be obtained from the reference background light non-controlled voltages VPFB1, VPFB2, VPFB3, and VPFB4 and the background light correction coefficient R_B.

In addition, the background light correction coefficient R_B in Formula (74) can also be acquired by referring to the background light control voltage VCB1 to be obtained and the known reference background light voltage VA1 and reference standard voltage VB1 stored in the correction parameter storage unit 43.

Further, as in the sixth embodiment, the reflected light correction coefficient R_L between the reference reflected light non-controlled voltage VPFL and the reflected light non-controlled voltage VFL is represented by the following Formula (79) based on the relationship that the reference reflected light voltage acquisition frame ((A) of FIG. 10), the reference standard voltage acquisition frame ((B) of FIG. 10), and the frame for measuring the distance have the same reflected light intensity ratio.

$$R\_L = (VCL2 + VCL3)/((VC2 - VD2) + (VC3 - VD3)) \quad (79)$$

Accordingly, each of the reflected light non-controlled voltages VFL1, VFL2, VFL3, and VFL4 corresponding to the reflected light is represented by each of the following Formulas (80), (81), (82), and (83).

$$VFL1 = R\_L \times VPFL1 = R\_L \times VD1 \quad (80)$$

$$VFL2 = R\_L \times VPFL2 = R\_L \times VD2 \quad (81)$$

$$VFL3 = R\_L \times VPFL3 = R\_L \times VD3 \quad (82)$$

$$VFL4 = R\_L \times VPFL4 = R\_L \times VD4 \quad (83)$$

Similarly, from Formulas (80) to (83), each of the reflected light non-controlled voltages VFL1, VFL2, VFL3, and VFL4 is represented by each of the reflected light correction coefficient ratio R_L and the reference reflected light non-controlled voltages VPFL1, VPFL2, VPFL3, and VPFL4.

In addition, the background light correction coefficient R_L in Formula (79) can also be acquired by referring to the reflected light control voltages VCL2 and VCL3 to be obtained, the known reference reflected light voltages VC2 and VC3, and the reference standard voltages VD2 and VD3 stored in the correction parameter storage unit 43.

From the above, each of the background light non-controlled voltages VFB1, VFB2, VFB3, and VFB4 and the reflected light non-controlled voltages VFL1, VFL2, VFL3, and VFL4, which is unknown, is a simultaneous linear equation consisting of the reference background light voltage VA1, the reference standard voltages VB1, VB2, VB3, and VB4, the reference reflected light voltages VC2 and VC3, the reference standard voltages VD1, VD2, VD3, and VD4, the background light control voltage VCB1 to be obtained, and reflected light control voltages VCL2 and VCL3 stored in the correction parameter storage unit 43.

That is, the distance calculation unit 42 obtains the background light control voltage VCB1 and the reflected light control voltages VCL2 and VCL3 by solving the above-described simultaneous linear equation, and calculates the distance L between the distance image capturing device 1 and the subject S.

Alternatively, by storing the solution obtained by solving the above simultaneous linear equation in a storage unit or writing it in a program, and obtaining the background light control voltage VCB1 and the reflected light control voltages VCL2 and VCL3, the distance L between the distance image capturing device 1 and the subject S is calculated.

As described above, in the reference background light voltage acquisition frame ((A) of FIG. 5), the reference standard voltage acquisition frame ((B) of FIG. 5), the reference reflected light voltage acquisition frame ((A) of FIG. 10), and the reference standard voltage acquisition frame ((B) of FIG. 10), the reference background light voltages VA1, VA2, VA3, and VA4 the reference reflected light voltages VC1, VC2, VC3, and VC4, and the reference standard voltages VB1, VB2, VB3, VB4, VD1, VD2, VD3, and VD4 are acquired as actually measured values, and are written and stored in the correction parameter storage unit 43 together with identification information for identifying each pixel 321 in the light-receiving pixel portion 320.

Alternatively, from each of the reference background light voltages VA1, VA2, VA3, and VA4, the reference reflected light voltages VC1, VC2, VC3, and VC4, and the reference standard voltages VB1, VB2, VB3, VB4, VD1, VD2, VD3, and VD4, the distance calculation unit 42 obtains each of the reference background light control voltages VPCB1, VPCB2, VPCB3, and VPCB4, the reference reflected light control voltages VPCL1, VPCL2, VPCL3, and VPCL4, the reference background light non-controlled voltages VPFB1, VPFB2, VPFB3, and VPFB4, and the reference reflected light non-controlled voltages VPFL1, VPFL2, VPFL3, and VPFL4, and writes and stores in the correction parameter storage unit 43 together with identification information for identifying each of the pixels 321 in the light-receiving pixel portion 320.

Then, the distance calculation unit 42 refers to, in the frame for distance measurement, each time each of the pixel signals VQ1, VQ2, VQ3, and VQ4 is acquired, each of the reference background light voltages VA1, VA2, VA3, and VA4, the reference reflected light voltages VC1, VC2, VC3, and VC4, and the reference standard voltages VB1, VB2, VB3, VB4, VD1, VD2, VD3, and VD4 stored in the correction parameter storage unit 43, or the reference background light control voltages VPCB1, VPCB2, VPCB3, and VPCB4, the reference background light non-controlled voltages VPFB1, VPFB2, VPFB3, and VPFB4, the reference reflected light control voltages VPCL1, VPCL2, VPCL3, and VPCL4, and reference reflected light non-controlled voltages VPFL1, VPFL2, VPFL3, and VPFL4, and solves the simultaneous linear equation to calculate the background light control voltage VCB1 and the reflected light control voltages VCL2 and VCL3. Alternatively, by storing the solution obtained by solving the above simultaneous three-dimensional linear equation in a storage unit or writing it in a program, the background light control voltage VCB1 and the reflected light control voltages VCL2 and VCL3 are calculated.

According to the present embodiment, even when the ratio of the charge amount of the non-controlled charges accumulated without going through the readout gate transistor G to the charge amount of the controlled charges accumulated in the charge accumulation unit CS through the readout gate transistor G increases, even when the area of the pixel 321 is reduced, and even when the non-controlled charges, which are included in each of the charges accumulated in the charge accumulation units CS and have different charge amounts depending on the incident angle of the incident light, vary greatly, the influence of each can be eliminated, and the distance L between the distance image capturing device 1 and the subject S can be obtained with the same or higher accuracy than when the pixel area is not reduced.

According to the sixth embodiment, the distance L between the subject S and the distance image capturing device 1 can be obtained with a high distance accuracy even when the non-controlled charges vary greatly when the number of the pixel signal readout units RU is three. Further, according to the seventh embodiment, the distance L between the subject S and the distance image capturing device 1 can be obtained with the high distance accuracy even when the non-controlled charges vary greatly when the number of the pixel signal readout units RU is four.

As is clear from the description of the seventh embodiment, similarly to the case where the number of pixel signal readout units RU is four, even when the number of pixel signal readout units RU is five, six, or more, and even when the non-controlled charges vary greatly, the distance L between the subject S and the distance image capturing device 1 can be obtained with the high distance accuracy.

That is, according to the present embodiment, when the number of pixel signal readout units RU is N (N is an integer of 3 or more), the high distance accuracy can be achieved in distance measurement even when the non-controlled charges vary greatly.

Eighth Embodiment

An eighth embodiment has, similarly to the sixth embodiment, a configuration in which each of the voltage component corresponding to the non-controlled charge generated by the reflected light RL in which the optical pulse PO (pulse width Tw) is reflected by the subject S and flowing into each of the charge accumulation units CS1, CS2, and CS3, the voltage component corresponding to the controlled charges generated by the background light and distributed to each of the charge accumulation units CS1, CS2, and CS3, and the voltage component corresponding to non-controlled charges generated by background light and flowing into each of the charge accumulation units CS1, CS2, and CS3 is subtracted and corrected from the pixel signals VQ1, VQ2, and VQ3, that is, a configuration for calculating voltages (reflected light control voltages VCL2 and VCL3, which will be described later) corresponding only to the charge amount generated by reflected light.

In addition, in the present embodiment, as in the third embodiment, two frames of each of the first frame and the second frame are used to acquire one distance image.

In addition, in the present embodiment, as described in the sixth embodiment, by the reference reflected light voltage acquisition frame ((A) of FIG. 10) and the reference standard voltage acquisition frame ((B) of FIG. 10), in a light-shielded environment, in a state where the optical pulse PO is emitted, the reference reflected light control voltage VPCL1 corresponding to the reflected light charge amount QPCL1 generated by the reflected light RL, distributed from the photoelectric conversion element PD via the readout gate transistor G1 and accumulated in the charge accumulation unit CS1, the reference reflected light control voltage VPCL2 corresponding to a reflected light charge amount QPCL2 generated by the reflected light RL, distributed from the photoelectric conversion element PD via the readout gate transistor G2 and accumulated in the charge accumulation unit CS2, the reference reflected light control voltage VPCL3 corresponding to the reflected light charge amount QPCL3 generated by the reflected light RL, distributed from the photoelectric conversion element PD via the readout gate transistor G3 and accumulated in the charge accumulation unit CS3, the reference reflected light non-controlled voltage VPFL1 corresponding to the non-controlled charge amount QPFL1 generated by reflected light RL and flowing into and accumulated in the charge accumulation unit CS1 in a non-controlled state, the reference reflected light non-controlled voltage VPFL2 corresponding to the non-controlled charge amount QPFL2 generated by reflected light RL and flowing into and accumulated in the charge accumulation unit CS2 in a non-controlled state, and the reference reflected light non-controlled voltage VPFL3 corresponding to the non-controlled charge amount QPFL3 generated by reflected light RL and flowing into and accumulated in the charge accumulation unit CS3 in a non-controlled state are acquired in advance, for example, when the distance image capturing device 1 is shipped or activated, that is, before capturing a distance image, and are written and stored in the correction parameter storage unit 43.

Further, in the present embodiment, the distance is measured in two frames, the first frame and the second frame, and the light source device 21 is controlled so as not to emit the optical pulse PO in the first frame, and the control circuit 322 is controlled so as not to output the accumulation drive signals TX1, TX2, and TX3, thereby setting as the reference standard voltage acquisition frame (corresponding to (B) of FIG. 5) acquiring each of the reference standard voltages VB1, VB2, and VB3 corresponding to the non-controlled charges generated by the background light. Then, in the second frame, the light source device 21 is controlled to emit the optical pulse PO, and the control circuit 322 is controlled to output the accumulation drive signals TX1, TX2, and TX3, thereby acquiring each of the pixel signals VQ1, VQ2, and VQ3 to measure the distance.

At this time, the order in which the first frame and the second frame are executed may be controlled as the operation in which the order is completely reversed.

Each of the pixel signals VQ1, VQ2, and VQ3 can be represented by Formulas (36), (37), and (38) as in the sixth embodiment. In the present embodiment, since the background light intensity is the same between the reference standard voltage acquisition frame for acquiring each of the reference standard voltages VB1, VB2, and VB3 corresponding to the non-controlled charges generated by the background light, that is, the first frame, and the second frame for measuring the distance, Formulas (40), (41), and (42) can be represented as follows.

$$VB1 = VPFB1 = VFB1 \tag{84}$$

$$VB2 = VPFB2 = VFB2 \tag{85}$$

$$VB3 = VPFB3 = VFB3 \tag{86}$$

Accordingly, Formula (43) becomes R_B=VFB/VPFB=1. That is, the background light correction coefficient R_B becomes 1 (R_B=1).

By subtracting the reference standard voltage VB1 acquired in the first frame from the pixel signal VQ1, which is a voltage corresponding to the charge amount accumulated in the charge accumulation unit CS1 in the second frame, as a result of the subtraction, the sum of the background light control voltage VCB1 and the reflected light non-controlled voltage VFL1 is obtained.

Here, the reflected light correction coefficient R_L also can be represented as follows.

R_L=(reference voltage corresponding to distance measurement frame(first frame))/(reference standard voltage)

=VB/VD

=VB/VPFL     (87)

Once the reflected light correction coefficient R_L is obtained, the reflected light non-controlled voltage VFL1 can be obtained from "VFL1=R_L×VD1" in Formula (60), and only the background light control voltage VCB1 to be obtained can be extracted from the sum of the background light control voltage VCB1 and the reflected light non-controlled voltage VFL1.

Accordingly, as in the sixth embodiment, Formulas (36), (37), and (38) are simultaneous three-dimensional linear equations consisting of the background light control voltage VCB1 to be obtained and the reflected light control voltages VCL2 and VCL3, and can strictly obtain by using the background light control voltage VCB1 and the reflected light control voltages VCL2 and VCL3 as solutions.

Then, the distance calculation unit 42 solves the simultaneous linear equation based on the reference reflected light control voltages VPCL1, VPCL2, and VPCL3 in the correction parameter storage unit 43, reference standard voltages VPFL1, VPFL2, and VPFL3, the calculated reference background light control voltages VPCB1, VPCB2, and VPCB3, the reference standard voltages VPFB1, VPFB2, and VPFB3, and the actually measured pixel signals VQ1, VQ2, and VQ3 to obtain the background light control voltage VCB1 and the reflected light control voltages VCL2 and VCL3. Alternatively, by storing the solution obtained by solving the above simultaneous linear equation in a storage unit or writing it in a program, the background light control voltage VCB1 and the reflected light control voltages VCL2 and VCL3 are calculated.

Then, the distance calculation unit 42 obtains the distance from the distance image capturing device 1 (distance image sensor 32) to the subject S by using the reflected light control voltages VCL2 and VCL3 by using Formula (63).

As described above, according to the present embodiment, the reference background light voltage acquisition frame ((A) of FIG. 5) and the reference standard voltage acquisition frame ((B) of FIG. 5) shown in the sixth embodiment are not executed before capturing the distance image, and two frames are used when capturing the distance image. Accordingly, when calculating the distance, the processing of obtaining the background light correction coefficient R_B (because it is 1) can be omitted, and the load in the distance calculation can be reduced.

In the present embodiment, the case where the number of pixel signal readout units RU is three has been described. However, as in the seventh embodiment, the solution can be obtained in the same manner even when the number of pixel signal readout units RU is four, and as described in the seventh embodiment, even when the number of pixel signal readout units RU is five, six, or more, the solution can be obtained in the same manner, and the distance L between the subject S and the distance image capturing device 1 can be obtained with the high distance accuracy. That is, according to the present embodiment, when the number of pixel signal readout units RU is N (N is an integer of 3 or more), the high distance accuracy can be achieved in distance measurement even when the non-controlled charges vary greatly.

Ninth Embodiment

A ninth embodiment is based on the premise that a distance image is captured in a light-shielded state (that is, a state where there is no background light) or a very dark state (that is, a state where the background light intensity is negligibly small), and has a configuration in which the voltage component corresponding to the non-controlled charge generated by the reflected light RL in which the optical pulse PO (pulse width Tw) is reflected by the subject S and flowing into each of the charge accumulation units CS1, CS2, and CS3 is subtracted and corrected from each of the pixel signals VQ1, VQ2, and VQ3, that is, the voltage (reflected light control voltages VCL2 and VCL3, which will be described later) corresponding only to the charge amount generated by the reflected light RL is calculated.

In addition, in the present embodiment, as in the eighth embodiment, two frames of each of the first frame and the second frame are used to acquire one distance image.

Further, in the present embodiment, in the first frame of the two frames for measuring the distance, the light source device 21 is controlled to emit the optical pulse PO, the control circuit 322 is controlled so as not to output the accumulation drive signals TX1, TX2, and TX3, thereby setting as the reference standard voltage acquisition frame (corresponding to (B) of FIG. 10) acquiring each of the reference standard voltages VD1, VD2, and VD3 corresponding to the non-controlled charges generated by the reflection light RL. Then, in the second frame, the light source device 21 is controlled to emit the optical pulse PO, and the control circuit 322 is controlled to output the accumulation drive signals TX1, TX2, and TX3, thereby acquiring the pixel signals VQ1, VQ2, and VQ3 to measure the distance.

At this time, the order in which the first frame and the second frame are executed may be controlled as the operation in which the order is completely reversed.

Each of the pixel signals VQ1, VQ2, and VQ3 can be represented by Formulas (36), (37), and (38) as in the sixth embodiment. In the present embodiment, since the second frame for distance measurement is also the reference reflected light voltage acquisition frame, the intensity of the reflected light RL is the same in the frame for distance measurement and the reference reflected light voltage acquisition frame, and the reflected light correction coefficient R_L is 1 (R_L=1).

That is, since the first frame is a reference standard voltage acquisition frame for obtaining the reference standard voltage VD of the reflected light, the second frame for measuring the distance is used as a reference reflected light voltage acquisition frame, and the reflected light total controlled charge voltage VCALL of the distance measurement frame is the same as the reference reflected light total controlled charge voltage VPCALL, the numerator and denominator in Formula (57) are the same.

In the present embodiment, the background light correction coefficient R_B can be represented by Formula (45) as in the sixth embodiment, and the background light correction coefficient R_B is 0 (R_B=0) because it is in a light-shielded state (that is, a state where there is no background light) or a very dark state (that is, a state where the background light intensity is negligibly small).

Once the background light correction coefficient R_B and the reflected light correction coefficient R_L are determined, as in the sixth embodiment, Formulas (36), (37), and (38) are simultaneous three-dimensional linear equations consisting of the background light control voltage VCB1 to be obtained and the reflected light control voltages VCL2 and VCL3. Since the background light control voltage VCB1 and the reflected light control voltages VCL2 and VCL3 can be obtained strictly, the distance from the distance image capturing device 1 (distance image sensor 32) to the subject S can be determined with the high accuracy.

In the present embodiment, the case where the number of pixel signal readout units RU is three has been described. However, as in the seventh embodiment, the solution can be obtained in the same manner even when the number of pixel signal readout units RU is four, and as described in the seventh embodiment, even when the number of pixel signal readout units RU is five, six, or more, the solution can be obtained in the same manner, and the distance L between the subject S and the distance image capturing device 1 can be obtained with the high distance accuracy. That is, according to the present embodiment, when the number of pixel signal readout units RU is N (N is an integer of 3 or more), the high distance accuracy can be achieved in distance measurement even when the non-controlled charges vary greatly.

Although the embodiments of the present invention have been described in detail above with reference to the drawings, the specific configuration is not limited to these embodiments, and designs and the like are included within the scope of the gist of the present invention.

REFERENCE SIGNS LIST

1: Background light correction coefficient
2: Light source unit
3: Light-receiving unit
4: Distance image processing unit
21: Light source device
22: Diffusion plate
31: Lens
32: Distance image sensor
41: Timing control unit
42: Distance calculation unit
43: Correction parameter storage unit
320: Light-receiving pixel portion
321: Pixel
322: Control circuit
323: Vertical scanning circuit
324: Horizontal scanning circuit
325: Pixel signal processing circuit
326: Pixel driving circuit
C1,C2,C3: Charge accumulation capacitor
CS1,CS2,CS3: Charge accumulation unit
FD1,FD2,FD3: Floating diffusion
G1,G2,G3: Readout gate transistor
GD: Drain gate transistor
O1,O2,O3: Output terminal
P: Measurement space
PD: Photoelectric conversion element
PO: Optical pulse (Radiation light)
RL: Reflected light
RT1,RT2,RT3: Reset gate transistor
RU1,RU2,RU3: Pixel signal readout unit
S: Subject (Object)
SF1,SF2,SF3: Source follower gate transistor
SL1,SL2,SL3: Selection gate transistor

What is claimed is:

1. A distance image capturing device comprising:
a light source unit configured to emit radiation light into a measurement space which is a space to be measured;
a distance image sensor configured to receive light including reflected light from an object in the measurement space as incident light, accumulate charges generated by the incident light for each pixel, and generate a distance image formed from a charge amount of the charges accumulated for each pixel; and
a distance image processing unit configured to store a signal value based on a non-controlled charge included in the charge amount regardless of a control of accumulating the charges in the distance image sensor, from the charge amount in the distance image, and correct a distance to the object in the space by using the stored signal value.

2. The distance image capturing device according to claim 1, wherein
the distance image sensor includes
a photoelectric conversion element that collects the charges generated in accordance with the incident light, a charge accumulation unit that accumulates the charges in a frame cycle, and a pixel circuit that performs a control of accumulating the charges in the charge accumulation unit, for each pixel, and
the distance image processing unit
subtracts an adjustment voltage corresponding to the charge amount of the non-controlled charge which is the charge flowing into the charge accumulation unit regardless of the control by the pixel circuit, from an input voltage corresponding to the charge amount accumulated in the charge accumulation unit, and measures a distance between the distance image sensor and the object.

3. The distance image capturing device according to claim 2, wherein
the charge accumulation unit includes at least one first charge accumulation unit that accumulates a background light charge generated by receiving background light of the space and two or more second charge accumulation units that accumulate a reflected light charge generated by receiving the reflected light of the radiation light from the object.

4. The distance image capturing device according to claim 3, further comprising:
a storage unit configured to store each of a reference background light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is not emitted under predetermined ambient light, and a reference standard voltage acquired from each of the first charge accumulation unit and the second charge accumulation unit without accumulating the charges controlled by the pixel circuit in each of the first charge accumulation unit and the second charge accumulation unit.

5. The distance image capturing device according to claim 4, wherein
the distance image sensor emits the radiation light into the measurement space, receives light including the reflected light from the object in the measurement space as incident light, and accumulates the charges generated by the incident light in each of the first charge accumulation unit and the second charge accumulation unit, and
the distance image processing unit divides a background light voltage generated by the charge accumulated in the first charge accumulation unit by the reference background light voltage measured in advance and stored in the storage unit to obtain an adjustment ratio, and calculates the adjustment voltage for each of the input voltages by multiplying each of the reference standard voltages by the adjustment ratio.

6. The distance image capturing device according to claim 3, wherein the frame cycle includes each of a first frame cycle and a second frame cycle, in the first frame cycle, the distance image sensor emits the radiation light into the measurement space, receives light including the reflected light from the object in the measurement space as incident light, and accumulates the charges controlled by the pixel circuit in each of the first charge accumulation unit and the second charge accumulation unit, and the distance image processing unit acquires the input voltage generated by the accumulated charges, and in the second frame cycle, the distance image sensor emits the radiation light into the measurement space, receives the light including reflected light from the object in the measurement space as the incident light, and does not accumulate the charges controlled by the pixel circuit in each of the first charge accumulation unit and the second charge accumulation unit, and the distance image processing unit acquires an adjustment voltage corresponding to the non-controlled charge in each of the first charge accumulation unit and the second charge accumulation unit.

7. The distance image capturing device according to claim 3, further comprising:

a storage unit configured to store each of a reference reflected light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is emitted in a light-shielded environment, and a reference standard voltage acquired from each of the first charge accumulation unit and the second charge accumulation unit without accumulating the charges controlled by the pixel circuit in each of the first charge accumulation unit and the second charge accumulation unit.

8. The distance image capturing device according to claim 7, wherein the distance image processing unit calculates each of the adjustment voltages for each of the input voltages by dividing a result obtained by adding each of the input voltages generated by the charges accumulated in each of the first charge accumulation unit and the second charge accumulation unit by a result obtained by adding each of the reference reflected light voltages to obtain an adjustment ratio, and multiplying the reference standard voltage by the adjustment ratio.

9. The distance image capturing device according to claim 3, wherein the frame cycle includes each of a first frame cycle and a second frame cycle, in the first frame cycle, the distance image sensor emits the radiation light into the measurement space in a light-shielded environment, receives light including the reflected light from the object in the measurement space as incident light, and accumulates the charges controlled by the pixel circuit in each of the first charge accumulation unit and the second charge accumulation unit, and the distance image processing unit acquires the input voltage generated by the charges accumulated in each of the first charge accumulation unit and the second charge accumulation unit, and in the second frame cycle, the distance image sensor emits the radiation light into the measurement space in the light-shielded environment, receives the light including the reflected light from the object in the measurement space as the incident light, and does not accumulate the charges controlled by the pixel circuit in each of the first charge accumulation unit and the second charge accumulation unit, and the distance image processing unit acquires an adjustment voltage corresponding to the non-controlled charge by the charges in each of the first charge accumulation unit and the second charge accumulation unit.

10. The distance image capturing device according to claim 3, further comprising:

a storage unit configured to store each of a reference background light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is not emitted under predetermined ambient light, a first reference standard voltage acquired as a reference standard voltage from each of the first charge accumulation unit and the second charge accumulation unit without accumulating the charges controlled by the pixel circuit in each of the first charge accumulation unit and the second charge accumulation unit, a reference reflected light voltage acquired from each of the first charge accumulation unit and the second charge accumulation unit by accumulating the charges controlled by the pixel circuit in each of the first charge accumulation unit and the second charge accumulation unit, measured in advance in a state where the radiation light is emitted in a light-shielded environment, and a second reference standard voltage acquired as a reference standard voltage from each of the first charge accumulation unit and the second charge accumulation unit without accumulating the charges controlled by the pixel circuit in each of the first charge accumulation unit and the second charge accumulation unit.

11. The distance image capturing device according to claim 10, wherein the distance image sensor emits the radiation light into the measurement space, receives light including the reflected light from the object in the measurement space as incident light, and accumulates the charges generated by the incident light for each pixel, the distance image processing unit divides the input voltage generated by the accumulated charges by the reference background light voltage that is measured in advance and stored in the storage unit to obtain a first adjustment ratio as an adjustment ratio, and calculates a first adjustment voltage for each of the input voltages by multiplying each of the first reference standard voltages by the first adjustment ratio, and divides a result obtained by adding each of the input voltages by an addition result obtained by adding each of the reference reflected light voltages to obtain a second adjustment ratio as an adjustment ratio, calculates each of second adjustment voltages for each of the input voltages by multiplying the second reference standard voltage by the second adjustment ratio, and adds the first adjustment voltage and the second adjustment voltage to calculate the adjustment voltage.

12. The distance image capturing device according to claim 3, further comprising:
a storage unit configured to acquire each of
a reference background light voltage acquired from each of the charge accumulation units by accumulating the charges controlled by the pixel circuit in each of N (N is an integer of 3 or more) charge accumulation units, measured in advance in a state where the radiation light is not emitted under predetermined ambient light,
a first reference standard voltage acquired as a reference standard voltage from each of the charge accumulation units without accumulating the charges controlled by the pixel circuit in each of the charge accumulation units,
a reference reflected light voltage acquired from each of the charge accumulation units by accumulating the charges controlled by the pixel circuit in each of the N charge accumulation units, measured in advance in a state where the radiation light is emitted in a light-shielded environment, and
a second reference standard voltage acquired as a reference standard voltage from each of the charge accumulation units without accumulating the charges controlled by the pixel circuit in each of the charge accumulation units, and configured to store each of
a reference background light control voltage corresponding to a charge amount of a controlled charge generated by the background light, collected in the photoelectric conversion element, distributed to and accumulated in each of the N charge accumulation units, obtained from each of the reference background light voltage and the first reference standard voltage,
a reference background light non-controlled voltage corresponding to a charge amount of a non-controlled charge generated by the background light and flowing into each of the N charge accumulation units without being distributed,
a reference reflected light control voltage corresponding to a charge amount of a controlled charge generated by the reflected light, collected in the photoelectric conversion element, distributed to and accumulated in each of the N charge accumulation units, and
a reference reflected light non-controlled voltage corresponding to a charge amount of a non-controlled charge generated by the reflected light and flowing into and accumulated in each of the N charge accumulation units without being distributed.

13. The distance image capturing device according to claim 12, further comprising:
a distance calculation unit configured to
calculate and obtain a first ratio as a ratio of a light amount of background light in the environment in which the measurement is performed in advance obtained from a portion or all of the reference background light voltage, the first reference standard voltage, the reference background light control voltage, and the reference background light non-controlled voltage, stored in the storage unit, in a state of capturing the distance image, to a light amount of background light in the capturing state, calculate and obtain a second ratio as a ratio of a light amount of reflected light in the environment in which the measurement is performed in advance obtained from a portion or all of the reference reflected light voltage, the second reference standard voltage, the reference reflected light control voltage, and the reference reflected light non-controlled voltage, stored in the storage unit, to a light amount of reflected light in the capturing state, and
solve a simultaneous equation obtained by using each of the first ratio and the second ratio to calculate a reflected light control voltage corresponding to a charge amount of a controlled charge generated by the reflected light in the capturing state and accumulated in the charge accumulation unit thereby obtaining a distance to the object.

14. The distance image capturing device according to claim 3, further comprising:
a storage unit configured to obtain each of
a reference reflected light voltage corresponding to a charge amount including a controlled charge accumulated by distribution, by performing a control of accumulating and distributing in each of the N charge accumulation units, and a non-controlled charge flowing into and accumulated regardless of the distribution, measured in advance in a state where the radiation light is emitted in a light-shielded environment, and
a second reference standard voltage acquired as a reference standard voltage corresponding to a charge amount of a non-controlled charge flowing into and accumulated without being controlled to be accumulated in each of the charge accumulation units, and
configured to store each of
a reference reflected light control voltage corresponding to a charge amount of a controlled charge generated by the reflected light, collected in the photoelectric conversion element, and distributed to and accumulated in each of the N charge accumulation units, obtained from each of the reference reflected light voltage and the second reference standard voltage, and
a reference reflected light non-controlled voltage corresponding to a charge amount of a non-controlled charge generated by the reflected light and flowing into and accumulated in each of the N charge accumulation units without being distributed.

15. The distance image capturing device according to claim 14,
wherein in an acquisition state for acquiring the distance, the frame cycle includes each of a first frame cycle and a second frame cycle,
in one of two frame cycles of the first frame cycle and the second frame cycle, the distance image sensor acquires a first reference standard voltage as a reference standard voltage corresponding to each of charge amounts of non-controlled charges accumulated in each of the N charge accumulation units without emitting the radiation light into the measurement space,
in the other of the two frame cycles,
the distance image sensor acquires a voltage for obtaining a distance, corresponding to a charge amount including each of a controlled charge accumulated by distribution from each of the charge accumulation units by emitting the radiation light into the measurement space and performing a control of distributing charges in each of the N charge accumulation units and a non-controlled charge flowing into regardless of distribution, and
the distance image capturing device further comprises a distance calculation unit configured to calculate and obtain a ratio of a light amount of reflected light in the environment in which the measurement is performed in advance obtained from a portion or all of the reference reflected light voltage, the second reference standard voltage, the first reference standard voltage, and the voltage for obtaining the distance, stored in the storage unit, to a light amount of reflected light in the acquisition state, and solve a simultaneous equation to calculate a reflected light control voltage corresponding to the charge amount of the controlled charge thereby obtaining a distance to the object.

16. The distance image capturing device according to claim 3, wherein when acquiring the distance in a light-shielded environment or a dark environment in which ambient light is negligible, the frame cycle includes each of a first frame cycle and a second frame cycle, in one of two frame cycles of the first frame cycle and the second frame cycle, the distance image sensor acquires a second reference standard voltage from each of the charge accumulation units by emitting the radiation light, receiving incident light from the measurement space, accumulating non-controlled charges that flow into each of the N charge accumulation units without accumulating the charges controlled by the pixel circuit, in the other of the two frame cycles, the distance image sensor acquires a reference reflected light voltage, which also serves as a voltage for acquiring a distance corresponding to the charge amount including each of the non-controlled charge and the controlled charge accumulated by being controlled by the pixel circuit, by emitting the radiation light, receiving the incident light from the measurement space, distributing and accumulating the charges from the photoelectric conversion element in each of the charge accumulation units by the control of the pixel circuit, and the distance image capturing device further comprises a distance calculation unit configured to solve a simultaneous equation using the second reference standard voltage and the reference reflected light voltage to calculate only a reflected light control voltage corresponding to the charge amount of the controlled charge thereby obtaining a distance to the object.

17. The distance image capturing device according to claim 1, further comprising:

a lens configured to receive the incident light from the space, wherein the distance image sensor receives the incident light via the lens.

18. The distance image capturing device according to claim 5, further comprising:

a lens configured to receive the incident light from the space, wherein the incident light is incident on each of the pixels via the lens, and the pixels for which the adjustment ratio is within a predetermined difference range are divided into groups in correspondence with a characteristic of the lens, and a median value of the reference standard voltages in the group is set as a reference standard voltage for all the pixels in the group.

19. The distance image capturing device according to claim 5, wherein the incident light is incident on each of the pixels via the lens, and a plurality of characteristics of the lens are stored in the storage unit in correspondence with the characteristic of the lens.

20. The distance image capturing device according to claim 5, wherein the incident light is incident on each of the pixels via the lens, and an adjustment function that outputs the adjustment ratio corresponding to each of positions of the pixels is stored in the storage unit in correspondence with characteristic of the lens.

21. A distance image capturing method comprising:

a distance image generation process of, by a distance image sensor, emitting radiation light into a measurement space which is a space to be measured from a light source unit, receiving light including reflected light from an object in the measurement space as incident light, accumulating charges generated by the incident light for each pixel, and generating a distance image having a charge amount of the charges accumulated for each pixel; and a distance image processing process of acquiring a distance to the object in the space from the charge amount in the distance image, by a corrected charge amount obtained by removing a non-controlled charge included in the charge amount regardless of a control of accumulating the charges in the distance image sensor.

* * * * *